US011636032B2

(12) United States Patent
Jeong et al.

(10) Patent No.: US 11,636,032 B2
(45) Date of Patent: *Apr. 25, 2023

(54) MEMORY SYSTEM, DATA STORAGE DEVICE, USER DEVICE AND DATA MANAGEMENT METHOD THEREOF

(71) Applicant: SAMSUNG ELECTRONICS CO., LTD., Suwon-si (KR)

(72) Inventors: Hyojin Jeong, Seongnam-si (KR); Youngjoon Choi, Seongnam-si (KR); Sunghoon Lee, Seoul (KR); Jae-Hyeon Ju, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/570,848

(22) Filed: Jan. 7, 2022

(65) Prior Publication Data

US 2022/0129375 A1 Apr. 28, 2022

Related U.S. Application Data

(63) Continuation of application No. 13/283,866, filed on Oct. 28, 2011, now Pat. No. 11,232,022.

(30) Foreign Application Priority Data

Oct. 29, 2010 (KR) .................. 10-2010-0106946
Oct. 29, 2010 (KR) .................. 10-2010-0106947

(51) Int. Cl.
*G06F 3/06* (2006.01)
*G06F 12/02* (2006.01)

(52) U.S. Cl.
CPC ........ *G06F 12/0246* (2013.01); *G06F 3/0616* (2013.01); *G06F 3/0652* (2013.01);
(Continued)

(58) Field of Classification Search
CPC .. G06F 12/0246; G06F 3/0616; G06F 3/0652; G06F 3/0659; G06F 3/0679; G06F 2212/7205
See application file for complete search history.

(56) References Cited

U.S. PATENT DOCUMENTS 7,495,955 B2 2/2009 Ido
2004/0027872 A1 2/2004 Nishikawa et al.
(Continued)

FOREIGN PATENT DOCUMENTS

CN 101354715 1/2009
CN 101840307 9/2010
(Continued)

OTHER PUBLICATIONS

Office Action dated Oct. 6, 2014 in corresponding U.S. Appl. No. 13/283,866.
(Continued)

*Primary Examiner* — Arpan P. Savia
*Assistant Examiner* — Eric T Loonan
(74) *Attorney, Agent, or Firm* — F. Chau & Associates, LLC

(57) ABSTRACT

A data management method of a data storage device having a data management unit different from a data management unit of a user device receives information regarding a storage area of a file to be deleted, from the user device, selects a storage area which matches with the data management unit of the data storage device, from among the storage area of the deleted file, and performs an erasing operation on the selected storage area which matches with the data management unit.

19 Claims, 41 Drawing Sheets

(52) U.S. Cl.
CPC .......... *G06F 3/0659* (2013.01); *G06F 3/0679* (2013.01); *G06F 2212/7205* (2013.01)

(56) References Cited

U.S. PATENT DOCUMENTS

| | | |
|---|---|---|
| 2005/0231405 A1 | 10/2005 | Sano |
| 2006/0136676 A1* | 6/2006 | Park ..................... G06F 3/0625 711/144 |
| 2006/0179263 A1 | 8/2006 | Song et al. |
| 2008/0263305 A1 | 10/2008 | Shu et al. |
| 2009/0010066 A1 | 1/2009 | Kim |
| 2009/0119353 A1 | 5/2009 | Oh et al. |
| 2009/0172263 A1* | 7/2009 | Olbrich ................ G11C 7/1063 711/E12.008 |
| 2010/0122019 A1 | 5/2010 | Flynn et al. |
| 2010/0125705 A1 | 5/2010 | Mehra et al. |
| 2010/0211737 A1 | 8/2010 | Flynn et al. |
| 2010/0211801 A1 | 8/2010 | Kim et al. |
| 2010/0217927 A1* | 8/2010 | Song ..................... G06F 3/0656 711/E12.001 |
| 2010/0241819 A1 | 9/2010 | Yoshii et al. |
| 2011/0208898 A1 | 8/2011 | Shin |
| 2012/0110249 A1 | 5/2012 | Jeong et al. |
| 2012/0221776 A1 | 8/2012 | Yoshihashi et al. |
| 2016/0162194 A1 | 6/2016 | Shu et al. |

FOREIGN PATENT DOCUMENTS

| | | |
|---|---|---|
| KR | 1020080075707 | 8/2008 |
| KR | 20090046567 | 5/2009 |
| KR | 1020090063733 | 6/2009 |
| KR | 20100015506 | 2/2010 |
| KR | 20100094862 | 8/2010 |
| WO | 2011074712 | 6/2011 |

OTHER PUBLICATIONS

Office Action dated Mar. 14, 2016 in corresponding U.S. Appl. No. 13/283,866.
Final Office Action dated Jul. 14, 2017 in corresponding U.S. Appl. No. 13/283,866.
Final Office Action dated Apr. 10, 2015 in corresponding U.S. Appl. No. 13/283,866.
Office Action dated Aug. 27, 2015 in corresponding U.S. Appl. No. 13/283,866.
Office Action dated Dec. 1, 2016 in corresponding U.S. Appl. No. 13/283,866.
Office Action dated Jun. 20, 2018 in corresponding U.S. Appl. No. 13/283,866.
Final Office Action dated Jan. 22, 2019 in corresponding U.S. Appl. No. 13/283,866.
Examiner's Answer to Appeal Brief dated Nov. 7, 2019 in corresponding U.S. Appl. No. 13/283,866.
Patent Board Decision dated Aug. 26, 2021 in corresponding U.S. Appl. No. 13/283,866.

* cited by examiner

Fig. 5

| File Name | | Extension | Attrib | Reserved | Create Time |
|---|---|---|---|---|---|
| Create Data | Last Accessed Data | Last Written Time | Last Written Data | Starting Sector Hi | Starting Sector Low | File Size |

| TRIM Collection Area | | |
|---|---|---|
| Start Sector No | # of Sectors | POT |
| 1 | 4 | ① |
| 5 | 4 | ③ |
| 9 | 4 | ② |
| 13 | 4 | ④ |

Fig. 28

| Create Data | Last Accessed Data | File Name | Starting Sector Hi | Last Written Time | Extension | Last Written Data | Attrib | Starting Sector Low | Reserved | Create Time | File Size |
|---|---|---|---|---|---|---|---|---|---|---|---|

MEMORY SYSTEM, DATA STORAGE DEVICE, USER DEVICE AND DATA MANAGEMENT METHOD THEREOF

CROSS-REFERENCE TO RELATED APPLICATIONS

This U.S. non-provisional patent application is a continuation of U.S. patent application Ser. No. 13/283,866 filed on Oct. 28, 2011, which issued as U.S. Pat. No. 11,232,022 on Jan. 25, 2022, which claims under 35 U.S.C § 119 priority to and the benefit of Korean Patent Application No 10-2010-0106946, filed on Oct. 29, 2010, and Korean Patent Application No, 10-2010-0106947, filed on Oct. 29, 2010, the entire content of which are incorporated by reference herein.

BACKGROUND

The present disclosure herein relates to a memory system and a data management method thereof, and, more particularly, to a flash memory system and a data management method thereof.

Unlike hard disks, since flash memories do not aid overwriting, an erasing operation needs to be first performed for rewriting. The erasing operations of the flash memories are performed by memory block units. Due to these characteristics of the flash memories, it is difficult to apply a file system for hard disk to the flash memories as-is. A middleware Flash Translation Layer (FTL) is used between the file system for hard disk and a flash memory. The FTL enables free reading/writing of flash memories as in existing hard disks.

A unit for managing files in a file system differs from a unit for managing data stored in a flash memory in an FTL. Mismatch between the management units may cause an unnecessary data copy operation and a large-scale merging operation for the flash memories. The copy and merging operations can shorten the service life of flash memories.

SUMMARY

According to an exemplary embodiment, a data management method of a data storage device which has a data management unit different from a data management unit of a user device is provided. Information regarding a storage area of a file to be deleted is receiver from the user device. A storage area which matches with the data management unit of the data storage device is selected from among the storage area of the file to be deleted. An erasing operation is performed on the selected storage area which matches with the data management unit.

Information regarding a storage area, which is mismatched with the data management unit of the data storage device among the storage area of the file to be deleted, may be separately managed.

The user device may change information regarding metadata of the file to be deleted to indicate that the file to be deleted is deleted from a high level.

The data management method may further include storing, by the data storage device, information regarding storage areas of at least two files to be deleted in a buffer memory when the information regarding the storage areas of the at least two files to be deleted is provided from the user device.

The selecting of a storage area may select a storage area, matching with the data management unit of the data storage device, from among the storage areas of the at least two files to be deleted which are stored in the buffer memory.

The user device may manage data by sector unit. The data storage device may manage data by page unit. Each page may be divided into a plurality of sectors.

According to an exemplary embodiment, a data management method for a data storage device which uses a data management unit different from a data management unit of a user device is provided. Information regarding a storage area of a file to be deleted is received from the user device. A storage area which matches with the management unit of the data storage device is marked as invalid. The data storage device includes a data storage unit configured to store data, and a buffer memory configured to temporarily store data to be written in the data storage unit. Data regarding the storage area marked as invalid among the data stored in the buffer memory is not written in the storage unit.

The data management method may further include marking a storage area which is mismatched with the management unit of the data storage device among the storage area of the file to be deleted, as valid. Data regarding the storage area marked as valid among the data stored in the buffer memory may be written in the storage unit.

The data management method may further include creating a TRIM manage table which is configured to manage a storage area mismatched with the management unit of the data storage device among the storage area of the file to be deleted.

The TRIM manage table may be stored in the buffer memory, and information of the TRIM manage table may be controlled in a push scheme.

The data management method of may further include storing in the buffer memory, by the data storage device, information regarding storage areas of at least two files to be deleted when the information regarding the storage areas of the at least two files to be deleted is provided from the user device.

The marking of a storage area as invalid may mark a storage area which matches with the data management unit of the data storage device.

According to an exemplary embodiment a memory system includes a host configured to generate a TRIM command and a data storage device configured to perform an erasing operation in response to the TRIM command from the host. The data storage device may perform an erasing operation on an area which matches with a data management unit of the data storage device among a storage area which has been designated as an area to be deleted according to the TRIM command.

The data storage device may separately manage information regarding an area which is mismatched with the data management unit of the data storage device among the storage area which has been designated as the area to be deleted according to the TRIM command.

The data storage device may manage data by page unit. The host may manage data by sector unit. Each page may be divided into a plurality of sectors.

The data storage device may include a mapping table configured to change a logical address, which is provided from the host, to a physical address of the data storage device, and in the mapping table, the storage area which matches with the data management unit of the data storage device among the storage area designated as the area to be deleted may be marked as invalid.

In the mapping table, a storage area which is mismatched with the data management unit of the data storage device among the storage area designated as the area to be deleted may be marked as valid.

The data storage device may further include a TRIM manage table configured to manage information regarding the storage area which is mismatched with the data management unit of the data storage device among the storage area designated as the area to be deleted.

The mapping table may update Writing State Information (WSI) on the basis of the TRIM manage table when the storage area managed in the TRIM manage table matches with the data management unit of the data storage device, according to another TRIM command from the host.

The WSI of the mapping table may be updated, and information regarding a storage area which matches with the data management unit of the data storage device and is managed in the TRIM manage table may be deleted from the TRIM manage table.

The data storage device may further include a buffer memory configured to store the TRIM manage table and to manage the information stored in the TRIM manage table in a push scheme.

The data storage device may include a buffer memory configured to store information regarding at least two TRIM commands transferred from the host.

The data storage device may further include at least two flash memories configured to store data, and a control unit configured to control the at least two flash memories. The control unit may control processing the order of the at least two TRIM commands stored in the buffer memory for the at least two flash memories to operate in parallel.

According to an exemplary embodiment, a data storage device which is connected to a user device, is provided. A storage unit is configured to store data. A buffer memory is configured to temporarily store data to be written in the storage unit. A control unit is configured to control the storage unit and the buffer memory. Data of a storage area which matches with a data management unit of the storage unit among a storage area designated as an area to be deleted is not written in the storage unit, according to a TRIM command transferred from the user device.

Data of a storage area which is mismatched with the data management unit of the storage unit among the storage area designated as the area to be deleted may be written in the storage unit.

The data storage device may further include a mapping table configured to change a logical address, which is provided from the user device, to a physical address of the data storage device. In the mapping table, Writing State Information (WSI) of the storage area which matches with the data management unit of the storage unit among the storage area designated as the area to be deleted may be marked as invalid. In the mapping table, the WSI of a storage area which is mismatched with the data management unit of the storage unit among the storage area designated as the area to be deleted may be marked as valid.

The data storage device may further include a TRIM manage table configured to manage a storage area which is mismatched with the data management unit of the data storage device and marked as valid in the mapping table.

The mapping table may update the WSI on the basis of the TRIM manage table when the storage area managed in the TRIM manage table matches with the data management unit of the data storage device, according to another TRIM command transferred from the user device.

The data storage device may further include a buffer memory configured to store information regarding at least two TRIM commands when the at least two TRIM commands are transferred from the user device.

The storage unit may include at least two flash memories, and the control unit may control processing the order of the at least two TRIM commands stored in the buffer memory for the at least two flash memories to operate in parallel.

According to an exemplary embodiment, a data management method for a user device that stores data of a file in a data storage device and having a different data management unit than the data storage device is provided. Metadata of a delete-requested file is changed in response to a file delete request. A determination is made as to whether information about a storage region of the delete-requested file corresponds to a data management unit of the data storage device. Information about a region corresponding to the data management unit of the data storage device among information about the storage region of the delete-requested file to the data storage device is transmitted.

The changing of the metadata of the delete-requested file may represent that the delete-requested file is deleted in a high level.

A TRIM manage table configured to manage information about a region that does not correspond to the data management unit of the data storage device among the information about the storage region of the delete-requested file may be generated.

The information about the storage region of the delete-requested file may be provided from a mapping table of the data storage device.

According to an exemplary embodiment, a user device that stores data of a file in a data storage device is provided. A file system is configured to manage a file by a unit different from a data management unit of the data storage device and to change information about metadata of a delete-requested file. A TRIM manage module is configured to provide information about a storage region corresponding to the data management unit of the data storage device among information about a storage region of the delete-requested file.

A changing of the information about the metadata of the delete-requested file may represent that the delete-requested file is deleted in a high level.

The user device may further include a TRIM manage table configured to manage information about a region that does not correspond to the data management unit of the data storage device among the information about the storage region of the delete-requested file.

The user device may further include a host memory configured to store the TRIM manage table, wherein the TRIM manage table stored in the host memory is managed through a pushing method.

The user device may further include a host memory configured to store information about a storage region of at least two delete-requested files.

The TRIM manage module may provide information about a region corresponding to the data management unit of the data storage device among the information about the storage region of the at least two delete-requested files stored in the host memory.

The information about the storage region of the at least two delete-requested files may be provided from a mapping table of the data storage device.

According to an exemplary embodiment, a memory system includes a host configured to support a TRIM operation, and a data storage device configured to perform an erase operation in response to a TRIM command from the host. The host provides only information about a storage region corresponding to a data management unit of the data storage device among information about a storage region of a delete-requested file.

The host may separately manage information about a region that does not correspond to the data management unit of the data storage device among the information about the storage region of the delete-requested file.

The host may manage a file by a sector unit. The data storage device may manage data of a file by a page unit. Each page may be divided into a plurality of sectors.

The host may include a file system configured to manage a file by a sector unit and to change information about metadata of a delete-requested file, and a TRIM manage module configured to select information about sectors corresponding to a page unit of the data storage device, among sectors of the delete-requested file.

The changing of the information about the metadata of the delete-requested file may represent that the delete-requested file is deleted in a high level.

The host may further include a TRIM manage table managing information about a partial sector that does not correspond to the page unit among the sectors of the delete-requested file.

The TRIM manage table may manage information about the partial sector and information about a sector in the same page as the partial sector.

The host may further include a host memory configured to store information about sectors of at least two files that are delete-requested at respectively different times.

The TRIM manage module may select information about a sector address corresponding to the management unit of the data storage device among information about sectors of the at least two files that are delete-requested at respectively different times, which is stored in the host memory.

According to an exemplary embodiment, a data management erasing method for a flash memory system, the flash memory system having a host file system configured to communicate with a flash memory storage device, is provided. A TRIM command that informs the flash memory storage device which blocks of data are no longer considered in use is provided by the host file system to the flash memory storage device. The TRIM command includes a sector address for designating a file for which deletion has been requested. The flash memory storage device receives the TRIM command, translates the sector address into a page address, and marks a page of the flash memory storage device that will be deleted, as invalid. An erasing operation is performed by the flash memory device on the page marked as invalid.

The erasing operation may be performed at an idle time when there is no request from the host file system to the flash memory storage device.

Upon receipt of a file deletion request by the host file system, the host file system may change metadata of the file for which deletion has been requested such that when an application subsequently accesses a corresponding file of the host file system the application will be provided information indicating that the corresponding file has been already deleted.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. Like elements are assigned the same reference number in the drawings.

FIG. 5 illustrates an exemplary embodiment of a directory entry structure which is created for managing files by a file system of FIG. 4;

FIG. 28 is a view illustrating a directory entry structure that the file system of FIG. 27 generates to manage a file;

DETAILED DESCRIPTION OF THE EMBODIMENTS

Exemplary embodiments of the inventive concept will be described below in more detail with reference to the accompanying drawings. The inventive concept may, however, be embodied in different forms and should not be construed as limited to the embodiments set forth herein.

I. Memory System Aiding TRIM Operation

In computing, a TRIM command allows an operating system to inform a solid state device (SSD) which blocks of data are no longer considered in use and can be wiped internally. While TRIM is frequently spelled in capital letters, it is not an acronym. It is merely a command name TRIM was introduced soon after SSDs started to become an affordable alternative to traditional hard disks. Because low-level operation of SSDs differs significantly from traditional hard disks the typical way in which operating systems handle operations like deletes and formats (not explicitly communicating the involved sectors/pages to the underlying storage medium) resulted in unanticipated progressive performance degradation of write operations on SSDs.

Figure 1:
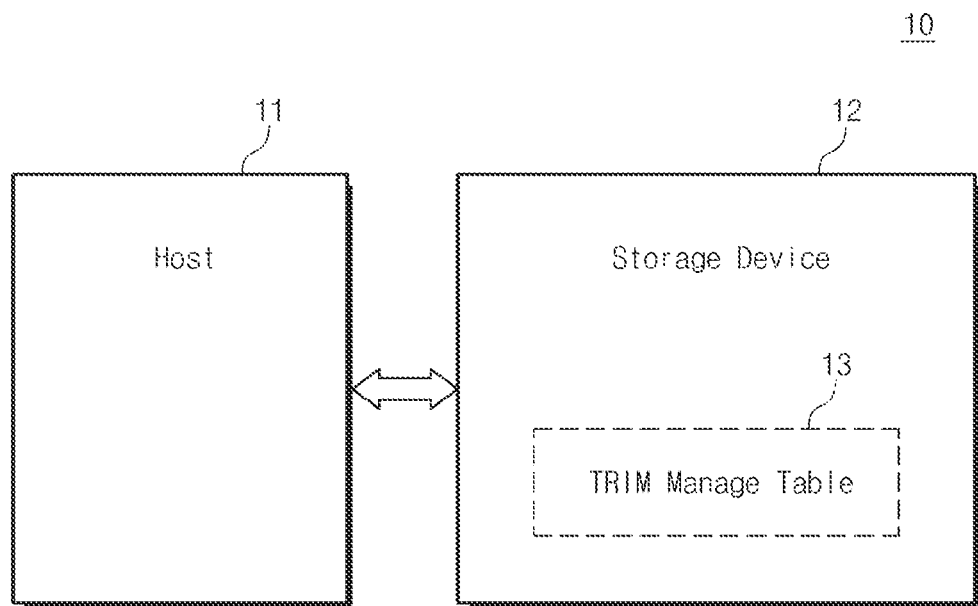
FIGS. 1 and 2 are block diagrams illustrating memory systems according to an embodiment of the inventive concept.
Figure 2:
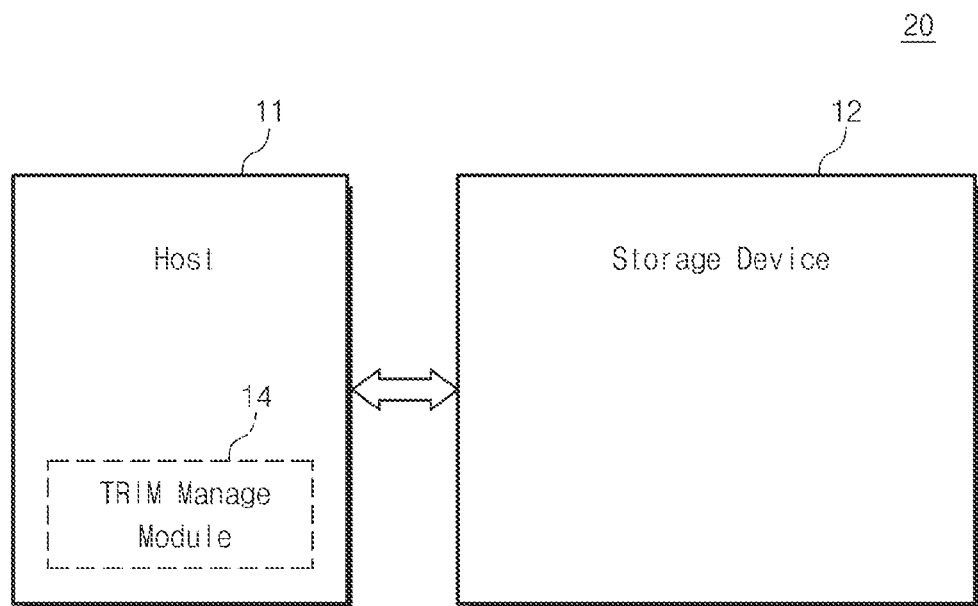

FIGS. 1 and 2 are block diagrams illustrating memory systems 10, 20 according to an embodiment of the inventive concept.

Referring to FIGS. 1 and 2, the storage device 12 stores data written by the host 11. The storage device 12 supplies data to host 11, which is read by the host 11. In this case, a unit for managing files in the host 11 may differ from a unit for managing data in the storage device 12. This mismatch between the management units in the host 11 and the storage device 12 may deteriorate performance of the memory system 10.

The memory system according to an exemplary embodiment of the inventive concept includes elements for managing a mismatched area separately. In an exemplary embodiment the storage device 12 may include the TRIM management table 13 as illustrated in FIG. 1. In an exemplary embodiment, the host 11 may include the TRIM management module 14 as illustrated in FIG. 2.

In FIG. 1 the storage device 10 includes the TRIM management table 13 which is described in more detail below referring to FIGS. 3 to 25. In FIG. 2 the host 11 includes the TRIM management module 14 which is described in more detail below referring to FIGS. 26 to 41.

Figure 3:
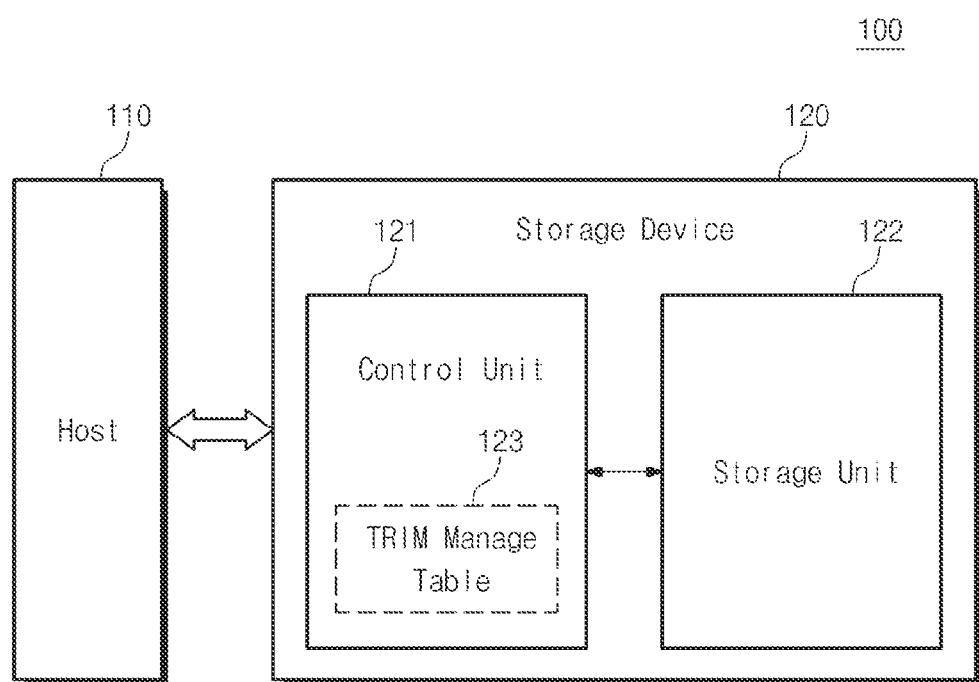
FIG. 3 is a block diagram illustrating a memory system according to an embodiment of the inventive concept.

FIG. 3 is a block diagram illustrating a memory system 100 according to an embodiment of the inventive concept.

Referring to FIG. 3, the memory system 100 includes a host 110 and a storage device 120. The storage device 120 includes a control unit 121 and a storage unit 122.

The host 110 aids a TRIM operation. The TRIM operation denotes that the host 110 processes only metadata for a corresponding file when a deletion request for a specific file is inputted from a user. In this case, since only metadata of the host 110 is processed without substantially deleting data stored in the storage unit 122, the user may recognize a deletion operation for a corresponding file as quickly being performed.

To substantially delete the data stored in the storage unit 122, the host 110 provides a TRIM command to the storage device 120. The TRIM command includes information (for example, address information) for storing an area that will substantially be deleted. In response to the TRIM command, the control unit 121 performs an erasing operation on the data stored in the storage unit 122. The TRIM command may also be described by other names such as a deallocate command, an unwrite command, a delete command, and a file delete command.

A unit for managing files in the host 110 may differ from a unit for managing data stored in the storage unit 122 in the storage device 120. For example, the host 110 may manage files by a sector unit in a hard disk. In computer disk storage, a sector is a subdivision of a track on a magnetic or optical disc. Each sector stores a fixed amount of user data. On the other hand, the storage device 120 may manage data stored in the storage unit 122 by page and/or block unit in a flash memory.

Mismatch between the management units in the host 110 and storage device 120 may deteriorate performance of the memory system 100. For example, when an erasing operation for data stored in the storage unit 122 is performed in response to the TRIM command from the host 110, mismatch between the management units may lead to the copy of valid data and a large-scale merging operation that combines or unites sets of data. Accordingly, the service life of the storage device 120 is shortened, and performance of the storage device 120 is degraded.

The storage device 120 according to an exemplary embodiment of the inventive concept includes a TRIM management module 123. The TRIM manage module 123 separately manages an area mismatched with the management unit of the storage device 120 among areas of the storage unit 122 designated as areas that will substantially be deleted according to the TRIM command from the host 110. By giving attention to a management unit mismatch between the host 110 and the storage device 120 with the TRIM manage module 123, the memory system 100 according to embodiments of the inventive concept can prevent the service life of the storage device 120 from being shortened and the performance of the storage device 120 from being degraded.

II. Flash Storage Device of Flash Memory System for Processing TRIM Command

Figure 4:
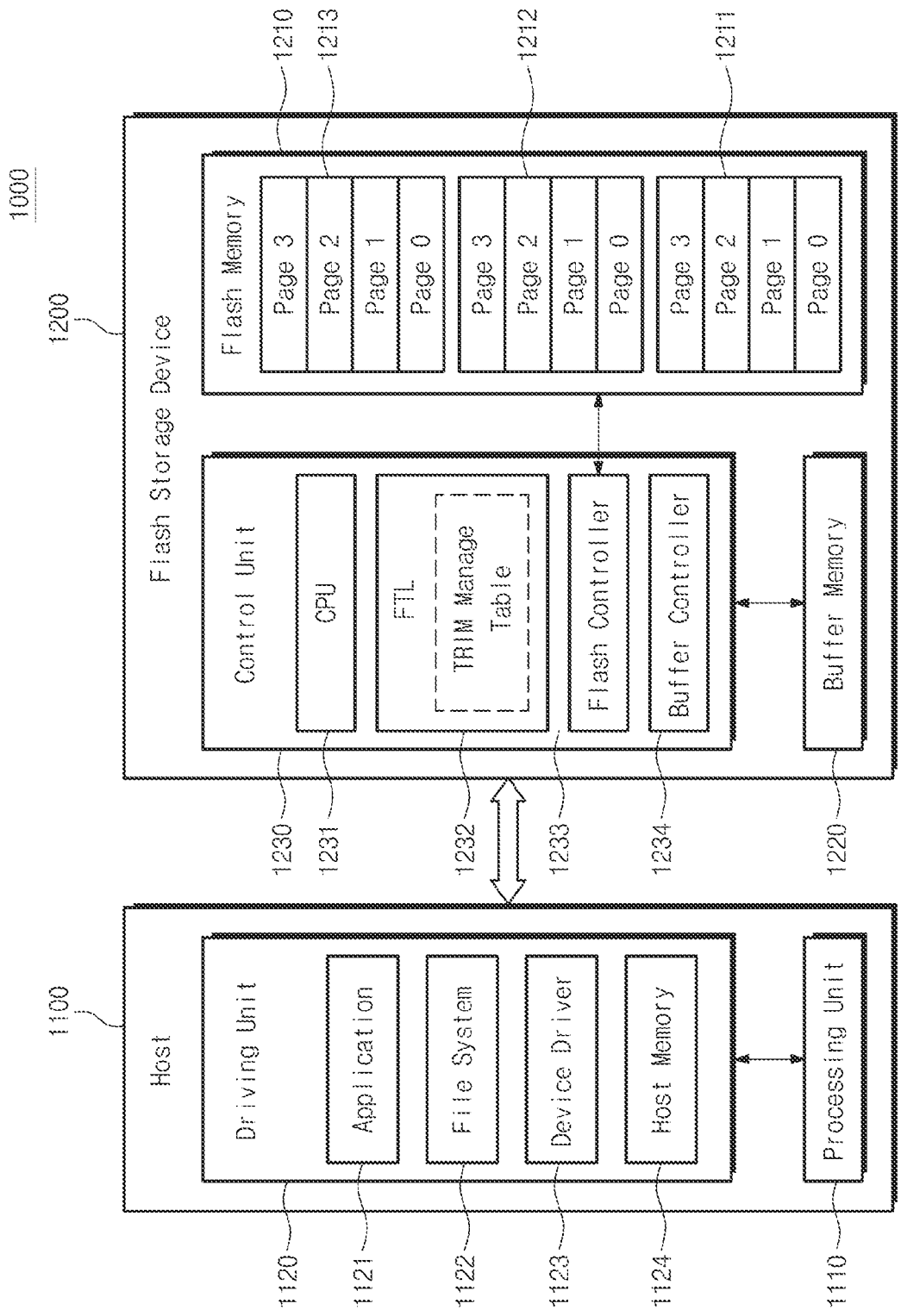
FIG. 4 is a block diagram illustrating a flash memory system according to an embodiment of the inventive concept.

FIG. 4 is a block diagram illustrating a flash memory system 1000 according to an exemplary embodiment of the inventive concept. In FIG. 4, a storage device 1200 is illustrated as an exemplary embodiment of the storage device 120 in FIG. 3.

Referring to FIG. 4, the flash memory system 1000 includes a host 1100 and a flash storage device 1200. In an exemplary embodiment, the host 1100 manages files by sector unit and the flash storage device 1200 manages data stored in the flash memory 1210 by page unit. The flash storage device 1200 gives attention to the management unit mismatch between the host 1100 and the flash storage device 1200 by utilizing a TRIM manage table of the Flash Translation Layer (FTL) 1232.

The host 1100 includes a processing unit 1110 and a driving unit 1120. The processing unit 1110 (for example, a Central Processing Unit (CPU)) controls the overall operation of the host 1100, and the driving unit 1120 drives the flash storage device 1200 according to the control of the processing unit 1110. The driving unit 1120 may be configured with a main memory for driving software programs of the host 1100.

The driving unit 1120 includes an application 1121, a file system 1122, a device driver 1123, and a host memory 1124. The application 1121 is an application software program that is executed on an Operating System (OS). For example, the application 1121 has been programmed to aid in the generating and deleting a file.

The file system 1122 manages a file managed by the host 1100. In an exemplary embodiment the file system 1122 manages a file, which is used in the host 1100, by sector unit in a hard disk., the sector being the smallest data management unit accessible by the application 1121, and, in an exemplary embodiment, has a size of 512 B (byte).

When the application 1121 requests the deletion of a specific file, the file system 1122 changes metadata of a file for which deletion has been requested. Subsequently, when the application 1121 accesses a corresponding file, the file system 1122 provides information indicating "a corresponding file has been deleted", on the basis of the changed metadata.

Data corresponding to a file, which is stored in the flash memory 1210 and for which deletion has been requested, is not deleted because the file system 1122 changes only metadata (for example, a file name, etc.) of a file. Accordingly, the processing unit 1110 provides a TRIM command to the flash storage device 1200, for substantially deleting data stored in the flash memory 1210. The file system 1122 and a directory entry structure thereof will be described below in more detail with reference to FIG. 5.

The device driver 1123 is a program that enables the flash storage device 1200 to communicate with the host 1100. To use the flash storage device 1200, the device driver 1123 suitable for the flash storage device 1200 is installed in the host 1100. The host memory 1124 may temporarily store data that is written/read in/from the flash storage device 1200. Also, the host memory 1124 may be used as a working memory for driving the application 1121, the file system 1122 and the device driver 1123.

In an embodiment of the inventive concept, the flash storage device 1200 receives a TRIM command from the host 1100. The TRIM command includes information (for example, a sector address of a file for which deletion has been requested) for designating an area that will be deleted. The flash storage device 1200 marks an area for which deletion has been requested among areas of the flash memory 1210, as invalid.

The flash storage device 1200 performs an erasing operation on the area marked as invalid, at an idle time (for example, an idle time of a control unit 1230 that is obtained when there is no request from the host).

Still referring to FIG. 4, the flash storage device 1200 includes a flash memory 1210, a buffer memory 1220, and the control unit 1230.

The flash memory 1210 performs an erasing operation, a reading operation or a writing operation according to the control of the control unit 1230. The flash memory 1210 is configured with a plurality of memory blocks. Each of the memory blocks is configured with a plurality of pages. As shown in the exemplary embodiment of FIG. 4, there are three memory blocks 1211, 1212, 1213, each memory block having four pages.

The size of each of the pages is greater than that of a sector. That is, the each page may be divided into a plurality of sectors. In an exemplary embodiment, each page may have a size of about 2 KB (byte), while the sector has a size of 512 B (byte). The flash memory 1210 performs an erasing operation by memory block unit, and performs a writing operation or a reading operation by page unit.

Data of one bit or more may be stored in one memory cell of the flash memory 1210. A memory cell storing 1-bit data is called a Single Level Cell (SLC) or a single bit cell. A memory cell storing data of 2 bits or more is called a Multi Level Cell (MLC), or a multi bit cell.

The buffer memory 1220 may temporarily store data that is read from the flash memory 1210 or is provided from the host 1100. Also, the buffer memory 1220 may be used to drive firmware such as an FTL. The buffer memory 1220 may be implemented by a dynamic random access memory (DRAM), a static random access memory (SRAM), a magnetoresistive random access memory (MRAM), and a phase-change random access memory (PRAM).

Referring still to FIG. 4, the control unit 1230 includes a CPU 1231, an FTL 1232, a flash controller 1233, and a buffer controller 1234. The CPU 1231 analyzes and processes a signal inputted from the host 1100. The CPU 1231 controls the overall operation of the flash storage device 1200.

The flash translation layer 1232 translates a logical address (LA) provided from the host 1100 into a physical address (PA) in the flash memory 1210. For example, the flash translation layer 1232 translates a sector address received from the host into a page address in the flash memory 1210.

Moreover, the FTL 1232, for example, manages data stored in the flash memory 1210 by page unit. When deletion for all data stored in a certain page is requested by a TRIM command from the host 1100, the FTL 1232 marks a corresponding page as invalid.

When deletion for only a portion of data stored in a certain page is requested by a TRIM command from the host 1100, the FTL 1232 marks a corresponding page of a mapping table as valid. In this case, the FTL 1232 may separately manage the corresponding page. For this, the FTL 1232 may include a TRIM manage table. The TRIM manage table manages a page where deletion for only a portion of data stored therein has been requested.

The TRIM manage table may be stored in the buffer memory 1220. In this case, the size of an area allocated to the TRIM manage table among areas of the buffer memory 1220 may be varied. For example, the size of an area allocated to the TRIM manage table may be limited to a certain size, for decreasing an overhead of the control unit 1230 based on page management.

When the size of an area allocated to the TRIM manage table is limited to a certain size, the size of information on a page managed by the TRIM manage table may exceed the size of an allocated area. In this case, information on a page of the TRIM manage table may be managed by a push scheme, wherein information of the oldest page among information regarding the page managed in the TRIM manage table may be deleted, and information of a newly-requested page may be managed.

The FTL 1232 and a page management method thereof will be described below in more detail with reference to FIGS. 7 to 11.

FIG. 5 illustrates an exemplary embodiment of a directory entry structure which is created for managing files by the file system 1122 of FIG. 4.

Referring to FIG. 5, the directory entry structure may include a file name, an extension, an attribute, a create date, a create time, information of a starting sector, and information of a file size.

When deletion for a specific file is requested by the application 1121 (see FIG. 4), the file system 1122 (see FIG. 4) changes metadata of the file for which deletion has been requested. For example, the file system 1122 arranges 'E5h' being a hexadecimal byte code in the file for which deletion has been requested. As another example, the file system 1122 changes an attribute value of the file, for which deletion has been requested, into '0xE5'. '0xE5' as one special label denotes "this file has been deleted". Subsequently, when the application 1121 accesses a corresponding file, the file system 1122 provides information indicating that the corresponding file has been already deleted. Information on the file system 1122 may be stored in a nonvolatile memory (for example, the flash memory 1210) periodically or with an idle time.

The file system 1122 may be chosen according to an OS of the flash memory system 1000 (see FIG. 4). For example, when the OS of the flash memory system 1000 is a disk OS (DOS) or a windows-based OS, a file system such as a File Allocation Table (FAT) file system, a virtual FAT (VFAT) file system, extended FAT (exFAT) file system, or a New Technology File System (NTFS) may be used.

According to an exemplary embodiment, when the OS of the flash memory device 1000 is a UNIX-based OS, a UNIX file system (UFS) may be used. When the OS of the flash memory device 1000 is a LINUX-based OS, a file system for LINUX may be used. When the OS of the flash memory device 1000 is a mobile OS, for example, an iOS operating system (i.e., an OS for iPhone/iPad and an android OS), a file system for mobile OS may be used. UNIX is a trademark of the industry standards consortium The Open Group. LINUX is a trademark of Linus Torvalds. iOS is a trademark of Cisco Systems. iPhone is a trademark under agreement between Cisco Systems and Apple Inc. iPad is a trademark of Apple, Inc.

Figure 6:
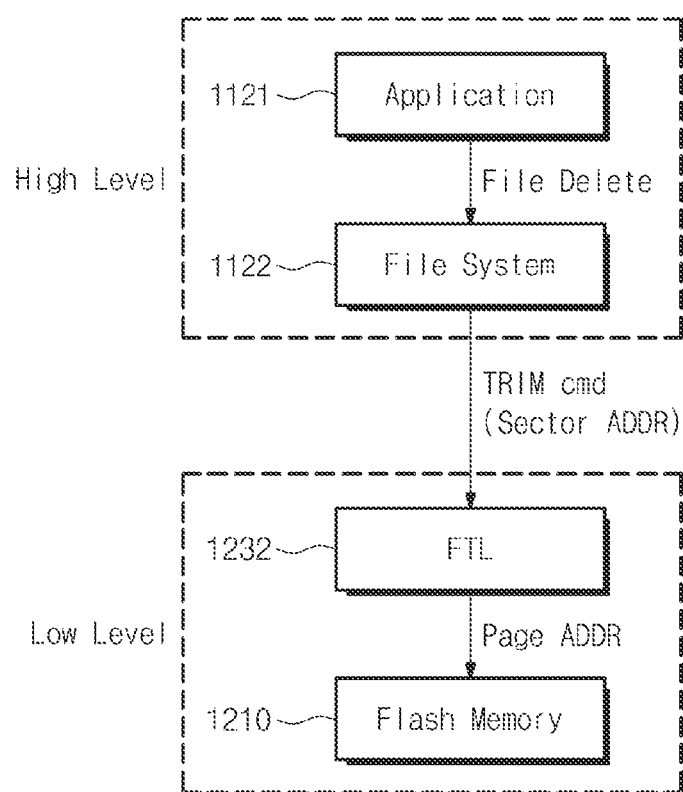
FIG. 6 is a block diagram illustrating a software hierarchical structure of the flash memory system in FIG. 4.

FIG. 6 is a block diagram illustrating a software hierarchical structure of the flash memory system 1000 in FIG. 4.

Referring to FIG. 6, the software hierarchical structure of the flash memory system 1000 is configured with the application 1121, the file system 1122, the FTL 1232, and the flash memory 1210. The application 1121 and file system 1122 of the host 1100 (see FIG. 4) may be referred to as a high level. The FTL 1232 and flash memory 1210 of the flash storage device 1200 (see FIG. 4) may be referred to as a low level.

The application 1121 transfers a file deletion request to the file system 1122. The file system 1122 changes metadata of the file for which deletion has been requested. For example, the file system 1122 arranges 'E5h' in the file name (see FIG. 5). Subsequently, when the application 1121 accesses a corresponding file, the file system 1122 provides information indicating that the corresponding file has been already deleted. The file deletion request from the application 1121 and the change of metadata of the file system 1122 by the request may be referred to as a deleting operation at a high level.

The file system 1122 provides a TRIM command to the FTL 1232, for substantially deleting data stored in the flash memory 1210. The TRIM command includes sector address information for designating a file for which deletion has been requested. The FTL 1232 translates a sector address into a page address, and marks a page of the flash memory 1210 that will be deleted, as invalid.

The flash memory 1210 performs an erasing operation on the page marked as invalid, at an idle time. For example, the idle time denotes a time when there is no request from the host 1100 (see FIG. 4) to the control unit 1230 (see FIG. 4). As is well known, since the flash memory 1210 performs an erasing operation by block unit, an erasing operation for a page of the flash memory 1210 may accompany the copy and merging of data, and a block erasing operation. The marking operation of the FTL 1232 and the erasing operation of the flash memory 1210 may be referred to as a deleting operation at a low level.

Figure 7:
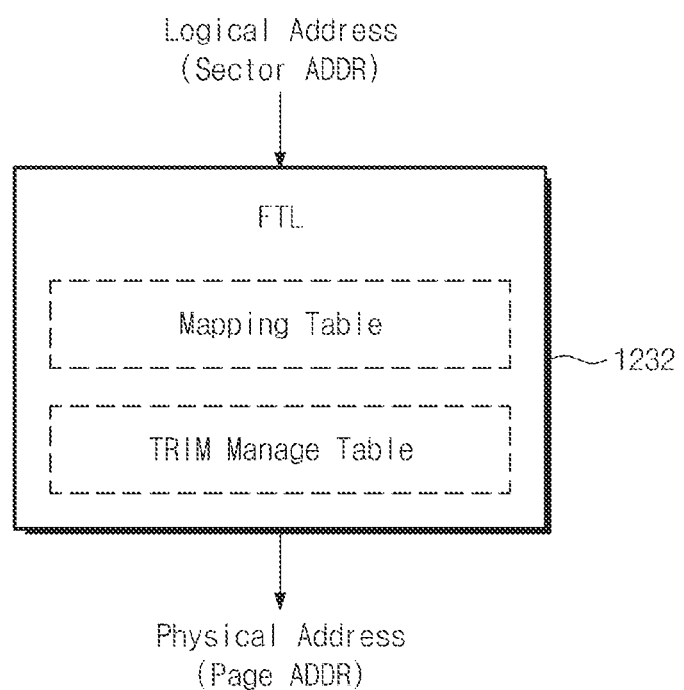
FIG. 7 is a block diagram illustrating in detail an address translating operation of a flash translation layer.

FIG. 7 is a block diagram illustrating in detail an address translating operation of the FTL 1232.

Referring to FIG. 7, the FTL 1232 receives a sector address that is a logical address, and translates the sector address into a page address that is a physical address in the flash memory 1210.

The address translation of the FTL 1232 may be performed with a mapping table. A mapping scheme is typically categorized into a page mapping scheme and a block mapping scheme. The page mapping scheme performs address translation by page unit (for example, 2 KB), and the block mapping scheme performs address translation by block unit (for example, 1 MB).

When seen from the application 1121 or the file system 1122 corresponding to a high level, the address translation of the FTL 1232 allows reading, writing and erasing operations performed in the flash memory 1210 to be shown as reading and erasing operations of the hard disk. That is, the FTL 1232 performs an emulating function.

Still referring to FIG. 7, the FTL 1232 may include a TRIM manage table. When deletion for only a portion of data stored in a page has been requested, the TRIM manage table separately manages a corresponding page. A deleting operation at a low level using the mapping table and the TRIM manage table will be described below in more detail with reference to FIGS. 9 to 11.

Figure 8:
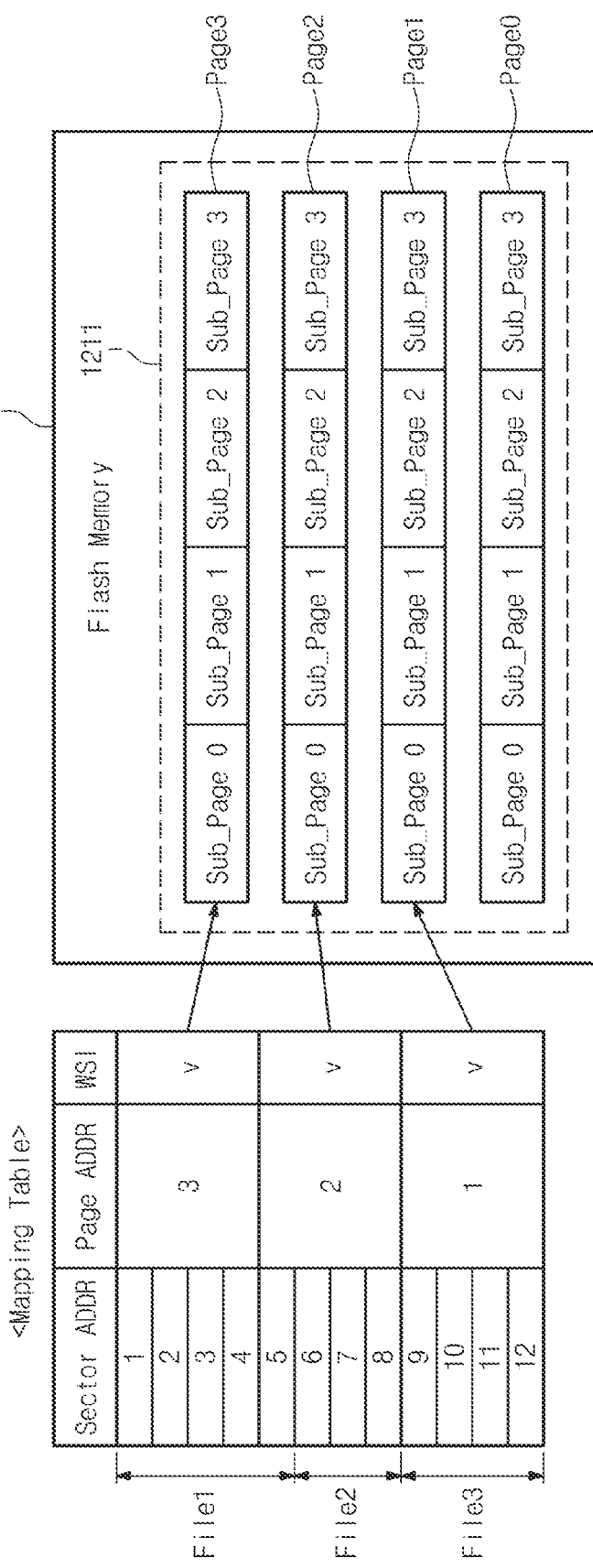
FIG. 8 is a block diagram illustrating an exemplary embodiment of an address translation with a mapping table.

FIG. 8 is a block diagram that illustrates an exemplary embodiment of an address translation with a mapping table. In FIG. 8, in accordance with an exemplary embodiment address translation is performed in the page mapping scheme.

Referring to FIG. 8, the mapping table maps a sector address that is a logical address to a page address that is a physical address. In accordance with an exemplary embodiment four sectors are mapped to one page. For example, as illustrated in FIG. 8, first to fourth sectors (sector1 to sector4) are mapped to a page 3.

The mapping table shows whether data stored as a page is valid data, with Writing State Information (WSI). For example, a mark 'v' in the WSI indicates that the data stored in the page is valid data.

In an exemplary embodiment each of pages (page0 to page3) in the block 1211 of the flash memory 1210 is divided into four sub-pages (sub-page0 to sub-page3). In accordance with an exemplary embodiment each sub-page and each sector are the same in size, each sub-page corresponding to each sector. For example, as illustrated in FIG. 8, in accordance with an exemplary embodiment the third page (page3) is divided into four sub-pages (sub-page0 to sub-page3), each of which corresponds to the first to fourth sectors (sector1 to sector4).

Figure 9:
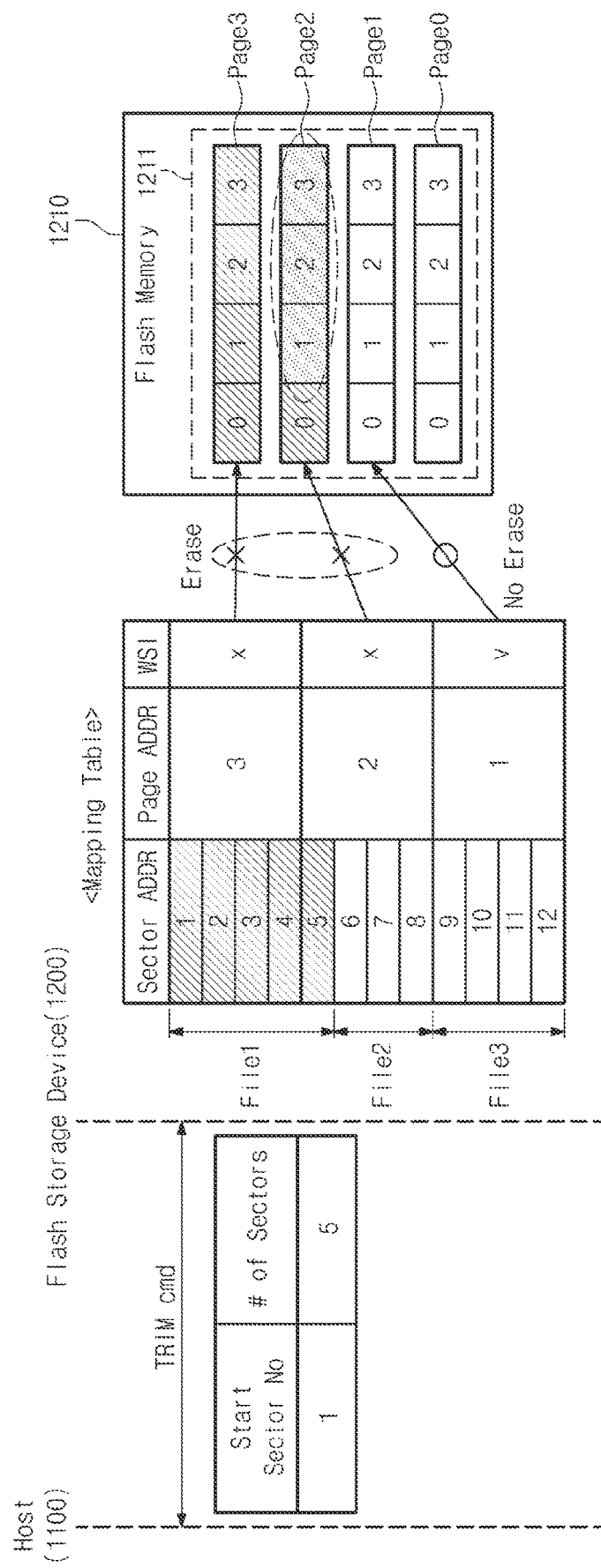
FIG. 9 is a diagram illustrating an embodiment of the inventive concept which processes a TRIM command using only a mapping table without a TRIM manage table.
Figure 10:
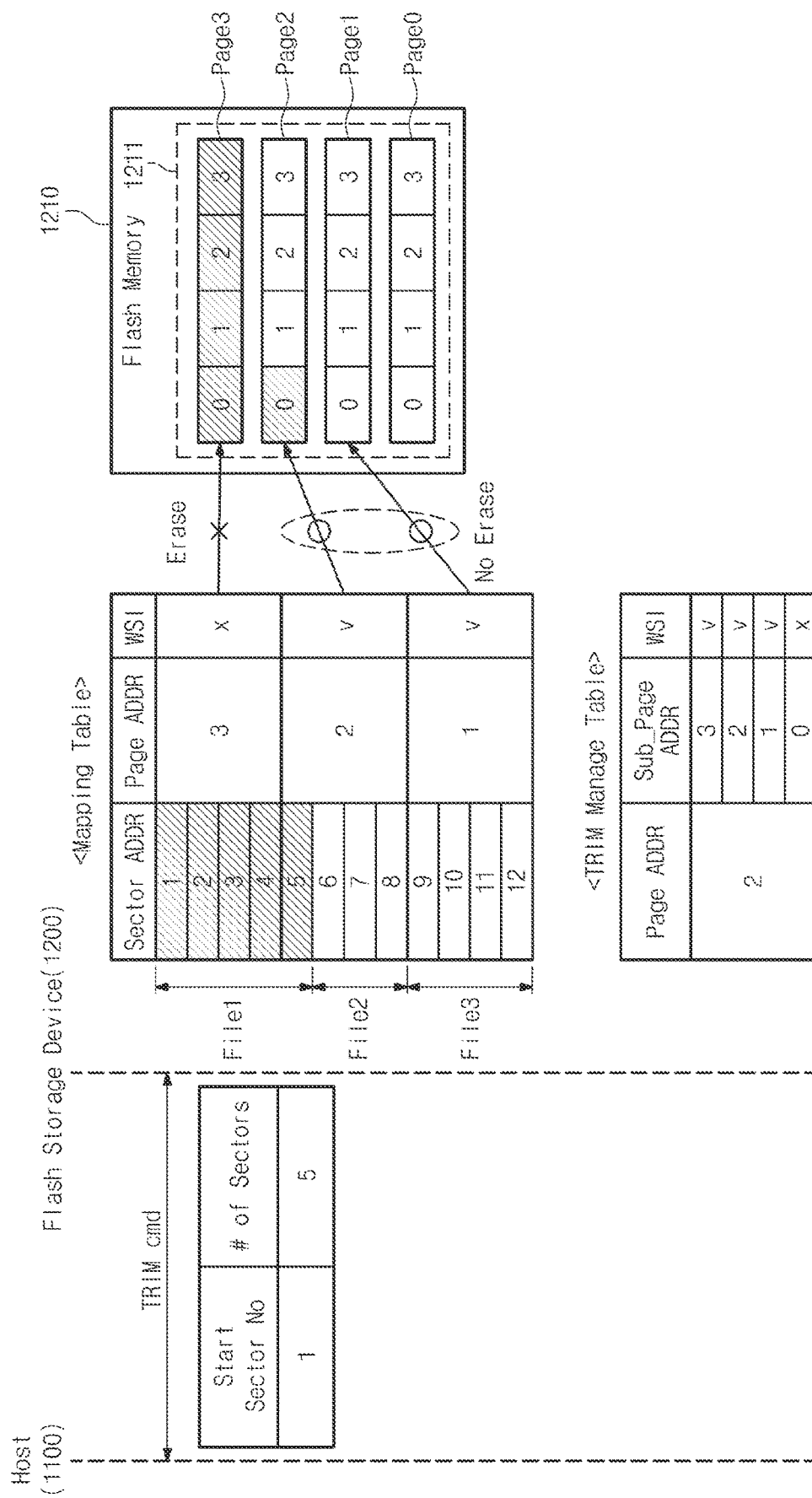
FIGS. 10 and 11 are diagrams illustrating an embodiment of the inventive concept which processes a TRIM command using a mapping table and a TRIM manage table.
Figure 11:
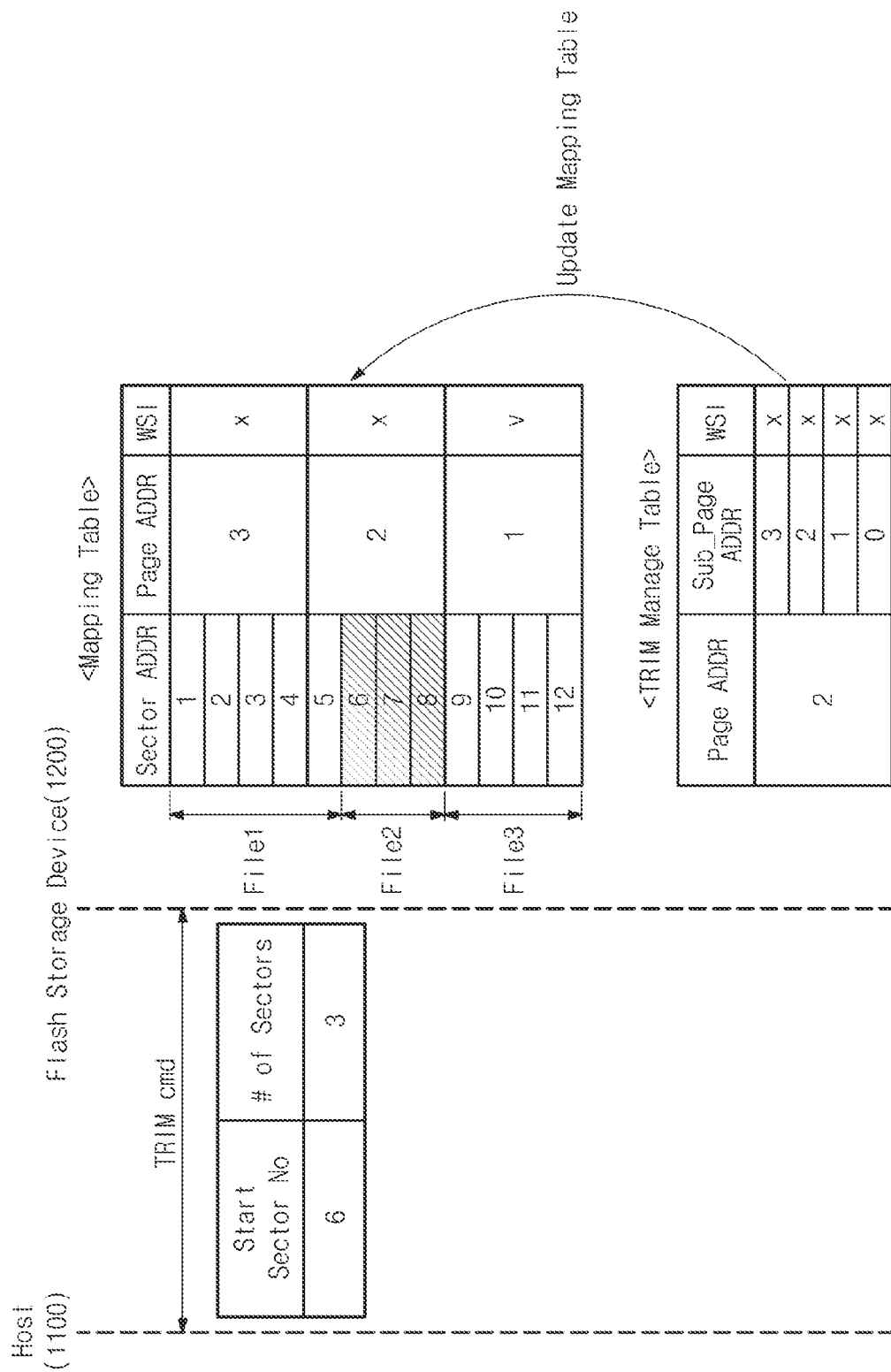

In FIGS. 9 to 11, and was illustrated in FIG. 8, in the exemplary embodiment three files (file1 to file3) as valid data are stored in the first to third pages (page0 to page3) of the block 1211.

FIG. 9 is a diagram illustrating an embodiment of the inventive concept which processes a TRIM command using only a mapping table without a TRIM manage table. In accordance with an exemplary embodiment, a TRIM command including address information of the first file (file1) in FIG. 8 is provided. That is, the deletion for the first file (file1) is requested at a low level.

Referring to FIG. 9, a TRIM command is provided from the host 1100. The TRIM command includes a sector address of a file that will be deleted. Information on the sector address may be provided as a start sector number and the number of sectors. For example, since the first file (file1) corresponds to first to fifth sectors (sector1 to sector5), the start sector number may be 1 and the number of sectors may be 5.

When the TRIM command is provided from the host 1100, the FTL 1232 (see FIG. 4) updates the WSI of a mapping table. That is, the WSI of a page corresponding to a received sector address is marked as invalid. In an exemplary embodiment a mark 'x' in the WSI of FIG. 9 denotes that data stored in a corresponding page is invalid data.

In FIG. 9, a first file (file1) corresponds to first to fifth sectors (sector1 to sector5). In this case, since the first to fourth sectors (sector1 to sector4) of the first file (file1) correspond to a third page (page3), the WSI regarding the third page (page3) of the mapping table is marked as invalid. Also, since the fifth sector (sector5) of the first file (file1) correspond to a second page (page2), the WSI of the second page (page2) is marked as invalid. An erasing operation for the second and third pages (page2 and page3) marked as invalid, for example, is performed during the idle time of the control unit 1230 (see FIG. 4).

Data corresponding to the fifth sector (sector5) of the first file (file5) is stored in a sub-page (0) of the second page (page2), and data corresponding to sixth to eighth sectors (sector6 to sector8) of the second file (file2) are stored in sub-pages (1 to 3) of the second page (page2).

Therefore, when the second page (page2) is updated as invalid according to a TRIM command for the first file (file1), valid data of the second file (file2) may be deleted together. To prevent data of the second file (file2) from being deleted, the flash memory 1210 copies data, which are stored in the sub-pages (1 to 3) of the second page (page2), to another page (for example, a page of the other block 1212 (see FIG. 4)).

Such copy operation may shorten the service life of the flash memory 1210 due to the increase in the number of writing times. Also, a new page that stores valid data generated by the copy operation may increase a merging operation for generating a free block. Therefore, the flash storage device 1200 according to an exemplary embodiment of the inventive concept separately manages the second page (page2) with a TRIM manage table. This will be described below in more detail with reference to FIGS. 10 and 11.

FIGS. 10 and 11 are diagrams illustrating an embodiment of the inventive concept which processes a TRIM command using a mapping table and a TRIM manage table. As in FIG. 9, in accordance with an exemplary embodiment a TRIM command including address information of the first file (filet) is provided.

Referring to FIG. 10, the flash storage device 1200 processes a TRIM command from the host 1100 by using the mapping table and the TRIM manage table. The mapping table manages a corresponding page when a sector address received from the host 1100 matches with a page unit of the flash memory 1210. The TRIM manage table manages a corresponding page when a sector address received from the host 1100 is mismatched with a page unit of the flash memory 1210.

A TRIM command including a sector address of the first file (filet) is provided to the flash storage device 1200. In this case, first to fourth sectors (sector1 to sector4) of the first file (filet) match with a page unit of the flash memory 1210. That is, the first to fourth sectors (sector1 to sector4) match with a third page (page3). Therefore, the FTL 1232 (see FIG. 4) updates the WSI regarding the third page (page3) of the mapping table, as invalid.

A fifth sector (sector5) of the first file (file1) is mismatched with the page unit of the flash memory 1210. That is, the fifth sector (sector5) corresponds to only a sub-page (0) of sub-pages (1 to 3) in the second page (page2). In other words, only data stored in the sub-page (0) among data stored in the sub-pages (1 to 3) of the second page (page2) is invalid data.

In this case, the FTL 1232 maintains the WSI regarding the second page (page2) of the mapping table as being valid. Therefore, an erasing operation for the second page (page2) marked as valid is not performed at an idle time (for example, an idle time of the control unit 1230), only an erasing operation for the third page (page3) marked as invalid is performed. The second page (page2) is separately managed with the TRIM manage table.

The TRIM manage table separately manages the second page (page2). That is, the TRIM manage table manages a corresponding page when a sector address received from the host 1100 is mismatched with the page unit of the flash memory 1210. In other words, the TRIM manage table manages a page including a portion of invalid data among pages.

Still referring to FIG. 10, for example, since the fifth sector (sector5) corresponds to the sub-page (0) of the second page (page2), data stored in the sub-page (0) of the second page (page2) is invalid data. Therefore, the TRIM manage table marks the WSI of the sub-page (0) among the sub-pages (0 to 3) of the second page (page2), as invalid.

When all sub-pages of a page managed by the TRIM manage table are updated as invalid, the FTL 1232 updates a corresponding page of the mapping table as invalid. In this case, information of the corresponding page is deleted from the TRIM manage table. This will be described below in more detail with reference to FIG. 11.

In FIG. 11, in accordance with an exemplary embodiment a TRIM command including the sector address of the second file (file2) is provided to the flash storage device 1200. That is, in accordance with an exemplary embodiment a deletion request for the second file (file2) is provided at a low level.

In this case, since the second file (file2) corresponds to the sixth to eighth sectors (sector6 to sector8), a start sector number may be 6 and the number of sectors may be 3.

When a TRIM command for the second file (file2) is provided, the sixth to eighth sectors (sector6 to sector8) of the second file (file2) are mismatched with the page unit of the flash memory 1210. That is, the sixth to eighth sectors (sector6 to sector8) correspond to only the sub-pages (1 to 3) among the sub-pages (0 to 3) of the second page (page2). Therefore, the FTL 1232 maintains the second page (page2) of the mapping table as valid. In this case, the second page (page2) is separately managed by the TRIM manage table.

Since the sixth to eighth sectors (sector6 to sector8) of the second file (file2) correspond to the sub-pages (1 to 3) of the second page (page2), the TRIM manage table updates the WSI regarding the sub-pages (1 to 3) of the second page (page2), as invalid. In this case, data stored in the sub-page (0) of the second page (page2) has already been putted in an invalid state according to a TRIM command for the first file (file1). Therefore, all data stored in the second page (page2) are putted in an invalid state according to a TRIM command for the first and second files (file1 and file2).

Since all the data stored in the second page (page2) are in the invalid state, the FTL 1232 updates the WSI regarding the second page (page2) of the mapping table, as invalid. Therefore, an erasing operation for the second page (page2) is performed at a subsequent idle time (for example, the idle time of the control unit 1230). However, information of the second page (page2) is deleted from the TRIM manage table.

As described above, the mapping table maintains the WSI of a page including a portion of invalid data as being valid. Therefore, an operation for copying valid data stored in a corresponding page to a page of another block is not performed. This denotes that a merging operation due to the copy operation of valid data may be prevented.

In this case, the TRIM manage table manages a page including a portion of invalid data. When all data that are stored in a page managed by the TRIM manage table are in an invalid state, the WSI of the mapping table for a corresponding page is updated as invalid. Therefore, the flash memory 1210 may perform an erasing operation at a low level only for a sector address matching with a page unit among sector addresses received from the host 1100.

The size of a memory allocated to the TRIM manage table among the buffer memory 1220 (see FIG. 4) may be chosen to be restricted. In this case, the size of information regarding a page address managed in the TRIM manage table may not exceed a size allocated to the buffer memory 1220.

When the size of information regarding a page managed in the TRIM manage table exceeds a size allocated to the buffer memory 1220, the size of information regarding the page managed in the TRIM manage table may be managed by a push scheme.

For example, in accordance with an exemplary embodiment information of the first to third pages (page1 to page3) is managed in the TRIM manage table. Moreover, information of a fourth page (page4) belonging to another block is required to be managed in the TRIM manage table, and when information of the fourth page (page4) is managed, in accordance with an exemplary embodiment the size of information regarding a page managed in the TRIM manage table exceeds the size of area allocated to the TRIM manage table. In this case, the FTL 1232 may delete information of the oldest first page from the TRIM manage table, and manage information of the fourth page (page4) in the TRIM manage table.

Figure 12:
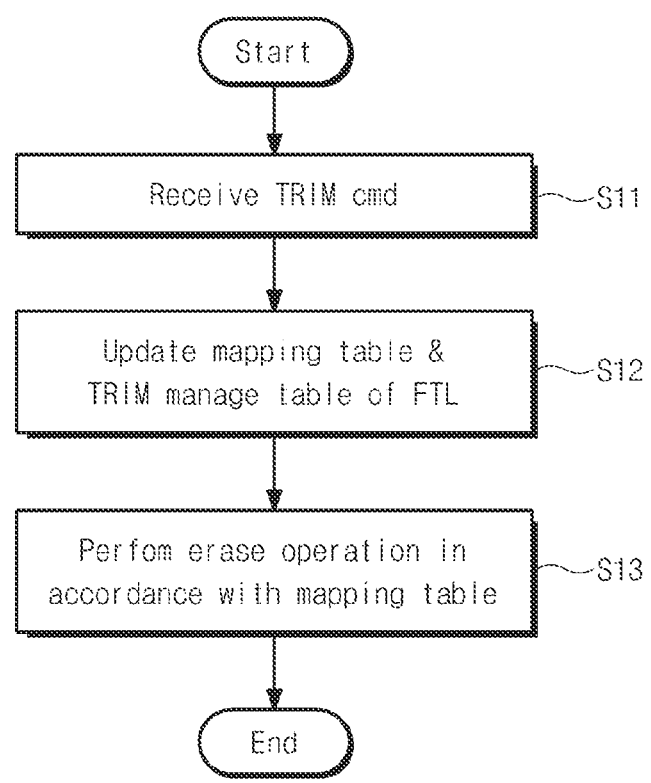
FIG. 12 is a flowchart illustrating an erasing operation of a flash storage device of FIG. 4 at a low level.

FIG. 12 is a flowchart illustrating an erasing operation of the flash storage device 1200 of FIG. 4 at a low level.

In operation S11, the host 1100 (see FIG. 4) provides the TRIM command to the flash storage device 1200. The TRIM command includes information (for example, sector address information) designating an area, where an erasing operation will be performed, among areas of the flash memory 1210 (see FIG. 4).

In operation S12, the mapping table and TRIM manage table of the FTL 1232 (see FIG. 4) are updated. For example, when a sector address received from the host 1100 matches with the page unit of the flash memory 1210, the WSI of the mapping table for a corresponding page is marked as invalid. As another example, when the sector address received from the host 1100 is mismatched with the page unit of the flash memory 1210, the WSI of the mapping table for a corresponding page is marked as valid, and the corresponding page is managed by the TRIM manage table.

In operation S13, an erasing operation in accordance with the mapping table is performed. That is, when the WSI of the mapping table is in an invalid state, an erasing operation for a corresponding page is performed. As is well known, the erasing operation of the flash memory 1210 is performed by block unit, and thus the flash memory 1210 may accompany a copy and/or merging operation for a corresponding page.

Figure 13:
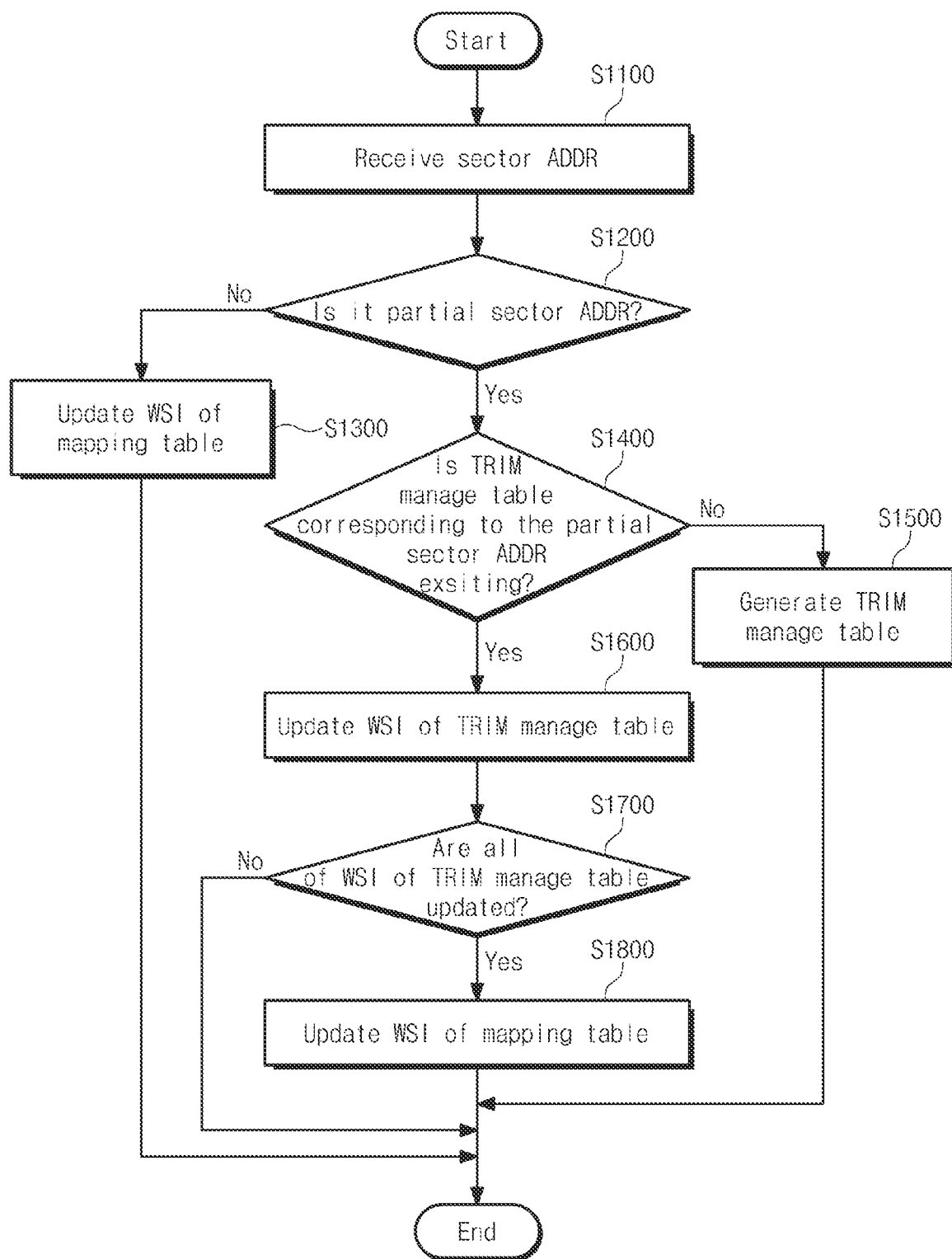
FIG. 13 is a flowchart illustrating an operation of a flash translation layer when a deleting operation is performed at a low level.

FIG. 13 is a flowchart illustrating an operation of the FTL 1232 (see FIG. 4) when a deleting operation is performed at a low level.

In operation S1100, a sector address of a file that will be deleted is transferred to the FTL 1232. For example, the sector address is provided a start sector number and the number of sectors.

In operation S1200, a determination is made as to whether the transferred sector address is a partial sector address. Herein, the partial sector address denotes a sector address that is mismatched with the page unit of the flash memory 1210 (see FIG. 4).

When the transferred sector address is not the partial sector address (i.e., the transferred sector address matches with a page unit), the FTL 1232 updates the WSI of the mapping table in operation S1300. That is, the WSI of a page corresponding to the transferred sector address is updated as invalid. When the transferred sector address is the partial sector address (i.e., the transferred sector address matches with the page unit), operation S1400 is performed.

In operation S1400, a determination is made as to whether a TRIM manage table corresponding to the partial sector address exists. When the TRIM manage table does not exist, the FTL 1232 creates a TRIM manage table that manages a page corresponding to the partial sector address in operation S1500.

When the TRIM manage table exists, the FTL 1232 updates WSI of the TRIM manage table in operation S1600. That is, WSI of a sub-page corresponding to the partial sector address is updated as invalid.

In operation S1700, a determination is made as to whether all WSI of the TRIM manage table is updated. That is, all WSI regarding sub-pages of a certain page is updated as invalid is determined. When all the WSI is updated as invalid, the FTL 1232 updates WSI of the mapping table in operation S1800. That is, the WSI of the mapping table corresponding to a corresponding page is updated as invalid.

As described above, the flash memory system 1000 according to an embodiment of the inventive concept aids a TRIM operation. That is, when deletion for a certain file is requested, the host 1100 changes metadata of the file system 1122 and notifies a user of that a corresponding file has been deleted, and a substantial deleting operation is performed in the flash storage device 1200 according to the TRIM command In this case, the flash storage device 1200 solves management unit mismatch between the host 1100 and the flash storage device 1200, with the TRIM manage table. Therefore, the flash storage device 1200 can prevent a copy operation of data stored in a page that occurs due to management unit mismatch. As a result, the service life of the flash storage device 1200 and reduction in performance can be prevented.

As described above, in accordance with an exemplary embodiment data of the files (file1 to file3) are stored in the page of the flash memory 1210. When the flash storage device 1200 does not aid a flush operation, the data of the files (file1 to file3) may be stored in the buffer memory 1220 (see FIG. 4). Hereinafter, when the flash storage device 1200 aids the flush operation, a processing method of a TRIM command according to an exemplary embodiment of the inventive concept will be described in detail.

III. Flash Storage Device Aiding Flush Function

An operation, where all or a portion of data stored in the sectors of a buffer memory are respectively written in the pages of a flash memory, is typically referred to as a flush operation.

Figure 14:
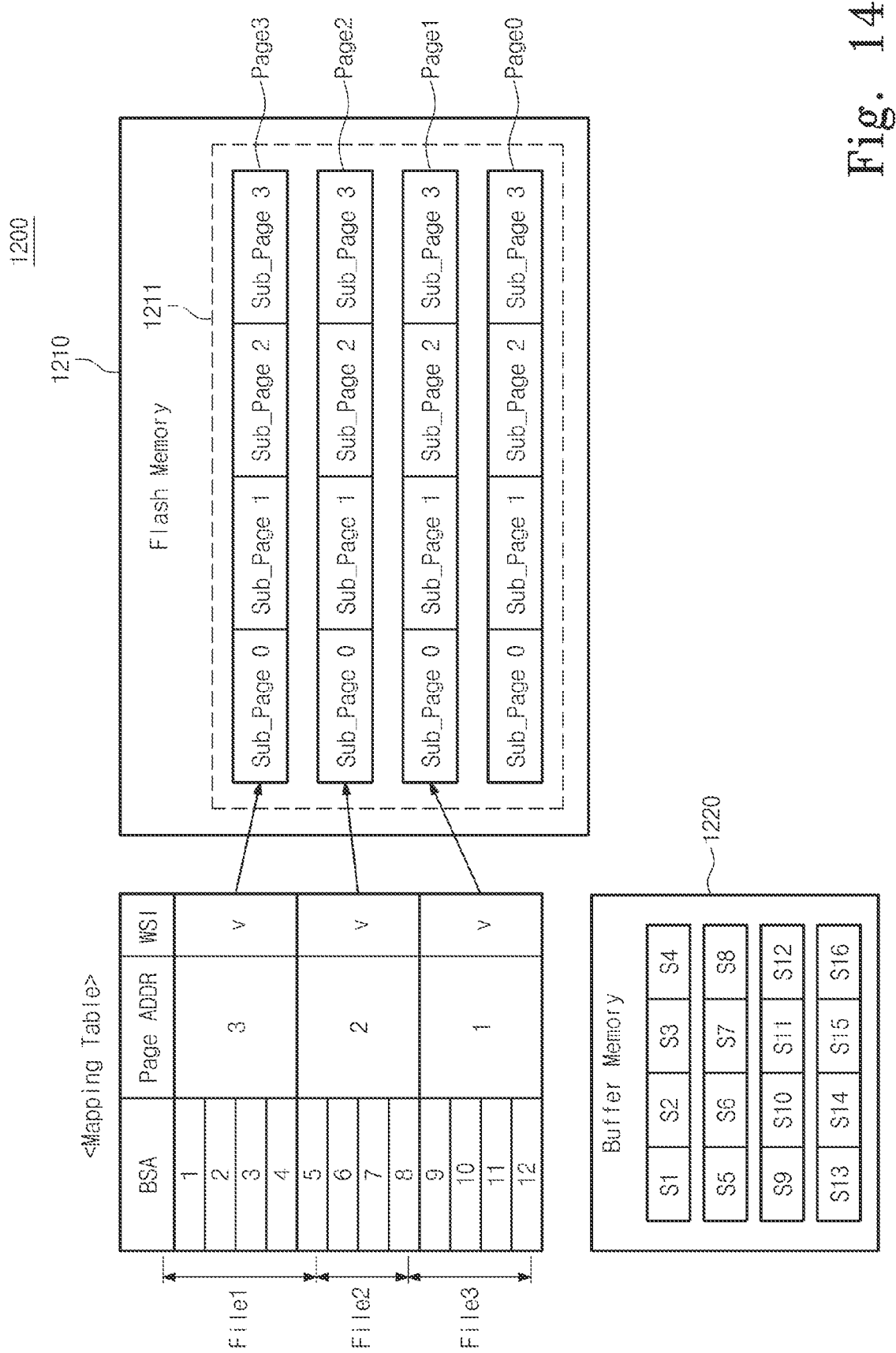
FIGS. 14 to 16 are diagrams for describing a TRIM command processing method of a flash storage device when the flash storage device aids a flush function.
Figure 15:
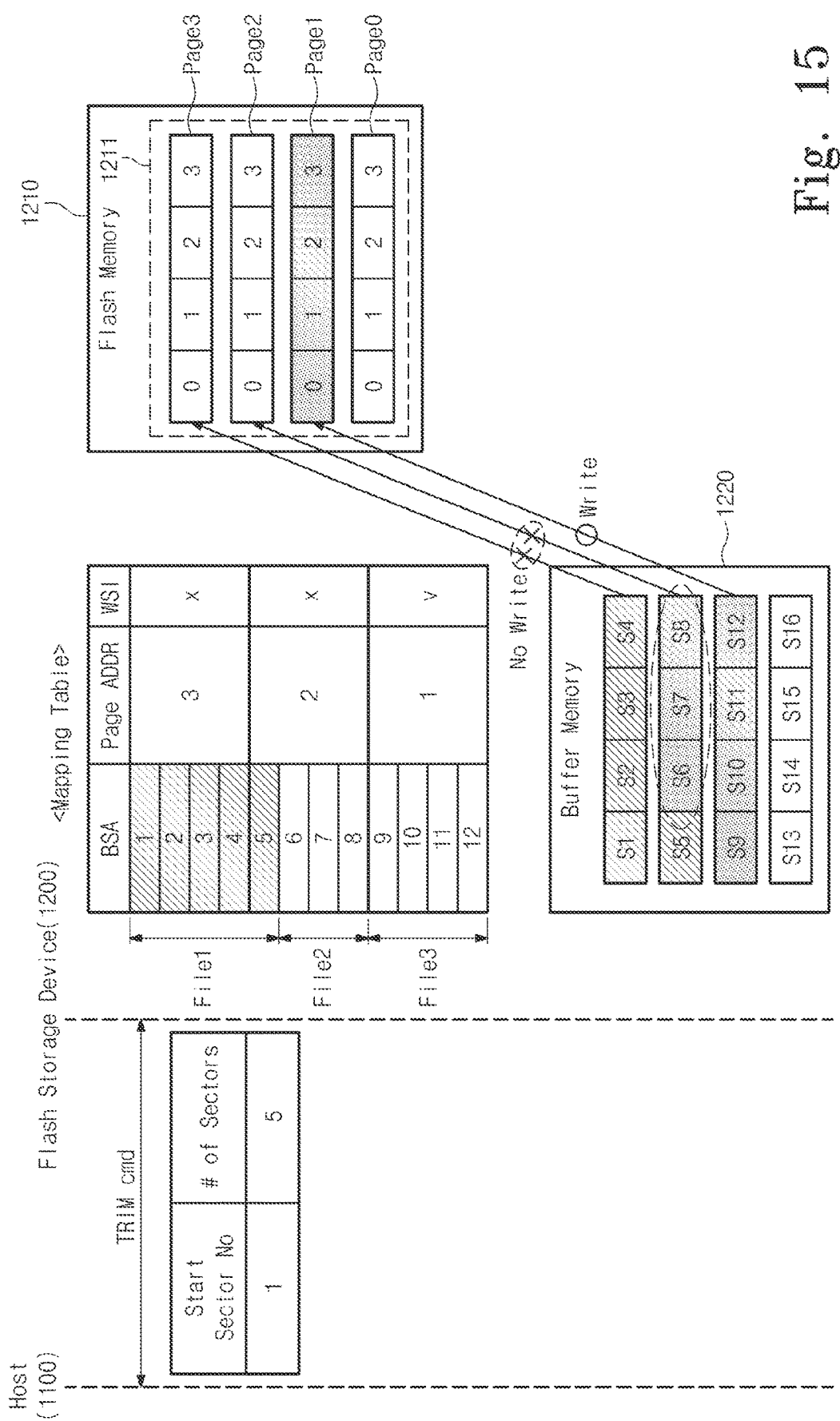
Figure 16:
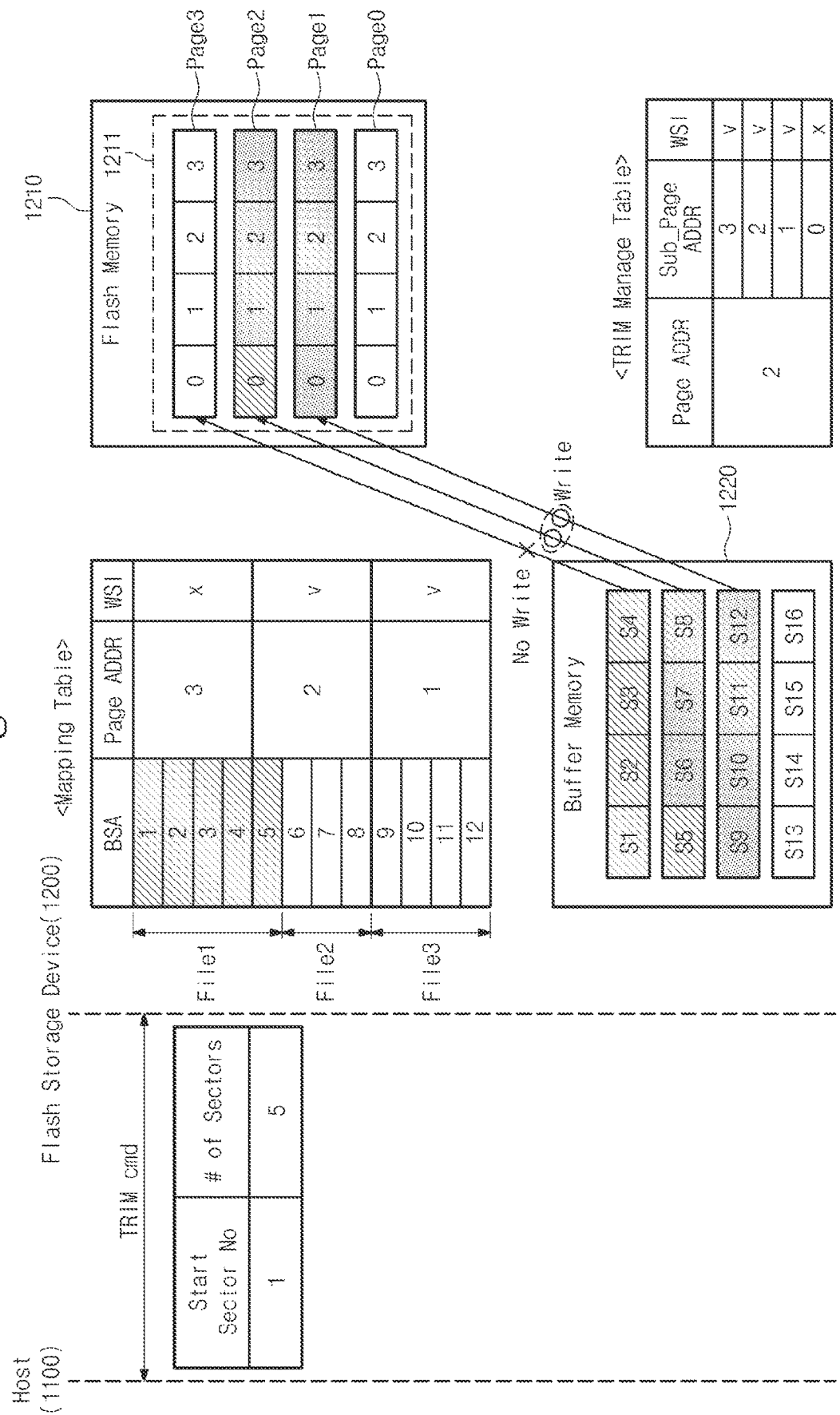

FIGS. 14 to 16 are diagrams for describing a TRIM command processing method of a flash storage device when the flash storage device aids a flush function. Except for supporting of a flush operation, a flash storage device that will be described below is similar to the flash storage device 1200 of FIG. 4. Hereinafter, therefore, like reference numerals refer to like elements.

FIG. 14 is a diagram showing address translation between the buffer memory 1220 and the flash memory 1210 with the mapping table. In accordance with an exemplary embodiment the size of each sector of the buffer memory 1220 is the same as that of a sector of a management unit of the file system 1122 (see FIG. 4).

Referring to FIG. 14, the buffer memory 1220 includes a plurality of sectors. The sectors of the buffer memory 1220 store data temporarily. The data stored in the sectors of the buffer memory 1220 are respectively written in the pages of the block 1211 of the flash memory 1210 according to the control of the control unit 1230 (see FIG. 5). An operation, where all or a portion of data stored in the sectors of the buffer memory 1220 are respectively written in the pages of the flash memory 1210, may be referred to as a flush operation.

For example, all or a portion of data stored in the sectors of the buffer memory 1220 may be respectively written in the pages of the flash memory 1210 when the free space of the buffer memory 1220 is insufficient. As another example, all or a portion of data stored in the sectors of the buffer memory 1220 may be respectively written in the pages of the flash memory 1210 at an idle time (which is a time that is obtained when there is no request from the host 1100) of the control unit 1230 (see FIG. 4).

Each of the pages (page0 to page3) of the block 1211 of the flash memory 1210 is divided into four sub-pages (sub-page0 to sub-page3). In accordance with an exemplary embodiment the size of each sub-page of the flash memory 1210 is the same as that of the sector of the buffer memory 1220. That is, in accordance with an exemplary embodiment four sectors correspond to one page.

The mapping table maps the sector address of the buffer memory 1220 to the page address of the flash memory 1210. A sign 'BSA' of the mapping table in FIG. 14 denotes the sector address of the buffer memory 1220. For example, the first to fourth sectors (sector S1 to sector S4) of the buffer memory 1220 are mapped to the third page (page3) of the flash memory 1210. In accordance with an exemplary embodiment three files (file1 to file3) are stored in the sectors S1 to S12 of the buffer memory 1220, as valid data.

When a TRIM command is provided from the host 1100, the flash storage device 1200 according to an embodiment of the inventive concept invalidates that data of a file for which deletion has been requested which is written from the buffer memory 1220 to the flash memory 1210. That is, the flash storage device 1200 updates the WSI of the mapping table, and thus prevents data stored in the buffer memory 1220 from being written in the flash memory 1210.

An operation that prevents data from being written from the buffer memory 1220 to the flash memory 1210 may be referred to as an unwriting operation. In this case, address information included in the TRIM command designates an area to be unwritten. Therefore, the TRIM command may be referred to as an unwrite command Embodiments of the inventive concept that performs the unwriting operation will be described below in more detail with reference to FIGS. 15 and 16.

FIG. 15 is a diagram illustrating an embodiment of the inventive concept which processes a TRIM command using only a mapping table without a TRIM manage table. In accordance with an exemplary embodiment a TRIM command including sector address information of a first file (file1) is provided. Also, in accordance with an exemplary embodiment a sector address provided from the host 1100 is equal to a sector address of the buffer memory 1220.

Referring to FIG. 15, the TRIM command is provided from the host 1100. The TRIM command includes a sector address of a file to be deleted. Information regarding the sector address may be provided as a start sector number and the number of sectors. For example, since data of the first file (filet) are stored in first to fifth sectors (sector1 to sector5) of the buffer memory 1220, the start sector number may be 1, and the number of sectors may be 5.

When the TRIM command is provided from the host 1100, the FTL 1232 (see FIG. 4) updates the WSI of the mapping table. That is, the FTL 1232 marks the WSI of a page corresponding to the sectors of the buffer memory 1220 for which unwriting has been requested, as invalid. For example, since the data of the first file (filet) are stored in the first to fifth sectors (sector1 to sector5) of the buffer memory 1220, the FTL 1232 marks the WSI of a mapping table corresponding to the first to fifth sectors (sector1 to sector5) as invalid.

In this case, the first to fourth sectors S1 to S4 of the buffer memory 1220 correspond to a third page (page3), and the fifth sector S5 corresponds to a second page (page2). Therefore, the WSI regarding the second and third pages (page2 and page3) of the mapping table is marked as invalid. A flush operation is not subsequently performed for the second and third pages (page2 and page3) marked as invalid. That is, data stored in first to eighth sectors S1 to S8 of the buffer memory 1220 are not written in the second and third pages (page2 and page3) of the flash memory 1210.

Data of a second file (file2) are stored in the sixth to eighth sectors S6 to S8 of the buffer memory 1220. Therefore, when the second page (page2) is marked as invalid according to a TRIM command for the first file (file1), valid data of the second file (file2) may not be written in the flash memory 1210. This denotes that the data of the second file (file2) may be lost when the buffer memory 1220 is a volatile memory (for example, DRAM).

The flash storage device 1200 according to exemplary embodiment of the inventive concept separately manages the second page (page2) with a TRIM manage table. This will be described below in more detail with reference to FIG. 16.

FIG. 16 is a diagram illustrating an embodiment of the inventive concept which processes a TRIM command using only a mapping table and a TRIM manage table. As in FIG. 15, in accordance with an exemplary embodiment provided is a TRIM command including address information of a first file (file1).

Referring to FIG. 16, the flash storage device 1200 processes a TRIM command from the host 1100 with a mapping table and a TRIM manage table.

A TRIM command including a sector address of a first file (file1) is provided to the flash storage device 1200. That is, an unwrite command for data stored in the first to fifth sectors (sector1 to sector5) of the buffer memory 1220 is provided to the flash storage device 1200.

In this case, the first to fourth sectors S1 to S4 match with the page unit of the flash memory 1210. That is, the first to fourth sectors S1 to S4 match with the third page (page3). Therefore, the FTL 1232 (see FIG. 4) updates the WSI regarding the third page (page3) of the mapping table, as invalid.

The fifth sector S5 is mismatched with the page unit of the flash memory 1210. That is, the fifth sector S5 corresponds only to the sub-page (0) among the sub-pages (0 to 3) of the second page (page2). In this case, the FTL 1232 maintains the WSI regarding the second page (page2) of the mapping table, as valid. Therefore, data that are stored in the fifth to eighth sectors S5 to S8 marked as valid are written in the second page (page2) during an idle time. Since the second page (page2) includes a portion of invalid data, the TRIM manage table separately manages the second page (page2).

Still referring to FIG. 16, the TRIM manage table manages the second page and the sub-pages of the second page. That is, since data stored in the sub-page (0) among the sub-pages (0 to 3) of the second page (page2) is invalid data, the TRIM manage table marks the WSI of the sub-page (0) as invalid.

A TRIM command for the second file (file2) may be provided before a flush operation is performed on data stored in the first to fourth sectors S1 to S4. Referring to FIG. 14, the second file (file2) is stored in the sixth to eighth sectors S6 to S8 of the buffer memory 1220, and the sixth to eighth sectors S6 to S8 correspond to the sub-pages (1 to 3) of the second page (page2).

Therefore, when a TRIM command for the second file (file2) is provided, the sub-pages (0 to 3) of the second page (page2) in the TRIM manage table are updated as invalid. At this point, the FTL 1232 updates the WSI regarding the second page (page2) of the mapping table, as invalid. As a result, when a flush operation is performed subsequently, data stored in the first to eighth sectors S1 to S8 may not be written in the flash memory 1210.

Figure 17:
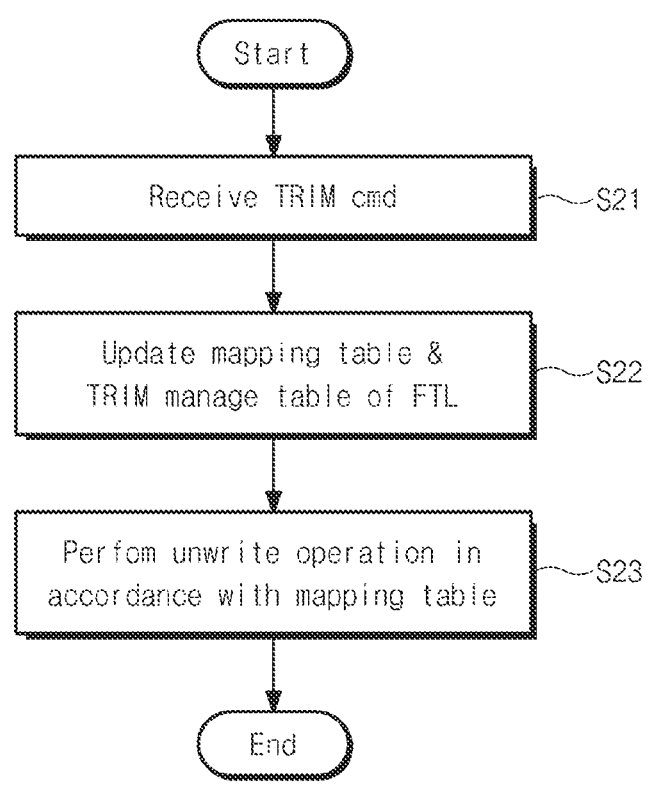
FIG. 17 is a flowchart illustrating an unwriting operation of a flash storage device according to an embodiment of the inventive concept.

FIG. 17 is a flowchart illustrating an unwriting operation of the flash storage device 1200 according to an embodiment of the inventive concept.

In operation S21, a TRIM command is provided from the host 1100 to the flash storage device 1200. The TRIM command includes address information of a sector that will not be written in the flash memory 1210 among the sectors of the buffer memory 1220. Therefore, the TRIM command may be referred to as an unwrite command.

In operation S22, the mapping table and TRIM manage table of the FTL 1232 is updated. For example, when a sector address included in the TRIM command matches with the page unit of the flash memory 1210, the WSI of a mapping table for a corresponding page is marked as invalid. As another example, when a sector address included in the TRIM command is mismatched with the page unit of the flash memory 1210, the WSI of the mapping table for the corresponding page is marked as valid, and the corresponding page is managed by the TRIM manage table.

In operation S23, an unwriting operation based on the mapping table is performed. That is, when the WSI of the mapping table is in an invalid state, data stored in sectors of a corresponding buffer memory are not written in the page of the flash memory 1210. The WSI of the mapping table and TRIM manage table being updated is similar to the description of FIG. 13, and thus its detailed description will not be provided.

As described above, the flash memory system 1000 according to an embodiment of the inventive concept aids the unwriting operation. In this case, the flash storage device 1200 solves management unit mismatch between the host 1100 and the flash storage device 1200 by using the TRIM manage table. Accordingly, the flash storage device 1200 can prevent the valid data of the buffer memory 1220 from being unwritten due to management unit mismatch.

The flash storage device 1200 may receive a plurality of TRIM commands from the host 1100 with a time difference. In this case, the flash storage device 1200 may collect the TRIM commands and process the collected TRIM commands at one time for an idle time. This will be described below in more detail with reference to FIGS. 18 to 20.

IV. Flash Storage Device Collecting TRIM Commands

Figure 18:
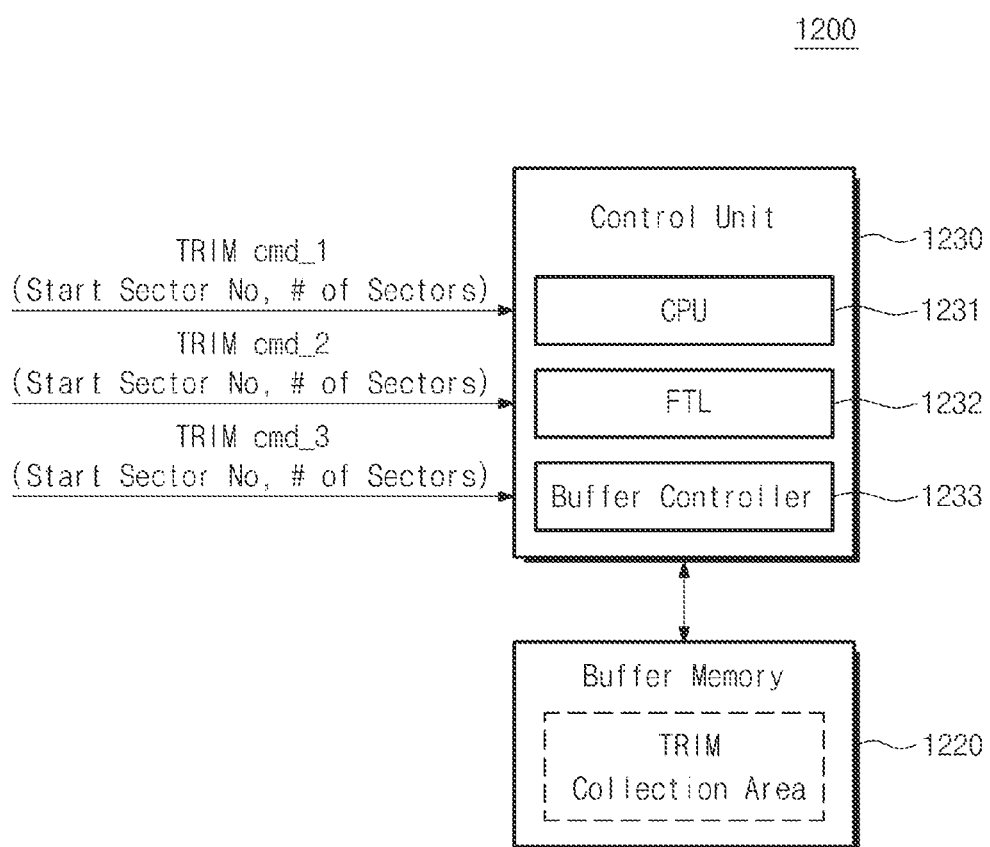
FIGS. 18 to 20 are diagrams for describing a flash storage device which collects TRIM commands provided at different times and processes the collected TRIM commands at one time.
Figure 19:
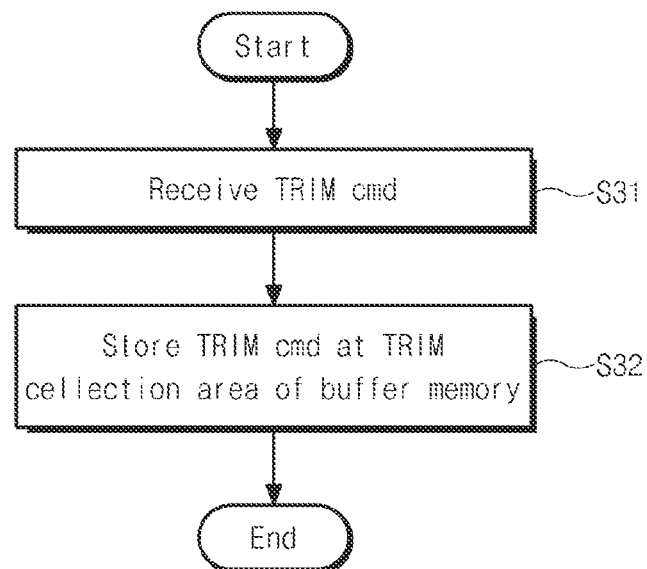
Figure 20:
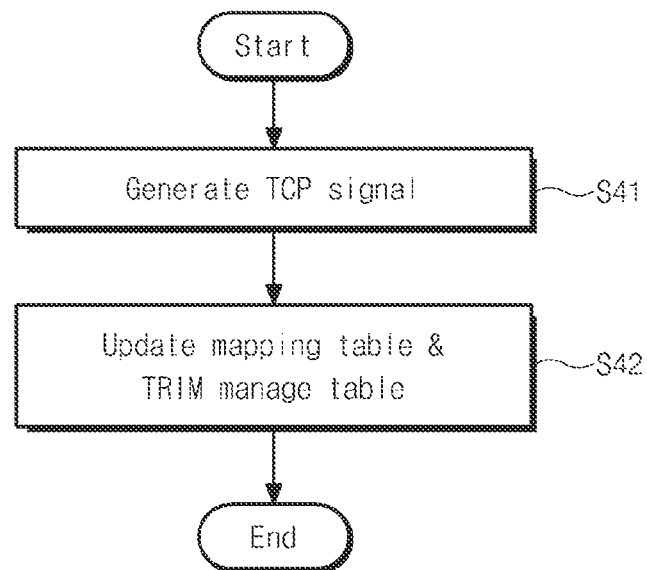

FIGS. 18 to 20 are diagrams for describing a flash storage device which collects TRIM commands provided at different times and processes the collected TRIM commands at one time. Except for the collection of the TRIM commands, a flash storage device that will be described below is similar to the flash storage device 1200 of FIG. 4. Therefore, the following description will focus on a difference with the flash memory device 1200 of FIG. 4. Also, like reference numerals refer to like elements.

Referring to FIG. 18, first to third TRIM commands TRIM cmd_1, TRIM cmd_2, TRIM cmd_3 are provided to the control unit 1230 of the flash storage device 1200. In accordance with an exemplary embodiment the first to third TRIM commands TRIM cmd_1, TRIM cmd_2, TRIM cmd_3 are provided to the control unit 1230 at different times.

The buffer memory 1220 includes a TRIM collection area for collecting provided TRIM commands. The control unit 1230 temporarily stores the first to third TRIM commands TRIM cmd_1, TRIM cmd_2, TRIM cmd_3 in the TRIM collection area of the buffer memory 1220, and thereafter processes the first to third TRIM commands TRIM cmd_1, TRIM cmd_2, TRIM cmd_3 that have been collected at the idle time of the control unit 1230 (for example, a time when there is no request from the host 1100).

The CPU 1231 of the control unit 1230 analyzes a received command. When the received command is a TRIM command, the CPU 1231 transfers information (for example, start sector number) included in the TRIM command and the number of sectors to the buffer controller 1234. The buffer controller 1234 stores information, which is included in the TRIM command, in the TRIM collection area of the buffer memory 1220. Subsequently, the flash storage device 1232 updates a mapping table and a TRIM manage table at an idle time, on the basis of the information stored in the TRIM collection area.

FIG. 19 is a flowchart illustrating an operation of storing a plurality of TRIM commands in a buffer memory.

In operation S31, the control unit 1230 (see FIG. 18) receives a TRIM command TRIM cmd. In operation S32, the control unit 1230 stores information of the received TRIM command in the TRIM collection area of the buffer memory 1220. Subsequently, when another TRIM command is received, the control unit 1230 continuously stores information, which is included in the TRIM command, in the TRIM collection area.

FIG. 20 is a flowchart illustrating an operation of processing collected TRIM commands at an idle time.

In operation S41, a TRIM command processing signal (TCP) is generated. For example, when there is no command from the host 1100 (see FIG. 4) for a certain time, the CPU 1231 of the control unit 1230 generates the TRIM command processing signal (TCP).

In operation S42, a mapping table and a TRIM manage table are updated. For example, the FTL 1232 (see FIG. 4) requests information collected in a TRIM collection area to the buffer controller 1234 (see FIG. 4), in response to the TRIM command processing signal (TCP).

The buffer controller 1234 transfers information regarding TRIM commands, which are collected in the TRIM collection area of the buffer memory 1220, to the FTL 1232. The FTL 1232 updates the mapping table and the TRIM manage table on the basis of the transferred information. The WSI of the mapping table and TRIM manage table being updated is similar to the description of FIG. 13, and thus its detailed description will not be provided.

As described above, the flash storage device 1200 according to an embodiment of the inventive concept may collect information of TRIM commands in the buffer memory 1220, and process the collected information at one time for an idle time.

In FIGS. 4 to 20, it has been assumed that the flash storage device 1200 includes one flash memory. However, this is merely an example, and the inventive concept is not limited thereto. For example, the flash storage device 1200 may include a plurality of flash memories. In FIGS. 21 to 25, a flash storage device including a plurality of flash memories will be described below in more detail.

V. Flash Storage Device Having a Plurality of Flash Memories

FIGS. 21 to 25 are diagrams for describing a TRIM command processing method of a flash storage device when the flash storage device includes multiple flash memories. A flash storage device that will be described below is similar to the flash storage device 1200 of FIGS. 4 and 18. Therefore, the following description will be focused on a difference with the flash memory device 1200 of FIGS. 4 and 18. Also, like reference numerals refer to like elements.

A flash storage device 1200 may include a plurality of flash memories. Also, as described above with reference to FIG. 18, the flash storage device 1200 may collect information of TRIM commands. The flash storage device 1200 according to an embodiment of the inventive concept may reset the order of the collected TRIM commands, and process the TRIM commands according to the reset order. Accordingly, the flash storage device 1200 may process the TRIM commands in parallel to the flash memories.

Figure 21:
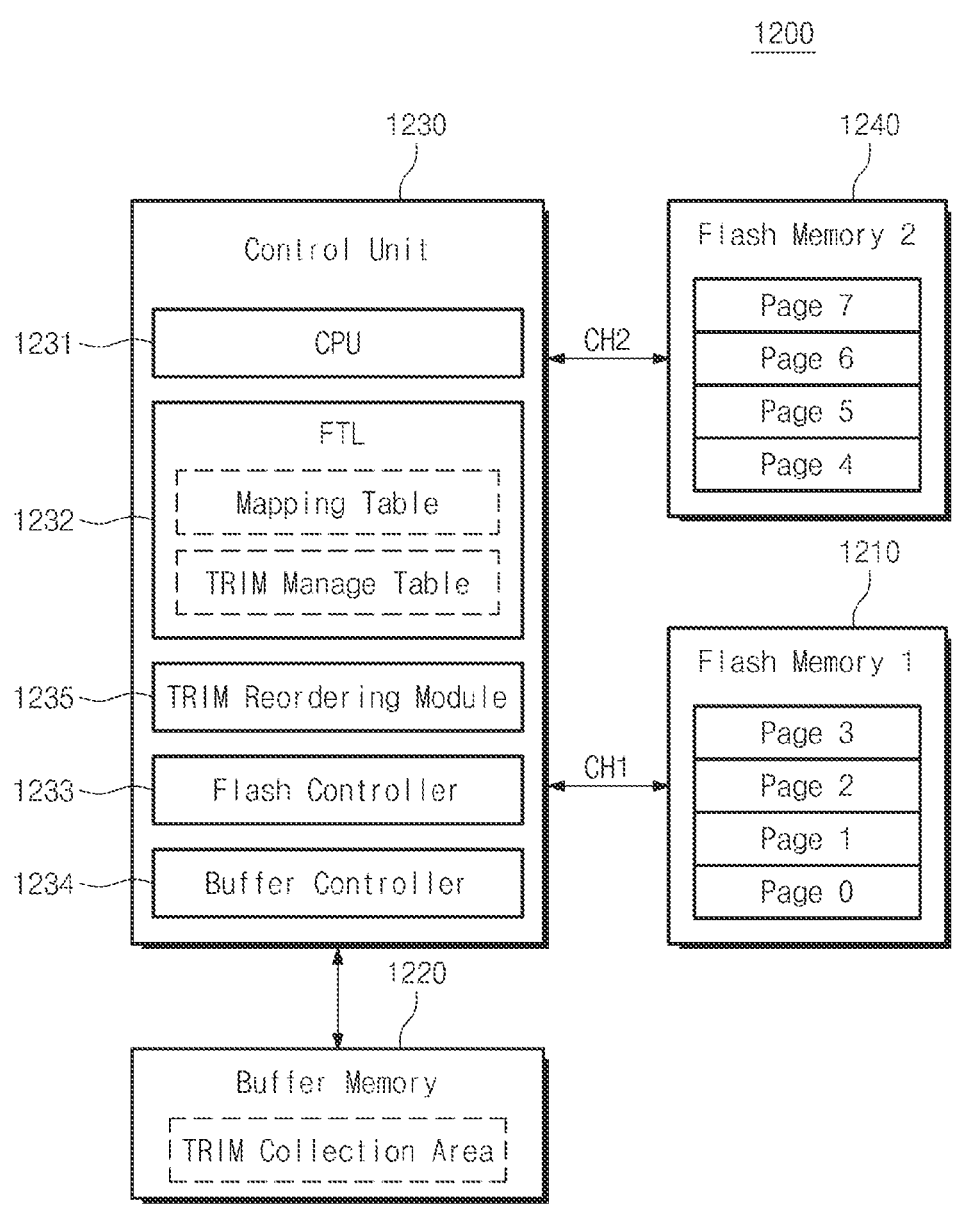
FIGS. 21 to 25 are diagrams for describing a TRIM command processing method of a flash storage device when the flash storage device includes a plurality of flash memories.

FIG. 21 is a diagram that illustrates an exemplary embodiment of the flash storage device 1200 having a plurality of flash memories. In FIG. 21, in an exemplary embodiment, in accordance with an exemplary embodiment the flash storage device 1200 includes two flash memories 1210, 1240.

Referring to FIG. 21, the first flash memory 1210 is connected to a control unit 1230 through a first channel CH1, and the second flash memory 1240 is connected to the control unit 1230 through a second channel CH2. In accordance with an exemplary embodiment each of the flash memories includes four pages.

The buffer memory 1220, as described above with reference to FIG. 18, includes a TRIM collection area. Information of a plurality of TRIM commands is stored in the TRIM collection area. That is, when the TRIM commands are provided, the control unit 1230 stores the information of the TRIM commands in the TRIM collection area. This has been described above in detail with reference to FIGS. 18 to 20, and thus detailed description will not be provided.

The control unit 1230 includes a TRIM reordering module 1235. The TRIM reordering module 1235 resets the processing order of the TRIM commands stored in the TRIM collection area. That is, the TRIM reordering module 1235 controls the processing order of the TRIM commands stored in the TRIM collection area such as the TRIM commands will be executed in parallel to the first and second flash memories 1210, 1240. By resetting the processing order of the TRIM commands, the flash storage device 1200 can shorten the time taken in processing of the TRIM commands.

The control unit 1230 includes a CPU 1231, a FTL 1232, a flash controller 1233, and a buffer controller 1234. This has been described above in detail with reference to FIG. 4, and thus detailed description will not be provided.

Figure 22:
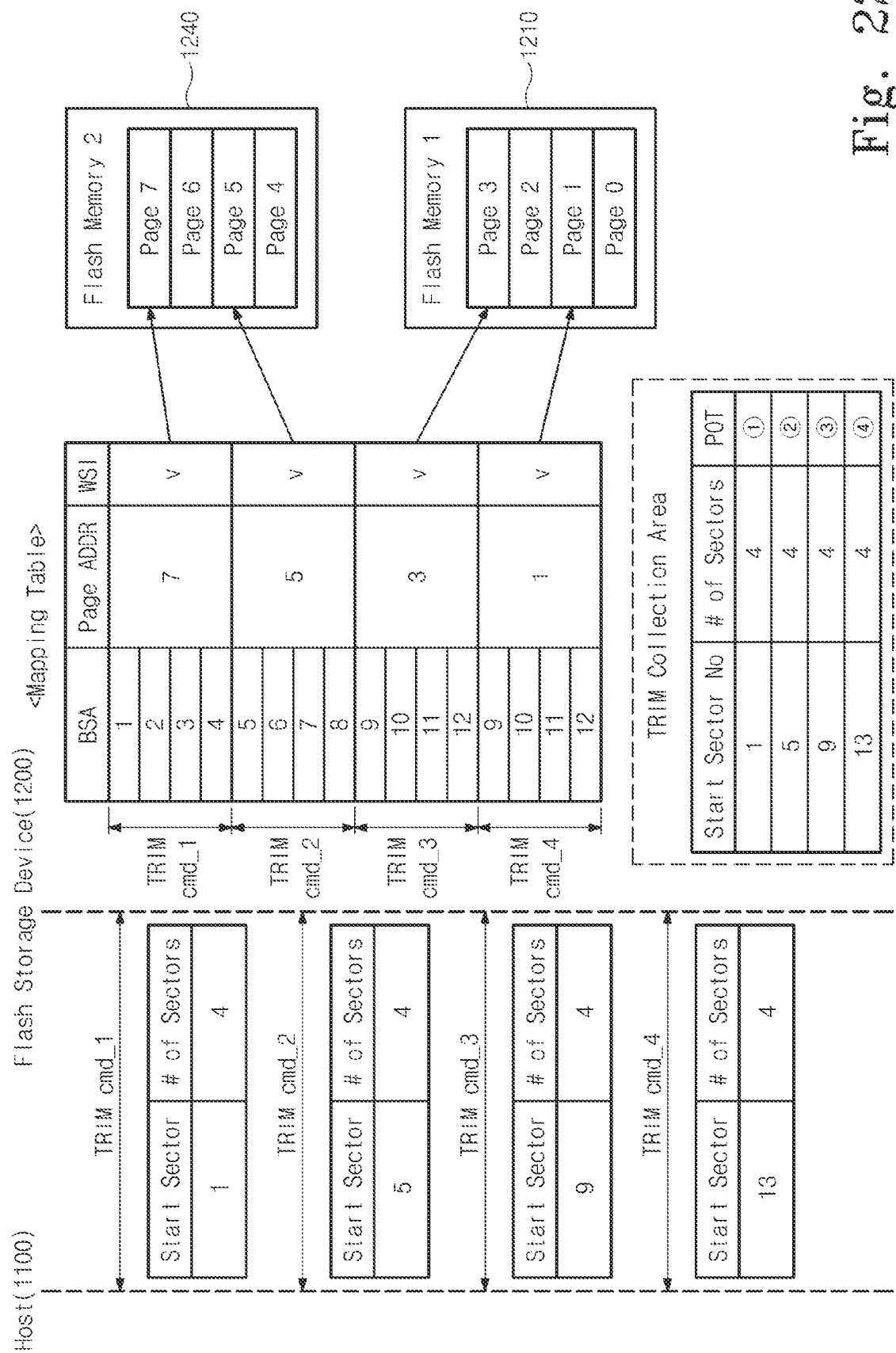
Figures 23, 24:
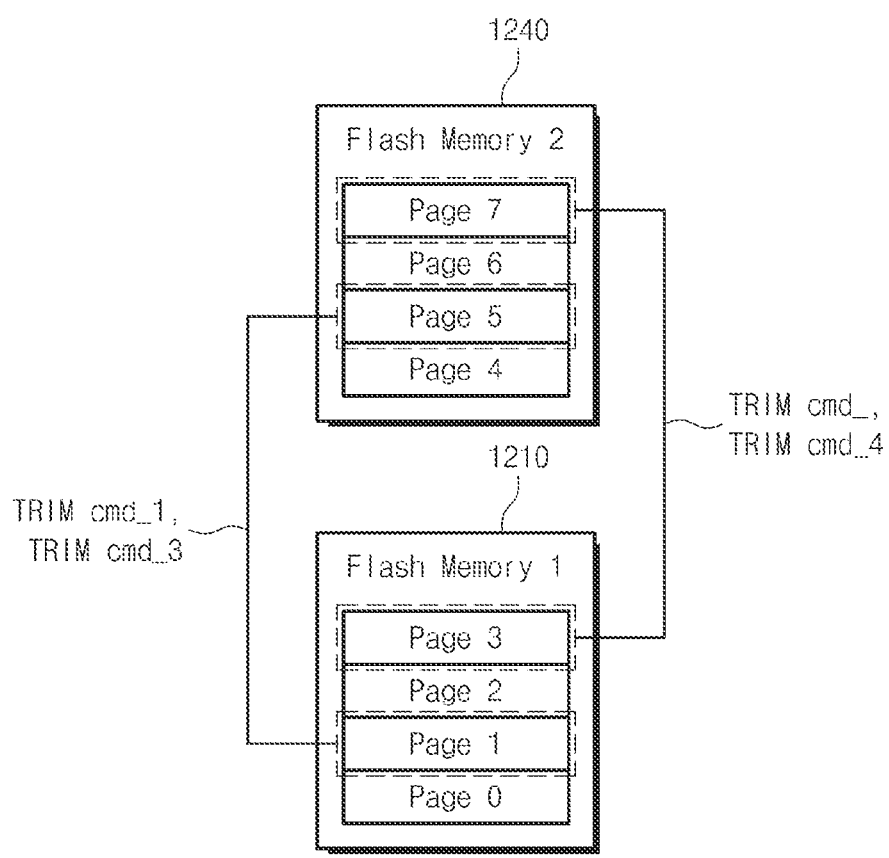

FIGS. 22 to 24 are diagrams for describing reordering of TRIM commands and for parallel processing of the TRIM commands. In accordance with an exemplary embodiment the first to fourth TRIM commands TRIM cmd_1, TRIM cmd_2, TRIM cmd_3, TRIM cmd_4 are sequentially provided. Also, in accordance with an exemplary embodiment a sector address included in each of the TRIM commands matches with a page unit of a flash memory.

Referring to FIG. 22, information (for example, a start sector number and the number of sectors) included in the first to fourth TRIM commands TRIM cmd_1, TRIM cmd_2, TRIM cmd_3, TRIM cmd_4 is stored in the TRIM collection area of the buffer memory 1220. In this case, the processing order of the TRIM commands is stored in the TRIM collection area together. As illustrated in FIG. 22, in accordance with an exemplary embodiment the initial processing order of the TRIM commands is an order in which the TRIM commands are provided.

Still referring to FIG. 22, the first and second TRIM commands TRIM cmd_1, TRIM cmd_2 correspond to pages (page7 and page5) of the second flash memory 1240, and the third and fourth TRIM commands TRIM cmd_3, TRIM cmd_4 correspond to pages (page3 and page1) of the first flash memory 1210. Therefore, when the first to fourth TRIM commands TRIM cmd_1, TRIM cmd_2, TRIM cmd_3, TRIM cmd_4 are sequentially provided, the first and second TRIM commands TRIM cmd_1, TRIM cmd_2 for the second flash memory 1240 are processed, and thereafter, the third and fourth TRIM commands TRIM cmd_3, TRIM cmd_4 for the first flash memory 1210 are processed.

The processing of the TRIM commands may degrade performance of the flash storage device 1200. For example, while the second flash memory 1240 is performing an erasing operation on the fifth and seventh pages (page5 and page7), the first flash memory 1210 may not perform any operation. This denotes that a TRIM processing time is extended. To prevent the inefficiency in TRIM command processing, the flash storage device 1200 according to an embodiment of the inventive concept resets the processing order of TRIM commands (POT) such that the TRIM commands will be processed in parallel.

That is, as illustrated in FIG. 23, the TRIM reordering module 1235 resets the processing order of TRIM commands (POT) in the order of the first TRIM command TRIM cmd_1, the third TRIM command TRIM cmd_3, the second TRIM command TRIM cmd_2, and the fourth TRIM command TRIM cmd_4 on the basis of the mapping table.

Therefore, as illustrated in FIG. 24, while processing for the first TRIM command TRIM cmd_1 is being performed for the second flash memory 1240, processing for the third TRIM command TRIM cmd_3 may be performed for the first flash memory 1210. For example, while an erasing operation is being performed for the seventh page (page7) of the second flash memory 1240, an erasing operation for the third page (page3) of the first flash memory 1210 may be performed in parallel.

Likewise, while processing for the second TRIM command TRIM cmd_2 is being performed for the second flash memory 1240, processing for the fourth TRIM command TRIM cmd_4 may be performed for the first flash memory 1210.

The above-described method of determining the processing order of TRIM commands (POT) is merely an example, and the inventive concept is not limited thereto. For example, the processing order of TRIM commands (POT) may be determined taking into consideration the operation state of each flash memory. As an example, when a writing operation (or a reading operation) for the second flash memory 1240 is being performed, the processing order of TRIM commands (POT) may be determined such that the processing of TRIM commands is performed for the first flash memory 1210.

Figure 25:
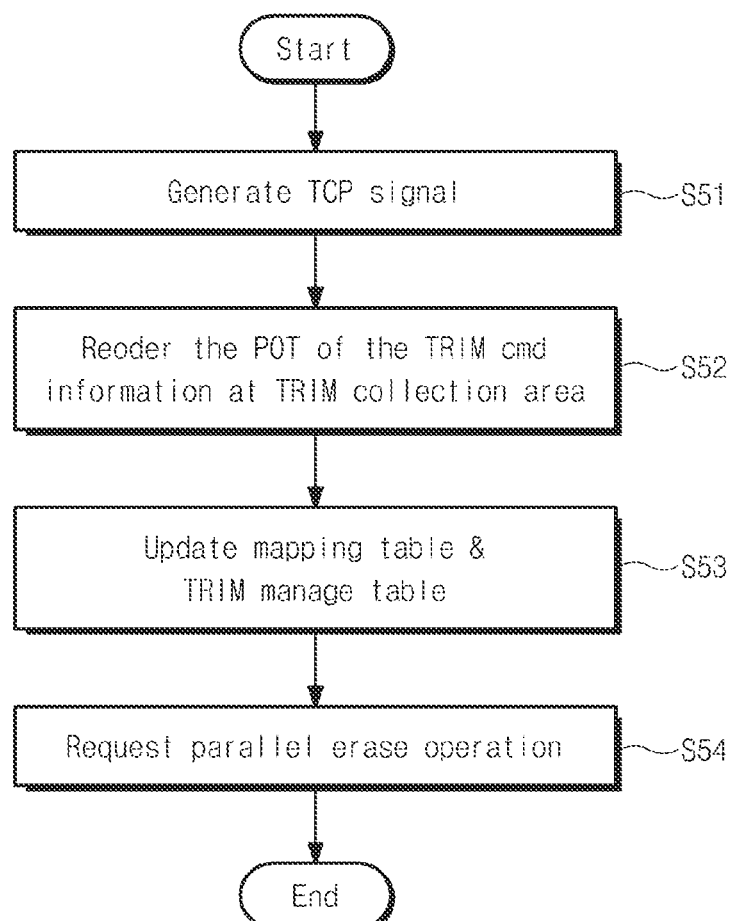

FIG. 25 is a flowchart illustrating a TRIM command processing method of the flash storage device 1200 having a plurality of flash memories.

In operation S51, a TRIM command processing signal (TCP) is generated. For example, when there is no request from the host 1100 (see FIG. 4) for a certain time, the CPU 1231 of the control unit 1230 generates the TRIM command processing signal (TCP).

In operation S52, the processing order of TRIM commands (which are stored in the TRIM collection area) (POT) is reset. For example, the TRIM reordering module 1235 (see FIG. 21) resets the processing order of TRIM commands (POT) such that the TRIM commands will be performed in parallel to the flash memories. In this case, for example, the TRIM reordering module 1235 may reset the processing order of TRIM commands (POT) on the basis of the mapping table. As another example, the TRIM reordering module 1235 may reset the processing order of TRIM commands (POT) in consideration of the operation state of each flash memory. In this case, for example, the TRIM reordering module 1235 may determine the processing order of TRIM commands (POT) such that a TRIM command corresponding to the first flash memory 1210 is processed while a writing operation (or a reading operation) is being performed in the second flash memory 1240.

In operation S53, the mapping table and TRIM manage table of the FTL 1232 (see FIG. 21) are updated. For example, the FTL 1232 requests information collected in the TRIM collection area to the buffer controller 1234 (see FIG. 4), in response to the TRIM command processing signal (TCP).

The buffer controller 1234 transfers information of the TRIM commands, which are collected in the TRIM collection area of the buffer memory 1220, to the FTL 1232. The FTL 1232 updates the mapping table and the TRIM manage table on the basis of the transferred information. The WSI of the mapping table and TRIM manage table being updated is similar to the description of FIG. 13, and thus its detailed description will not be provided.

In operation S54, an erasing operation for an area marked as invalid is requested in parallel to the flash memories according to a TRIM command. For example, the flash controller 1233 (see FIG. 21) requests an erasing operation for the flash memories according to the reset processing order of TRIM commands (POT) and the updated mapping table. In this case, since the processing order of TRIM commands (POT) is reset, the erasing operation may be performed in parallel to the flash memories.

As described above, when the flash memory device 1200 according to an embodiment of the inventive concept includes multiple flash memories, the processing order of TRIM commands may be reset. Accordingly, processing of the TRIM commands may be performed in parallel to the multiple flash memories. As a result, the time taken in processing of a TRIM command can be shortened.

V. Host that Supports TRIM Operation

Figure 26:
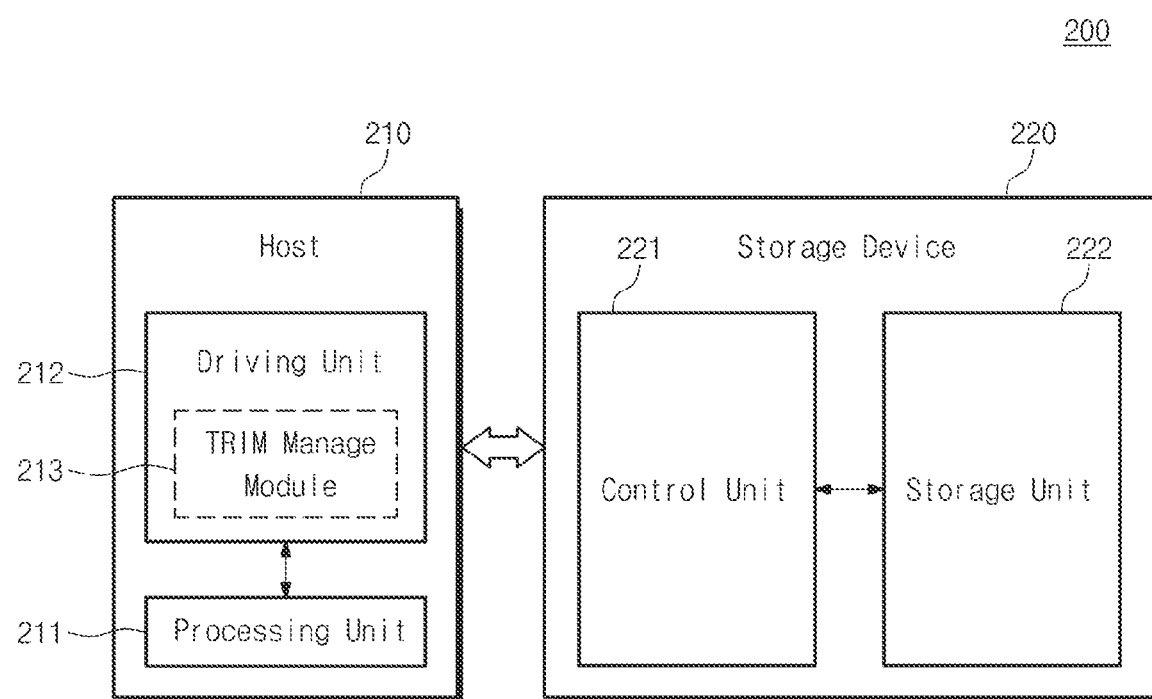
FIG. 26 is a block diagram illustrating a memory system according to an embodiment of the inventive concept.

FIG. 26 is a block diagram illustrating a memory system 200 according to an embodiment of the inventive concept. Referring to FIG. 26, the memory system 200 includes a host 210 and a storage device 220 and the storage device 220 includes a control unit and a storage unit 222.

The host 210 includes a processing unit 211 and a driving unit 212. The processing unit 211 controls overall operations of the host 210 and the driving unit 212 drives the storage device 220 according to a control of the processing unit 211.

The host 100 supports a TRIM operation. The TRIM operation processes only metadata about a corresponding file in the host 210 when there is a delete request about a specific file from a user. In this case, since only metadata of the host 210 are processed without substantial deletion of data stored in the storage unit 222, a user may recognize that a deletion operation about a corresponding file is performed quickly.

To substantially delete the data stored in the storage unit 222, the host 210 provides a TRIM command to the storage device 220. The TRIM command includes information (e.g., address information) for designating a region to be substantially deleted. The control unit 221 performs an erase operation on the data stored in the storage unit 222 in response to the TRIM command. This TRIM command may be defined with various names such as a deallocate command, an unwrite command, a deletion command, and a file delete command.

Furthermore, a unit managing a file in the host 210 may be different from a unit managing data stored in the storage unit 222 of the storage device 220. For example, the host 210 may manage a file by a sector unit in terms of a hard disk and the storage device 220 may manage data stored in the storage unit 222 by a page and/or block unit in terms of a flash memory.

The mismatch of the management units of the host 210 and the storage device 220 may deteriorate performance of the memory system 200. For example, when an erase operation is performed on the data stored in the storage unit 222 in response to a TRIM command from the host 210, the mismatch of the management unit may cause massive copy and merge operations of data. Accordingly, a life cycle of the storage device 220 is shortened and its performance deteriorated.

The host 210 includes a TRIM manage module 213. When a TRIM command is provided to the storage device 220, the TRIM manage module 213 provides only information corresponding to a management unit (e.g., a page unit) of the storage device 220 among information (e.g., a sector address) for designating a region to be deleted. Since the TRIM manage module 213 resolves the mismatch of a management unit between the host 210 and the storage device 220, the memory system 200 may prevent the life-shortening of the storage device 220 and its performance deterioration.

VI. Host of Flash Memory System for Resolving Mismatch of Management Unit

Figure 27:
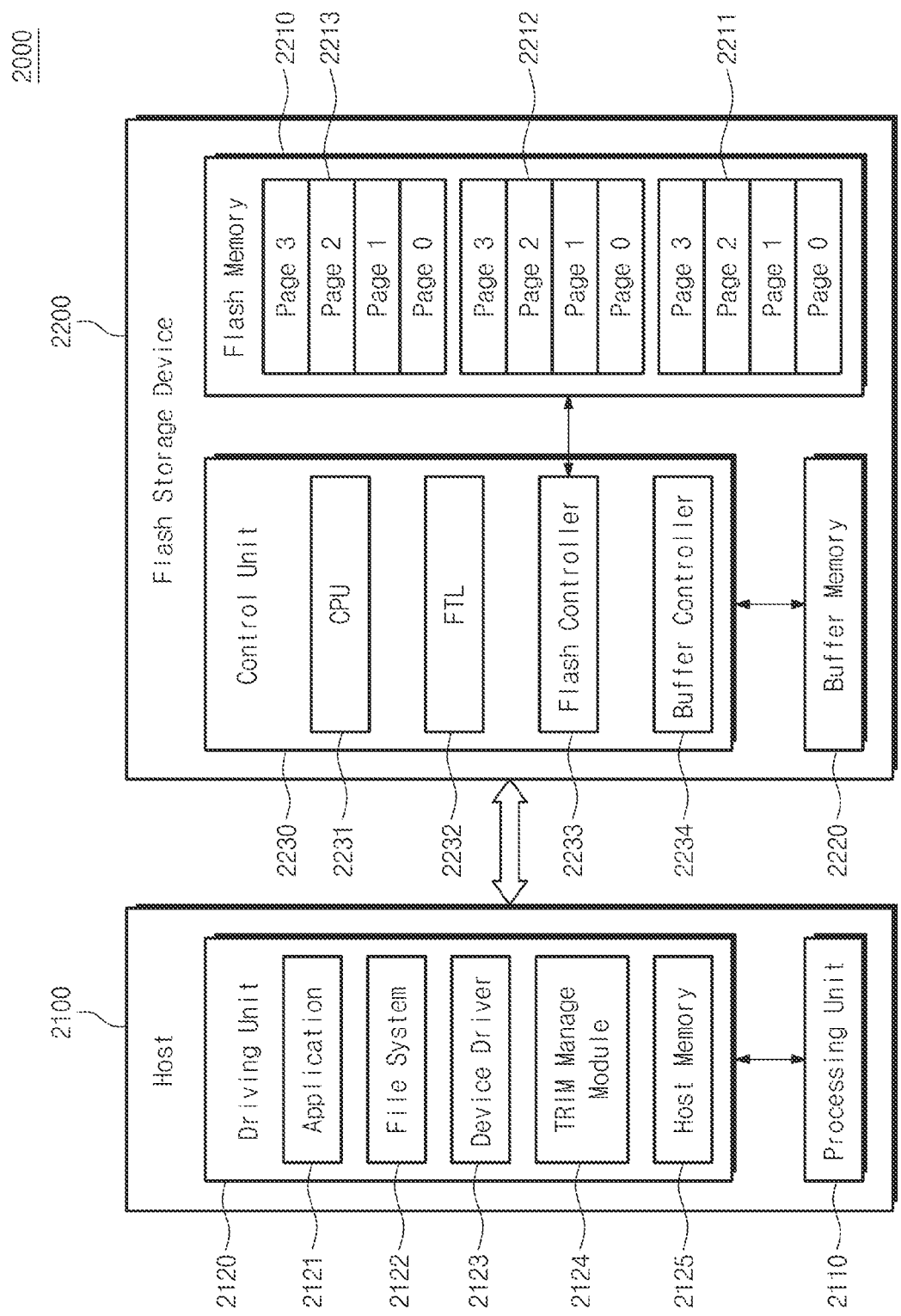
FIG. 27 is a block diagram illustrating a flash memory system according to an embedment of the inventive concept.

FIG. 27 is a block diagram illustrating a flash memory system 2000 according to an embodiment of the inventive concept. A flash storage device 2200 is shown in FIG. 27 as an example of the storage device 220 of FIG. 26.

Referring to FIG. 27, the flash memory system 2000 includes a host 2100 and a flash storage device 2200. In accordance with an exemplary embodiment the host 2100 manages a file by a sector unit and the flash storage device 2200 manages data stored in a flash memory 2210 by a page unit.

The host 2100 includes a TRIM manage module 2124. The host 2100 resolves the mismatch of a management unit between the host 2100 and the flash storage device 2200 by using the TRIM manage module 1123. Referring to FIG. 27, the host 2100 includes a processing unit 2110 and a driving unit 2120.

The processing unit (e.g., a central processing unit (CPU)) 2110 controls overall operations of the host 2100 and the driving unit 2120 drives the storage device 2200 according to a control of the processing unit 2110. The driving unit 2120 may include a memory for driving software programs of the host 2100.

The driving unit 2120 includes an application 2121, a file system 2122, a device driver 2123, a TRIM manage module 2124, and a host memory 2125. The application 2121 may be also called an application program which is software executed on an Operating System (OS). For example, the application 2121 is programmed to support create and erase operations of a file.

The file system 2122 manages a file used in the host 2100. The file system 2122 may manage a file by a sector or cluster unit in terms of a hard disk. Hereinafter, in accordance with an exemplary embodiment the file system 2122 manages a file used in the host 2100 by a sector unit in terms of a hard disk. Here, the sector is the smallest data management unit that the application 2121 may access and typically has a size of 512 bytes (B).

When there is a delete request about a specific file from the application 2121, the file system 2122 changes metadata of a delete-requested file. Later, when the application 2121 accesses a corresponding file, the file system 2122 provides information "the corresponding file was deleted" with reference to the changed metadata. Additionally, the file system 2122 delivers a sector address about the delete-requested file to the TRIM manage module 2124. The file system 2122 and a directory entry structure thereof will be described in more detail with reference to FIG. 28.

The TRIM manage module 2124 receives the sector address about a delete-requested file from the file system 2122. The TRIM manage module 2124 corresponds the delivered sector address to a page unit of a flash memory. That is, the TRIM manage module 2124 selects only a sector address corresponding to a page unit of the flash storage device 2200 from the delivered sector addresses. To substantially delete the data stored in the flash memory 2210, the TRIM manage module 2124 provides a sector address corresponding to a page unit and a TRIM command to the flash storage device 2200. Moreover, the TRIM manage module 2124 may separately manage a sector address that does not correspond to a page unit of the flash storage device 2200 among the delivered sector addresses.

The device driver 2123 is a program allowing the flash storage device 2200 to communicate with the host 2100. To use the flash storage device 2200, the device driver 2123 appropriate for the flash storage device 2200 needs to be installed at the host 2100. Referring to FIG. 27, the TRIM manage module 2124 and the device driver 2123 are realized with respectively separate modules. However, this is just an exemplary embodiment and the TRIM manage module 2124 may be built into the device driver 2123.

The host memory 2125 may temporarily store data to be written on the flash storage device 2200 or data read from the flash storage device 2200. Additionally, the host memory 2125 may be used as a working memory for driving the application 2121, the file system 2122, the device driver 2123, and the TRIM manage module 2124.

Moreover, the flash storage device 2200 receives a TRIM command from the host 2100. The TRIM command includes information (e.g., information about a delete-requested sector address) for designating a region to be deleted. In this case, the information for designating a region to be deleted, which is provided to the flash storage device 2200, may correspond to a management unit (e.g., a page unit) of the flash storage device 2200 by the TRIM manage module 2124 of the host 2100.

The flash storage device 2200 marks a delete-requested region among regions of the flash memory 2210 as invalid in response to the TRIM command. The flash storage device 2200 performs an erase operation on the invalid-marked region during an idle time (e.g., an idle time of the control unit 2230 occurring when there is no request from the host). Referring to FIG. 27, the flash storage device 2200 includes a flash memory 2210, a buffer memory 2220, and a control unit 2230.

The flash memory 2210 performs an erase operation, a read operation, and a write operation according to a control of the control unit 2230. The flash memory 2210 includes a plurality of memory blocks. Each memory block includes a plurality of pages. In an exemplary embodiment three memory blocks 2211, 2212, 2213 are shown in FIG. 27. In an exemplary embodiment each memory block includes four pages.

A size of each page is greater than that of a sector. For example, each page has a size of about 2 Kilo Bytes (KB) and each sector has a size of about 512 B. The flash memory 2210 performs an erase operation by a memory block unit and performs a write or read operation by a page unit.

Moreover, data of one bit or more than two bits may be stored in one memory cell of the flash memory 2210. A memory cell structure where one bit data may be stored in one memory cell may be called a Single Level Cell (SLC) or a single bit cell. A memory cell structure where data of more than two bits are stored in one memory cell may be called a Multi Level Cell (MLC) or a multi bit cell.

The buffer memory 2220 may temporarily store data read from the flash memory 2210 or data provided from the host 2100. Additionally, the buffer memory 2220 may be used for driving firmware such as an FTL. The buffer memory 2220 may be realized by DRAM, SRAM, MRAM, or PRAM.

The control unit 2230 includes a CPU 1231, an FTL 2232, a flash controller 2233, and a buffer controller 2234. The CPU 2231 analyzes and processes a signal inputted from the host 2100. Additionally, the CPU controls the overall operations of the flash storage device 2200.

The FTL 2232 translates a Logical Address (LA) provided from the host 2100 into a Physical Address (PA) of the flash memory 2210. For example, the FTL 2232 translates a sector address from the host 210 into a page address of the flash memory 2210.

Moreover, the FTL 2232 manages the data stored in the flash memory 2210 by a page unit, for example. The FTL 2232 marks a corresponding page as invalid when all data stored in a predetermined page are requested to be deleted by a TRIM command.

The flash controller 2233 controls read, write, and erase operations of the flash memory 2210. For example, during an idle time of the control unit 2230, the flash controller 2233 controls the flash memory 2210 to perform an erase operation about a page marked as invalid. Moreover, the buffer controller 2234 controls read and write operations of the buffer memory 2220.

FIG. 28 is a diagram illustrating a directory entry structure that the file system 2122 of FIG. 27 generates to manage a file. Referring to FIG. 28, the directory entry structure includes file name, extension, attribute, create date and time, starting sector, and a file size.

The file system 2122 of FIG. 27 changes metadata of a delete-requested file when there is a delete request about a specific file from the application 2121 of FIG. 27. For example, the file system 2122 places 'E5h', a hexadecimal byte, on a file name of a delete-requested file. As another example, the file system changes an attribute value of the delete-requested file into '0xE5'. This is one special tag and means that 'this file was deleted'. Accordingly, when the application 2121 accesses a corresponding file later, the file system 2122 provides information that the corresponding file was deleted previously. Information about the file system 2122 may be stored in a nonvolatile memory (e.g., the flash memory 2210) periodically or during an idle time.

Furthermore, choice of the file system 2122 may be selected according to the OS of the flash memory system 2000 of FIG. 27. For example, when the flash memory system 2000 has a Disk Operating System (DOS) or Windows based OS, its file system includes a File Allocation Table (FAT) file system, a Virtual FAT (VFAT) file system, an extended FAT (exFAT) file system, and a New Technology File System (NTFS). Windows is a trademark of Microsoft Corporation.

As another example, when the flash memory device 1000 has a UNIX based OS, a UNIX File System (UFS) may be used. When the flash memory device 1000 has a LINUX based OS, a file system for LINUX may be used. When the flash memory device 1000 has a mobile OS (e.g., iOS (i.e., OS for iPhone and iPad) or android OS), a file system for mobile OS may be used. UNIX is a trademark of the industry standards consortium The Open Group. LINUX is a trademark of Linus Torvalds. iOS is a trademark of Cisco Systems. iPhone is a trademark under agreement between Cisco Systems and Apple Inc. iPad is a trademark of Apple, Inc.

Figure 29:
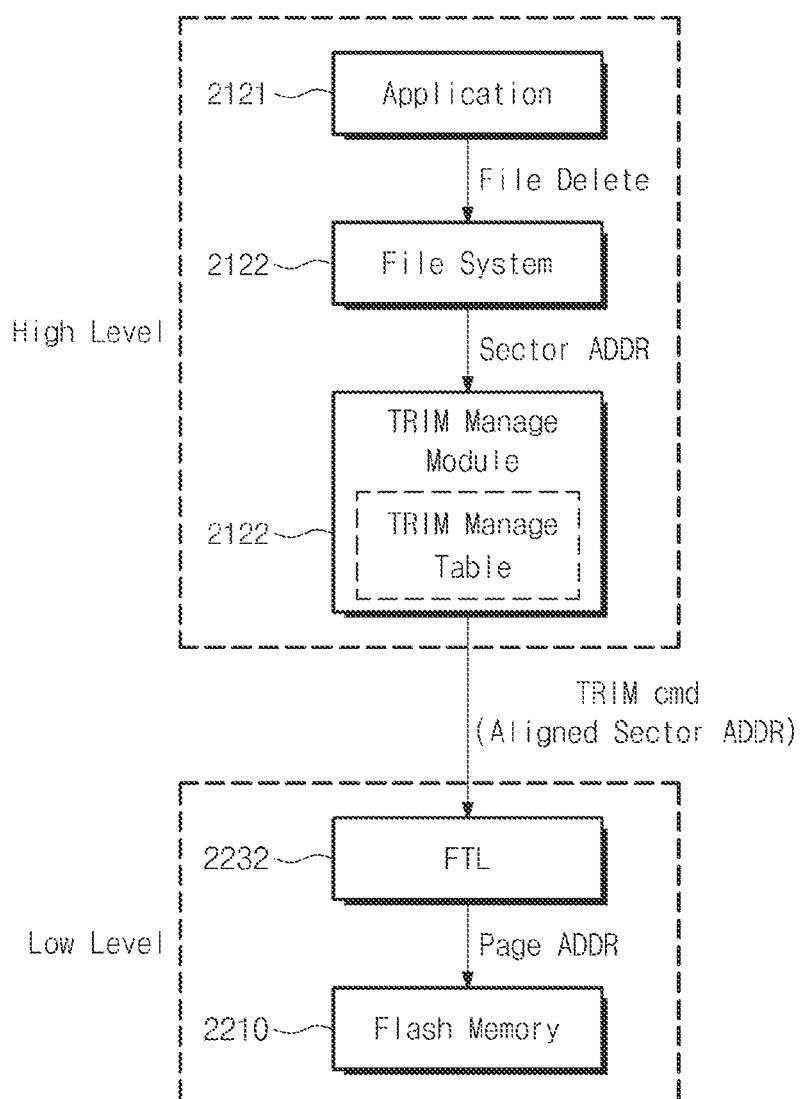
FIG. 29 is a block diagram illustrating a software layer structure of the flash memory system of FIG. 27.

FIG. 29 is a block diagram illustrating a software layer structure of the flash memory system 2000 of FIG. 27. Referring to FIG. 29, the software layer structure of the flash memory system 2000 includes an application 2121, a file system 2122, a TRIM manage module 2124, an FTL 2232, and a flash memory 2210. The application 2121, the file system 2122, and the TRIM manage module 2124 at the host 2100 of FIG. 27 may be designated as a high level. The FTL 2232 and the flash memory 2210 at the flash storage device 2200 of FIG. 27 may be designated as a low level.

The application 2121 delivers a file delete request to the file system 2122. The file system 2122 changes metadata of a delete-requested file. For example, the file system 2122 places 'E5h' on the file name of FIG. 28. Accordingly, when the application 2121 accesses a corresponding file, the file system 2122 may provide information that a corresponding file was deleted. The file delete request of the application 2121 and a metadata change of the file system 2122 may be designated as 'an erase operation in a high level'.

The TRIM manage module 2124 receives a sector address Sector ADDR about a delete-requested file from the file system 2122. The TRIM manage module 2124 selects a sector address corresponding to a page unit of the flash memory 2210 from the received sector addresses Sector ADDRs. A sector address corresponding to a page unit of the flash memory 2210 may be designated as an aligned sector address Aligned Sector ADDR.

Moreover, the TRIM manage module 2124 may separately manage sector addresses that do not correspond to a page unit of the flash storage device 2200 of FIG. 27 from the received sector addresses by using a TRIM manage table.

Moreover, to substantially delete the data stored in the flash memory 2210, the TRIM manage module 2124 provides a TRIM command TRIM cmd to the FTL 2232. The TRIM command TRIM cmd includes an aligned sector address Aligned Sector ADDR for designating a delete-requested file. The FTL 2232 translates the aligned sector address Aligned Sector ADDR into a page address Page ADDR and marks a page to be deleted of the flash memory 2210 as invalid.

The flash memory 2210 performs an erase operation on the page marked as invalid during an idle time, for example. The idle time means a time when there is no request to the control unit 2230 of FIG. 27 from the host 2100 of FIG. 27. As is well known, since the flash memory 2210 performs an erase operation by a block unit, the erase operation about a page of the flash memory 2210 may be accompanied with copy, merge, and block erase operations of data. A marking operation of the FTL 2232 and an erase operation of the flash memory 2210 may be designated as 'an erase operation in a low level'.

Figure 30:
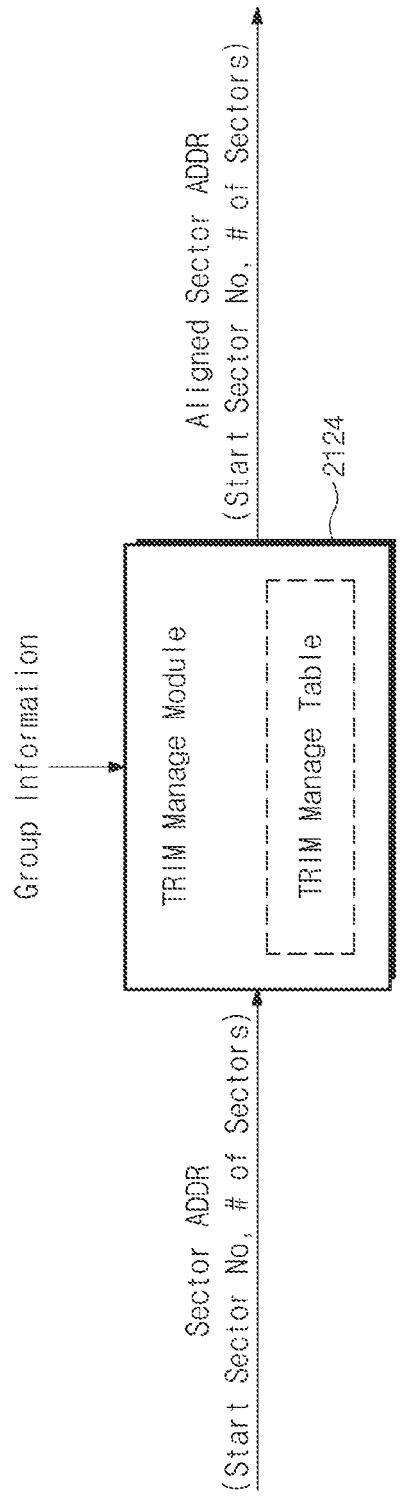
FIG. 30 is a block diagram illustrating an operation of the TRIM manage module of FIG. 27 in more detail.

FIG. 30 is a block diagram illustrating an operation of the TRIM manage module 2124 of FIG. 27 in more detail. Referring to FIG. 30, the TRIM manage module 2124 receives a sector address Sector ADDR and outputs a sector address (i.e., an aligned sector address Aligned Sector ADDR) corresponding to a page unit. Information about the sector address Sector ADDR and the aligned sector address Aligned Sector ADDR may include Start Sector No and #of Sectors.

In more detail, the TRIM manage module 2124 selects a sector address (i.e., an aligned sector address Aligned Sector ADDR) corresponding to a page unit among sector addresses Sector ADDRs, with reference to group information. Here, the group information means address information of sectors corresponding to one page. The TRIM manage module 2124 receives group information from a mapping table of the FTL 2232. The group information and the mapping table will be described in more detail with reference to FIG. 34.

Additionally, the TRIM manage module 2124 may separately manage a sector address that does not correspond to a page unit among the received sector addresses Sector ADDRs. For this, the TRIM manage module 2124 includes a TRIM manage table.

Moreover, information about the TRIM manage table may be stored in the host memory 2125 of FIG. 27. In this case, various sizes of a region allocated to the TRIM manage table in a region of the host memory 2125 may be selected. For example, to reduce an overhead of the processing unit 2110 of FIG. 27 according to a sector address management, a region allocated to the TRIM manage table may be limited to a predetermined size.

When a region allocated to the TRIM manage table is limited to a predetermined size, a size of information about a sector address that the TRIM manage table manages may exceed a region allocated to the host memory 2125. In this case, information about a sector address of the TRIM manage table may be managed through a pushing method. The TRIM manage module 2124 and operations of the TRIM manage module will be described with reference to FIGS. 34 through 36.

Figure 31:
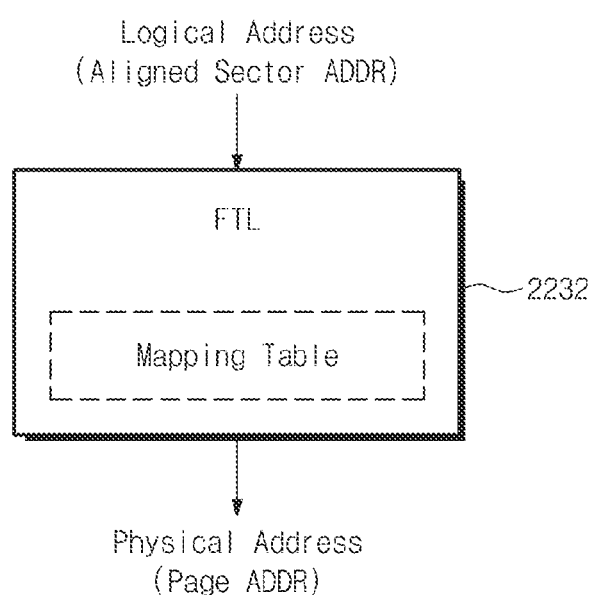
FIG. 31 is a block diagram illustrating an address translation operation of the FTL of FIG. 27 in more detail.

FIG. 31 is a block diagram illustrating an address translation operation of the FTL 2232 of FIG. 27 in more detail. Referring to FIG. 31, the FTL 2232 translates an aligned sector address Aligned Sector ADDR (i.e., a logical address) into a page address Page ADDR (i.e., a physical address of the flash memory 2210).

An address translation of the FTL 2232 may be performed through a mapping table. A mapping method typically includes a page mapping method and a block mapping method. The page mapping performs an address translation by a page unit (e.g., 2 KB) and the block mapping method performs an address translation by a block unit (e.g., 1 MB). The address translation through the mapping table will be described below in more detail with reference to FIG. 32.

The address translation of the FTL 2232 is the application 2121 of a high level but allows read, write, and erase operations performed in the actual flash memory 2210 to look like read and write operations of a hard disk device as seen from the file system 2122. That is, the FTL 2232 performs an emulate function.

Figure 32:
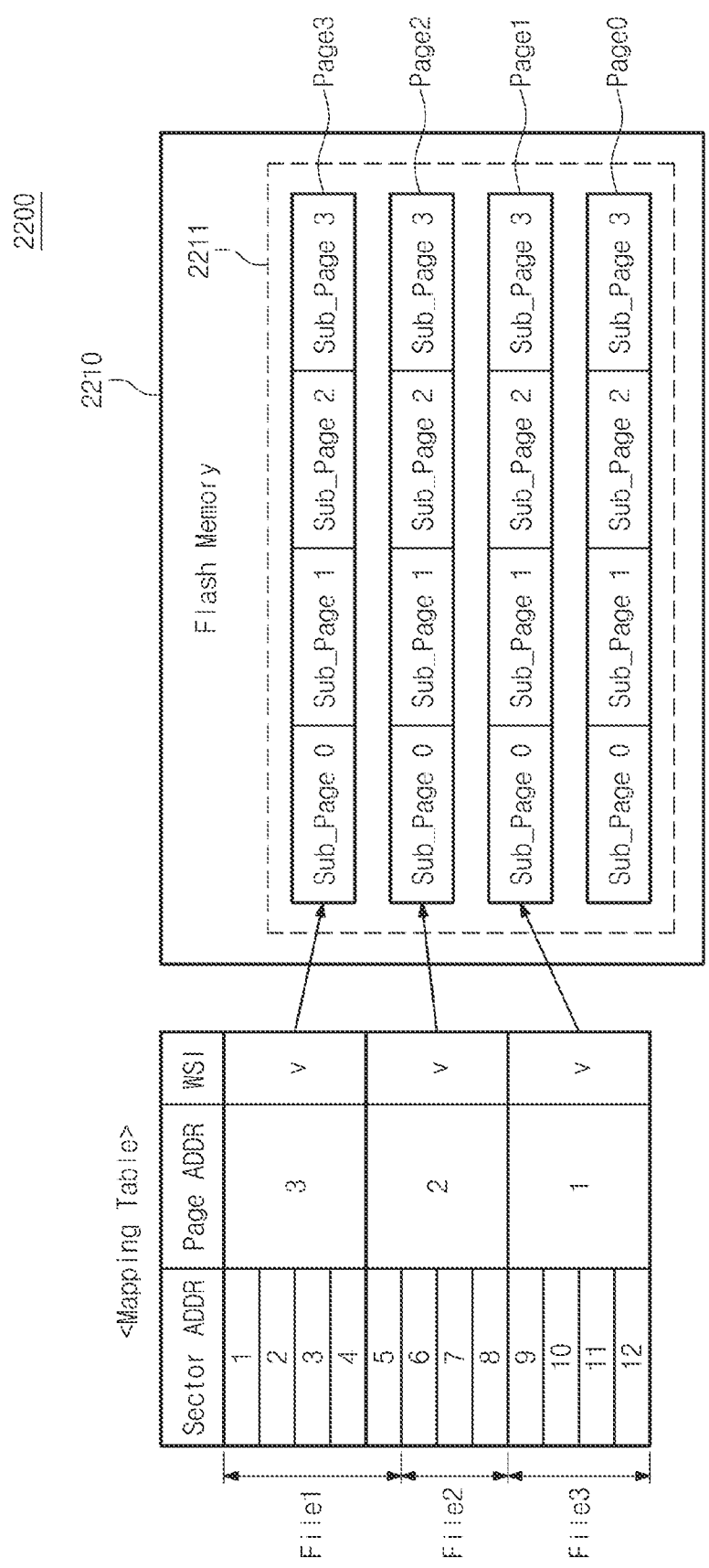
FIG. 32 is a block diagram illustrating an address translation through a mapping table.

FIG. 32 is a block diagram illustrating an address translation through a mapping table. For brief description, hereinafter, in accordance with an exemplary embodiment an address translation is performed through a page mapping method.

Referring to FIG. 32, the mapping table maps a sector address Sector ADDR, i.e., a logical address, into a page address Page ADDR, i.e., a physical address. In accordance with an exemplary embodiment four sectors are mapped into one page. For example, as shown in FIG. 32, the first to fourth sectors Sector1, Sector2, Sector 3, Sector4 may be mapped into the third page Page3.

The mapping table displays whether data stored in a page are valid or not through Write State Information (WSI). For example, 'v' of the WSI represents that data stored in a page are valid.

Each of the zeroth to third pages Page0 to Page3 of the memory block 2211 in the flash memory 2210 is divided into four sub pages Sub_Page0 to Sub_Page3. In accordance with an exemplary embodiment a size of each sub page is identical in each sector and each sub page corresponds to each sector. For example, as shown in FIG. 32, the third page Page3 is divided into four sub pages Sub_Page0 to Sub_Page3. The four sub pages Sub_Page0 to Sub_Page3 of the third page Page3 correspond to the first to fourth sectors Sector1 to Sector4, respectively.

Moreover, for convenience of description, like FIG. 32, in accordance with an exemplary embodiment the first to third files File1, File 2, File 3 are stored as valid data in the first to third pages Page1, Page2, Page3 of the block 2211 in FIGS. 33 through 36. In this case, in accordance with an exemplary embodiment the first file File1 corresponds to the first to fifth sectors Sector1, Sector2, Sector3, Sector4, Sector5 and the second file File2 corresponds to the sixth to eighth sectors Sector6, Sector7, Sector8, and the third file File3 corresponds to the ninth to twelfth sectors Sector9, Sector 10, Sector 11, Sector12.

Figure 33:
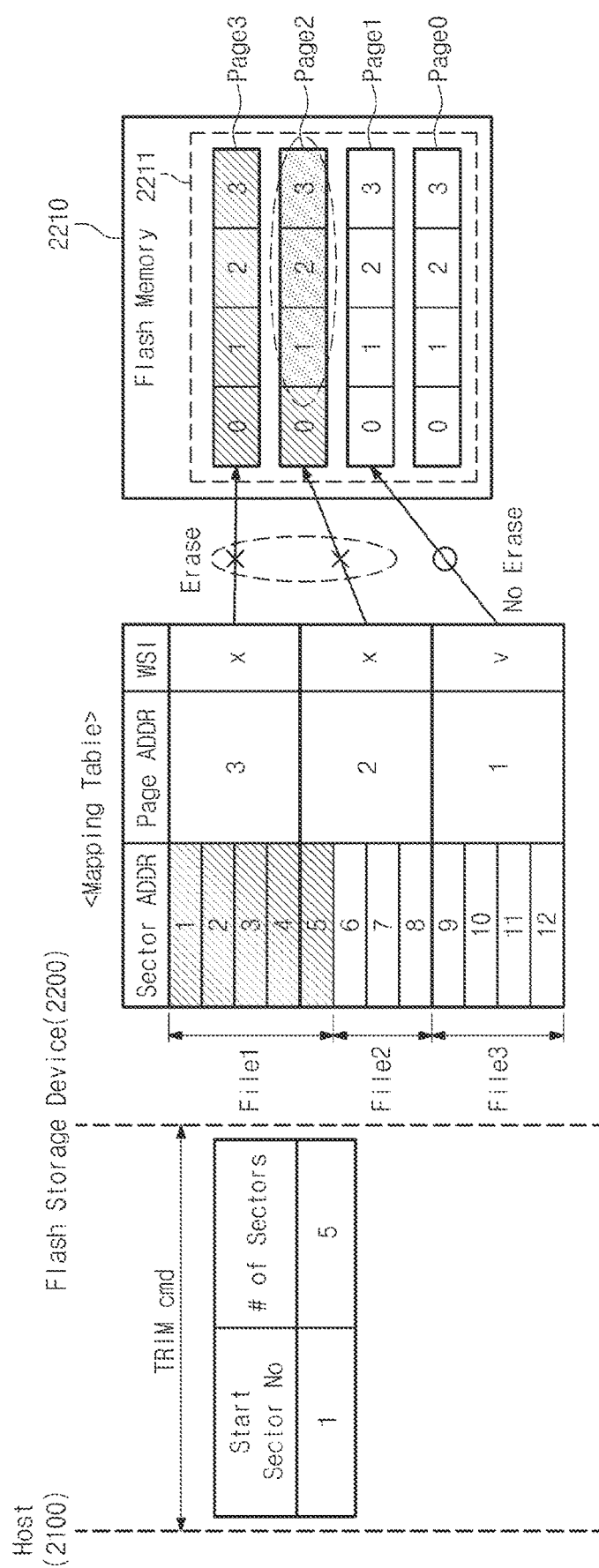
FIG. 33 is a view of when the flash memory system processes a TRIM command without the TRIM manage module of FIG. 27.

FIG. 33 is a view of when the flash memory system 2000 processes a TRIM command without the TRIM manage module 2124 of FIG. 27. That is, in an exemplary embodiment shown in FIG. 33 a sector address that does not correspond to a page unit is provided to a flash storage device 2200. In accordance with an exemplary embodiment a TRIM command TRIM cmd including information about a sector address of a file File 1 is provided.

Referring to FIG. 33, a TRIM command TRIM cmd is provided from the host 2100. The TRIM command TRIM cmd includes a sector address for designating a region to be deleted in the flash memory 2210. As shown in FIG. 33, information about a sector address may be provided as Start Sector No and #of Sectors. For example, since the first file File1 corresponds to the first to fifth sectors Sector1 to Sector5, the Start Sector No is 1 and #of Sectors is 5.

Once the TRIM command TRIM cmd is provided from the host 2100, the FTL 2232 of FIG. 27 updates the WSI of the mapping table. That is, the WSI of a page corresponding to the received sector address is marked as invalid. In an exemplary embodiment, 'x' of the WSI in FIG. 33 means that data stored in a corresponding page is invalid.

In more detail, the first file File1 corresponds to the first to fifth sectors Sector1, Sector 2, Sector 3, Sector 4, Sector5. In this case, the first to fourth sectors Sector1, Sector 2, Sector 3, Sector4 of the first file File1 correspond to the third page Page3. Accordingly, the WSI about the third page Page3 of the mapping table is marked as invalid. The fifth sector Sector5 of the first file File1 corresponds to the second page Page2. Accordingly, the WSI of the third page Page3 is marked as invalid. An erase operation on the second and third pages Page2 and Page3 marked as invalid is performed during an idle time of the control unit 2230 of FIG. 27.

Moreover, data corresponding to the fifth sector sector5 of the first file File1 are stored in a sub page 0 of the second page Page2 and data corresponding to the sixth to eighth sectors Sector6 to Sector8 of the second file File2 are stored in sub pages 1 to 3 of the second page Page2.

Accordingly, the second page Page2 is marked as invalid according to a TRIM command TRIM cmd about the first file File1, valid data of the second file File2 may be deleted together. Accordingly, to prevent valid data of the second file File2 from being deleted, the flash memory 2210 needs to copy data stored in the sub pages 1 to 3 of the second page Page2 into another page (e.g., a page of another block 2212 of FIG. 27.

This copy operation may shorten a life cycle of the flash memory 2210 due to the increased number of write operations. Additionally, a new page storing valid data generated through a copy operation may cause the increase of a merge operation for generating a free block.

The host 2100 includes the TRIM manage module 2124 of FIG. 27. Since the TRIM manage module 2124 provides a sector address corresponding to a management unit of the flash storage device 2200 to the flash storage device 2200, the above copy operation does not occur. This will be described in more detail with reference to FIGS. 34 through 36.

Figure 34:
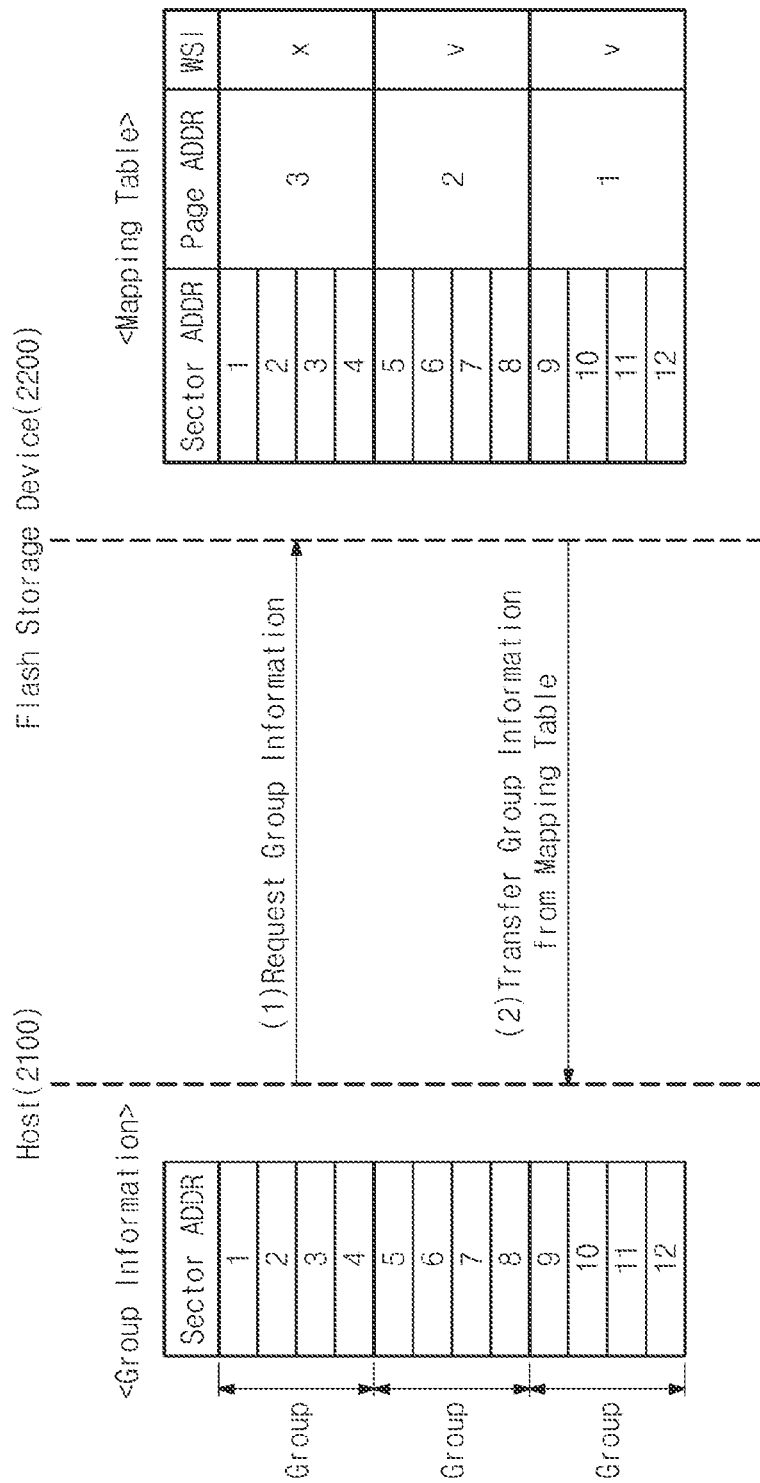
FIGS. 34 through 36 are views illustrating a flash memory system generating an aligned sector address Aligned Sector ADDR by using the TRIM manage module of FIG. 27 and processing a TRIM command including the aligned sector address.
Figure 35:
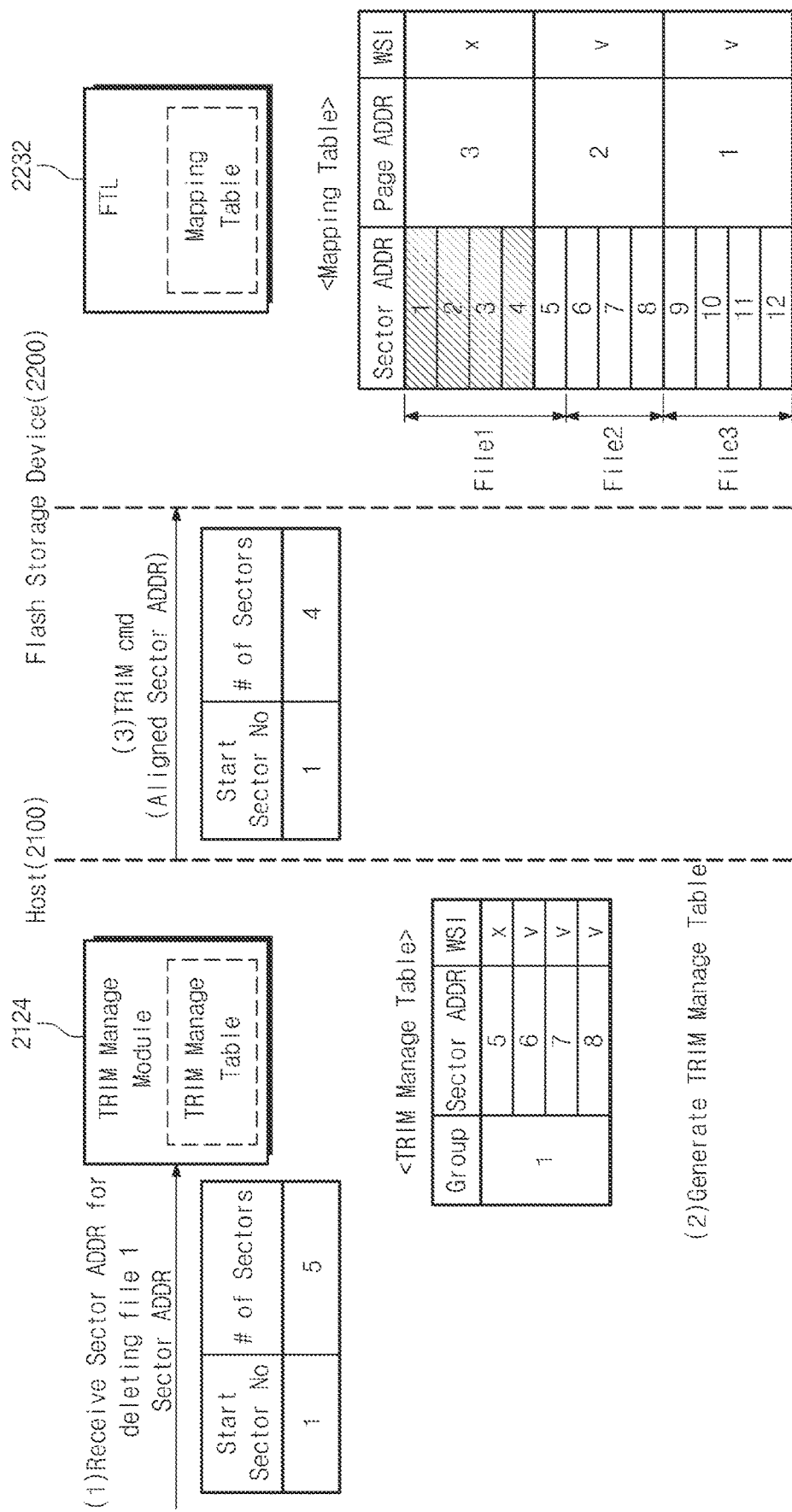
Figure 36:
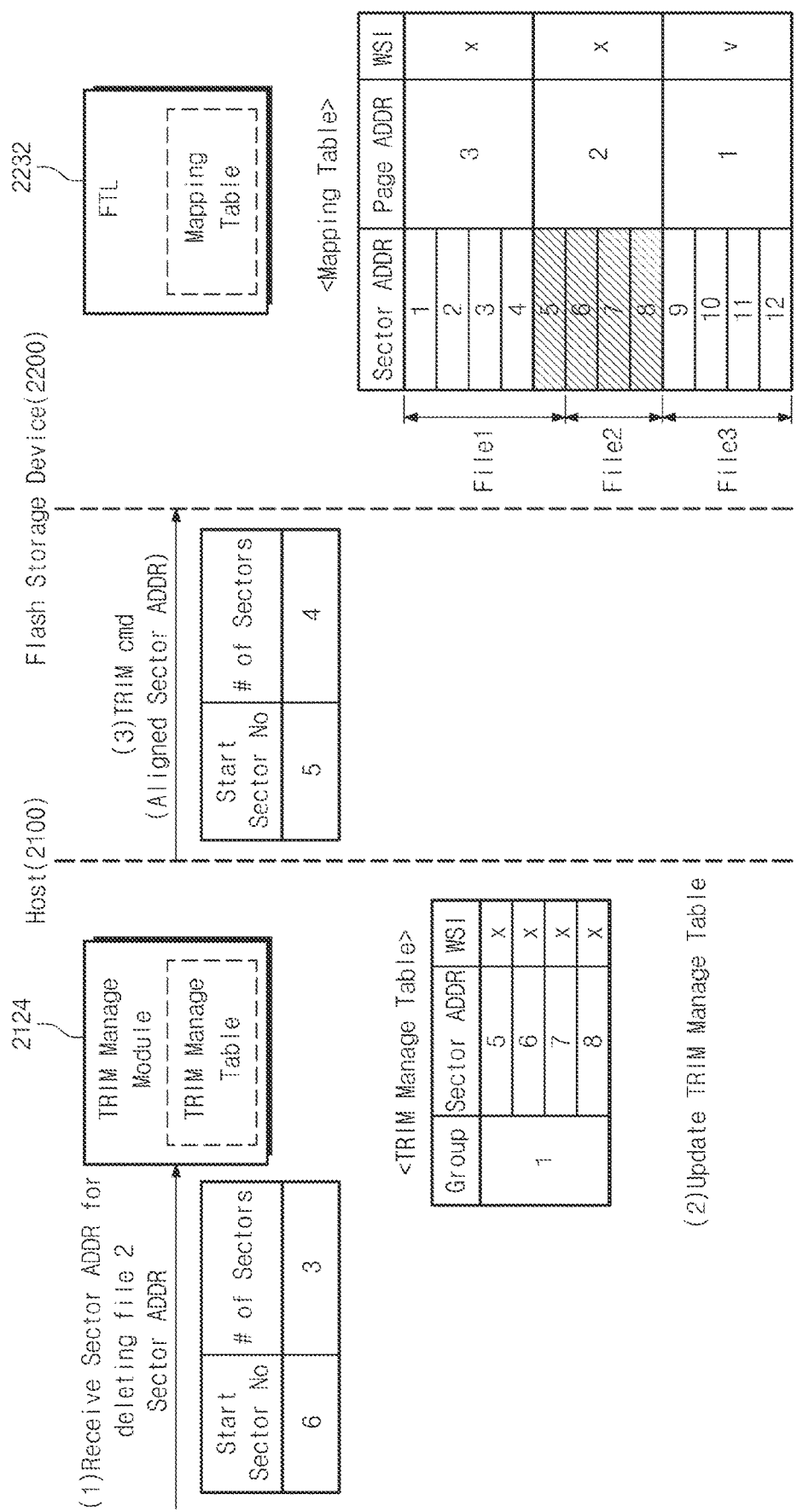

FIGS. 34 through 36 are views illustrating a flash memory system 2000 generating an aligned sector address Aligned Sector ADDR using the TRIM manage module 2124 of FIG. 27 and processing a TRIM command including the aligned sector address Aligned Sector ADDR according to an embodiment of the inventive concept.

According to an embodiment of the inventive concept, a host 2100 provides aligned sector address Aligned Sector ADDR to a flash storage device 2200. For this, the host 2100 requests group information to the flash storage device 2200. The flash storage device 2200 obtains the group information from a mapping table and provides this to the host 2100. Later, when there is a delete request about a predetermined file, the TRIM manage module 2124 of the host 2100 determines whether the received sector address corresponds to a page unit or not with reference to the group information. The TRIM manage module 2124 provides a sector address corresponding to the page unit and a TRIM command to the flash storage device 2200.

In more detail, FIG. 34 illustrates a procedure that group information is transmitted from the mapping table of the flash storage device 2200 to the host 2100. Referring to FIG. 34, first, the host 2100 request group information to the flash storage device 2200. For example, the TRIM manage module 2124 of the host 2100 or the processing unit 2110 of FIG. 27 may request group information to the flash storage device 2200 during power up.

The flash storage device 2200 provides the group information to the host 2100 in response to the group information request of the host 2100. Here, the group information means address information of sectors corresponding to one page. The flash storage device 2200 may obtain the group information from the mapping table, for example.

For example, referring to the mapping table, four sectors correspond to one page. That is, the first to fourth sectors Sector1, Sector 2, Sector 3, Sector4 correspond to the third page Page3 and the fifth to eighth sectors Sector5, Sector 6, Sector7, Sector8 correspond to the second page Page2, and the ninth to twelfth sectors Sector9, Sector 10, Sector 11, Sector12 correspond to the first page Page1.

Accordingly, in relation to the flash storage device 2200, the first to fourth sectors, the fifth to eighth sectors, and the ninth to twelfth sectors constitute respective groups and the sectors in each group provides information (i.e., group information) corresponding to one page to the host 2100. The group information delivered to the host 2100 may be stored in the host memory 1124 of FIG. 27.

FIGS. 35 and 36 illustrate operations of the TRIM manage module 2124 and the FTL 2232 when there is a delete request about a predetermined file. Referring to FIG. 35, in accordance with an exemplary embodiment the TRIM manage module 2124 receives a sector address Sector ADDR about a first file. That is, in accordance with an exemplary embodiment after an erase operation is performed on the first file File 1 in a high level, a sector address Sector ADDR of the first file Filet is provided from the file system 2122 of FIG. 27.

The TRIM manage module 2124 receives the sector address Sector ADDR about the first file Filet from the file system 2122. Since the first file Filet corresponds to the first to fifth sectors Sector1, Sector 2, Sector 3, Sector 4, Sector5, Start Sector No is 1 and #of Sectors is 5. The TRIM manage module 2124 determines whether the received sector address corresponds to a page unit or not with reference to group information stored in the host memory 2125.

In more detail, referring to the group information of FIG. 34, the first to fourth sectors Sector1, Sector 2, Sector 3, Sector4 constitute one group. That is, the first to fourth sectors Sector1, Sector 2, Sector 3, Sector4 corresponds to a page unit, i.e., a management unit of the flash storage device 2200. On the other hand, the fifth sector Sector5 does not correspond to a page unit.

In this case, the TRIM manage module 2124 generates a TRIM manage table for managing the fifth sector Sector5 that does not correspond to a page unit. The TRIM manage table, as shown in FIG. 35, includes group information about the fifth sector Sector5 and WSI. Since data corresponding to the fifth sector Sector5 were deleted in a high level, the TRIM manage module 2124 marks the WSI about the fifth sector Sector5 of the TRIM manage table as invalid.

Moreover, the first to fourth sectors Sector1, Sector 2, Sector 3, Sector4 correspond to a page unit. Accordingly, the TRIM manage module 2124 provides a sector address about the first to fourth sectors Sector1, Sector 2, Sector 3, Sector4 (i.e., Start Sector No is 1 and #of Sectors is 4) and a TRIM command TRIM cmd to the flash storage device 2200.

Since the first to fourth sectors Sector1, Sector 2, Sector 3, Sector4 are mapped into the third page Page3, the FTL 2232 marks the WSI about the third page Page3 of the mapping table as invalid. An erase operation on the third page Page3 marked as invalid, for example, is performed during an idle time of the control unit 2230 of FIG. 27. In this case, since all data stored in the third page Page3 are invalid during an erase operation, a copy operation in FIG. 33 is not performed.

Moreover, in response to a subsequent delete request about another file, the WSI of a group managed in the TRIM manage table may be updated as invalid. In this case, since sectors of a corresponding group correspond to a page unit, the TRIM manage module 2124 may provide a sector address about corresponding sectors to a flash storage device. This will be described below in more detail with reference to FIG. 36.

Referring to FIG. 36, in accordance with an exemplary embodiment the TRIM manage module 2124 receives a sector address Sector ADDR about the second file File2. That is, after an erase operation of a high level is performed on the second file File2, in accordance with an exemplary embodiment a sector address of the second file File2 is provided from the file system 2122.

The TRIM manage module 2124 receives a sector address Sector ADDR about the second file File2 from the file system 2122. Since the second file File2 corresponds to the sixth to eighth sectors Sector6, Sector 7, Sector8, Start Sector No is 6 and #of Sectors is 3. The TRIM manage module 2124 determines whether the received sector address corresponds to a page unit with reference to group information stored in the host memory 2125.

More specifically, referring to FIG. 34, the sixth to eighth sectors Sector6, Sector 7, Sector8 do not correspond to a page unit. Accordingly, the TRIM manage module 2124 separately manage the sixth to eighth sectors Sector6, Sector7, Sector8 by using a TRIM manage table. In this case, the TRIM manage table about the fifth to eighth sectors Sector5, Sector 6, Sector7, Sector8 is generated in advance by a delete request about the first file File1. Accordingly, the TRIM manage module 2124, as shown in FIG. 36, updates the WSI about the sixth to eighth sectors Sector6 to Sector8 as invalid.

In this case, the WSI about the fifth to eighth sectors Sector5, Sector 6, Sector7, Sector8 in the same group is all invalid. That is, the fifth to eighth sectors Sector5, Sector 6, Sector7, Sector8 correspond to a page unit and correspond to files deleted in a high level. Accordingly, the TRIM manage module 2124 provides a sector address (i.e., Start Sector No is 5 and #of Sectors is 4) about the fifth to eighth sectors Sector5, Sector 6, Sector 7, Sector8 and a TRIM command TRIM cmd to the flash storage device 220. In this case, information about the fifth to eighth sectors Sector5, Sector 6, Sector 7, Sector8 is deleted in the TRIM manage table.

Moreover, since the fifth to eighth sectors Sector5, Sector6, Sector7, Sector8 are mapped into the second page Page2, the FTL 2232 marks the WSI about the second page Page2 of the mapping table as invalid. An erase operation on the second page Page2 marked as invalid, for example, is performed during an idle time of the control unit 2230 of FIG. 27. Accordingly, an erase operation on the second page Page2 is performed during an idle time from now on (e.g., an idle time of the control unit 2230 of FIG. 27).

As mentioned above, the TRIM manage module 2124 of the host 2100 provides only a sector address corresponding to a page unit among sector addresses delivered from the file system 2122 to the flash storage device 2200. Accordingly, the flash storage device 2200 does not perform an unnecessary copy operation like FIG. 33. This means that a merge operation caused by an unnecessary copy operation may be prevented. That is, the mismatch of a management unit between the host 1110 and the flash storage device 1120 is resolved using the TRIM manage module 2124 of the host 2100, thereby preventing life shortening and performance deterioration of the flash storage device 220.

Moreover, a memory (e.g., the host memory 2125 of FIG. 27) allocated to a TRIM manage table may be limited to a predetermined size. In this case, a size of information about a sector address managed in the TRIM manage table may exceed a size allocated to the host memory 2125.

When a size of information about a sector address managed in the TRIM manage table exceeds a size allocated to the host memory 2125, information about a sector managed in the TRIM manage table may be deleted through a pushing method. That is, information about the oldest sector among information about sectors managed in the TRIM manage table is deleted and information about a newly-requested sector may be managed.

For example, in accordance with an exemplary embodiment information about the first sector Sector1, the fifth sector Sector5, and the ninth sector Sector9 in respectively different groups is managed in the TRIM manage table. Additionally, information about the thirteenth sector Sector13 in another group needs to be managed in the TRIM manage table and if information about the thirteenth sector Sector13 is managed, in accordance with an exemplary embodiment a size of information about a sector address managed in the TRIM manage table exceeds a size of a region allocated in the TRIM manage table. In this case, the TRIM manage module 2124 may delete information about the oldest first sector Sector1 from the TRIM manage table and may manage information about the thirteenth sector Sector13 may be managed in the TRIM manage table.

Figure 37:
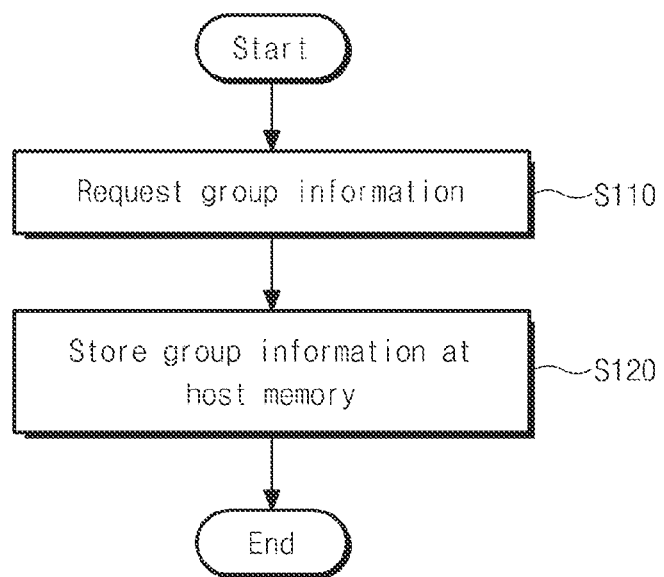
FIG. 37 is a flowchart of when group information is delivered from a mapping table of a flash storage device to a host.

FIG. 37 is a flowchart of when group information is delivered from a mapping table of a flash storage device 2200 to a host 2100.

In operation S110, the host 2100 requests group information to the flash storage device 2200. For example, the host 2100 may request group information to the flash storage device 2200 during power up. The flash storage device 2200 obtains group information for each sector from a mapping table in response to the request of the host 2100.

In operation S120, the group information is stored in a host memory 2125 of the host 2100. That is, the flash storage device 2200 provides the group information obtained from the mapping table to the host 2100 and the host 2100 stores the delivered group information in the host memory 2125.

Figure 38:
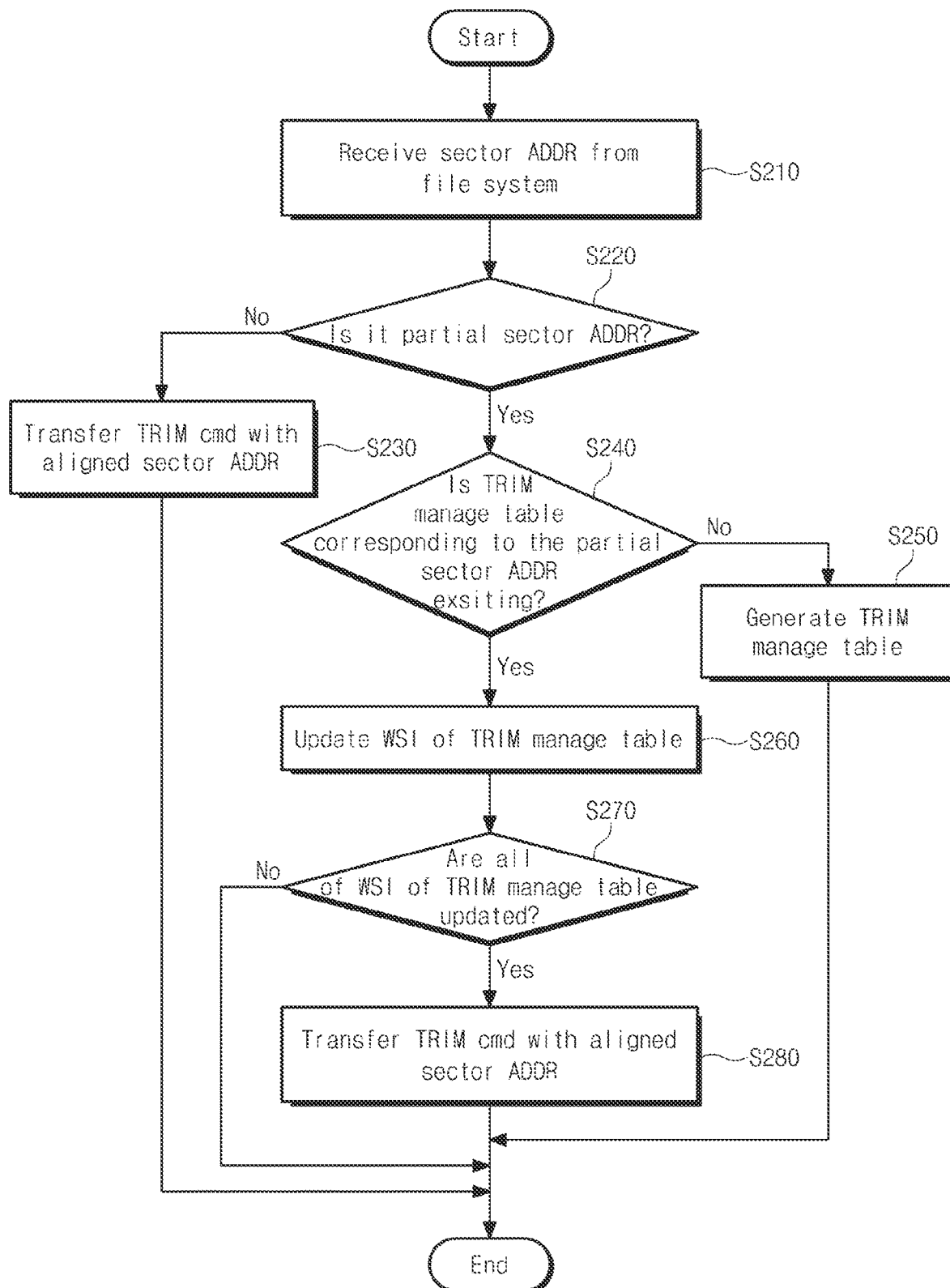
FIG. 38 is a flowchart illustrating operations of the TRIM manage module of FIG. 27.

FIG. 38 is a flowchart illustrating operations of the TRIM manage module 2124 of FIG. 27.

In operation S210, the TRIM manage module 2124 receives a sector address Sector ADDR from the file system 2122 of FIG. 27. That is, after an erase operation is performed on a predetermined file in a high level, the file system 2122 provides a sector address Sector ADDR about a corresponding file to the TRIM manage module 2124.

In operation S220, the TRIM manage module 2124 determines whether the delivered sector address is a partial sector address Partial Sector ADDR or not with reference to the group information. Here, the partial sector address Partial Sector ADDR means a sector address that does not correspond to a page unit of the flash memory 2210 of FIG. 27.

If the delivered sector address is not a partial sector address (i.e., the delivered sector address corresponds to a page unit), the TRIM manage module 2124 provides sector address information (i.e., an aligned sector address Aligned Sector ADDR) corresponding to a page unit to the flash storage device 2200. If the delivered sector address is a partial sector address (i.e., the delivered sector address does not correspond to a page unit), operation S240 is performed.

In operation S240, it is determined whether there is a TRIM manage table corresponding to a partial sector address Partial Sector or not. If there is no TRIM manage table, the TRIM manage module 2124 generates a TRIM manage table for managing a partial sector address in operation S250. If there is a TRIM manage table, the TRIM manage module 2124 updates the WSI of the TRIM manage table in operation S260.

In operation S270, it is determined all the WSI of the TRIM manage table is updated or not. That is, the TRIM manage module 2124 determines about sectors in the same group is all updated as invalid. If all the WSI is updated as invalid, the TRIM manage module 2124 provides a sector address of a corresponding group (i.e., an aligned sector address Aligned Sector ADDR) and a TRIM command TRIM cmd to the flash storage device 2200 in operation S280.

As described above, the flash memory system 2000 supports a TRIM operation. That is, if there is a delete request about a predetermined file, the host 2100 changes metadata of the file system 2122 and then notifies a user that a corresponding file is deleted and the flash storage device 2200 performs a its substantial erase operation according to the TRIM command TRIM cmd. In this case, the host 2100 resolves the mismatch of a management unit between the host 2100 and the flash storage device 2200 by using the TRIM manage module 2124.

Furthermore, when an erase operation is performed on a plurality of files in a high level, the TRIM manage module 2124 may receive a sector address with time difference. In this case, the TRIM manage module 2124 collects address information about the delete-requested sectors and may process the collected address information simultaneously during an idle time. This will be described in more detail with reference to FIGS. 29 and 30.

VII. Host Collecting Address Information of Delete-Requested Sectors

Figure 39:
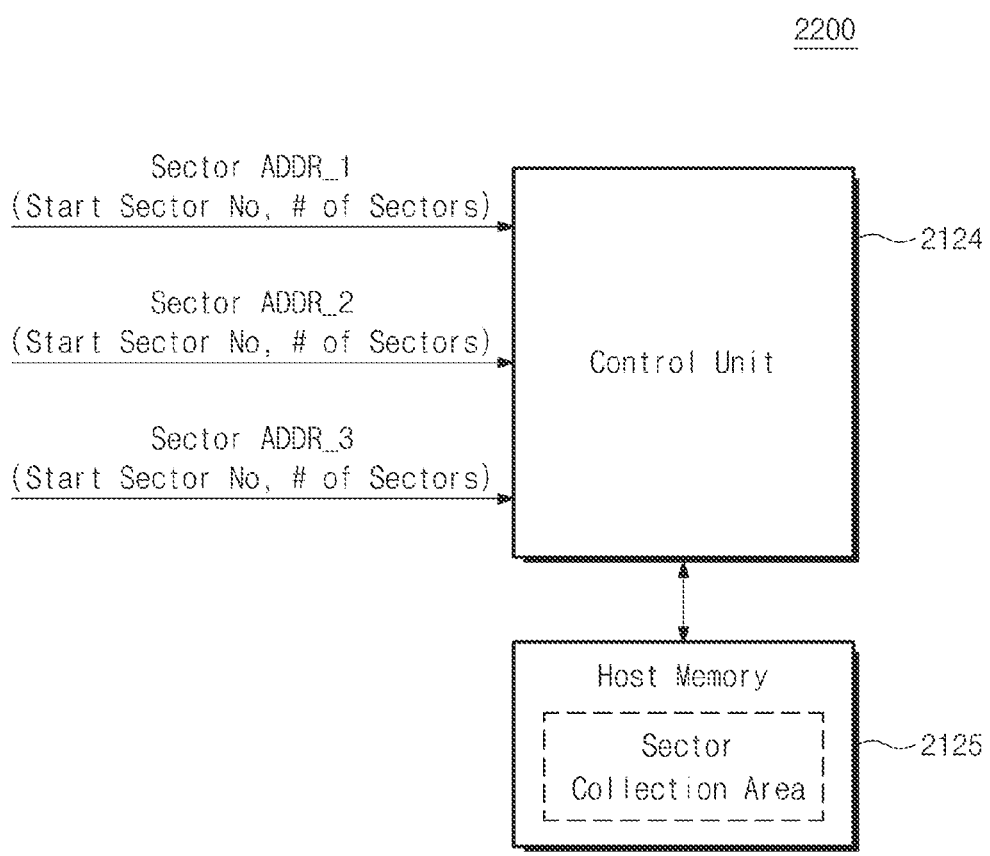
FIG. 39 is a view that a host collects information about sector address provided at respectively different times and processes information about the collected sector address.

FIG. 39 is a view that a host collects information about sector address provided at respectively different times and processes information about the collected sector address. Except for collecting information about a sector address, a host 2100 described below is similar to host 2100 of FIG. 27. Accordingly, hereinafter, differences to the host 2100 of FIG. 27 will be discussed. Also, like reference numbers refer to like elements.

Referring to FIG. 39, the first to third sector addresses Sector ADDR_1, Sector ADDR_2, Sector ADDR_3 are provided to the TRIM manage module 2124. Here, the first to third sector addresses Sector ADDR_1, Sector ADDR_2, Sector ADDR_3 means sectors addresses about respectively different files deleted in a high level. Additionally, in accordance with an exemplary embodiment the first to third sector addresses Sector ADDR_1, Sector ADDR_2, Sector ADDR_3 are provided to the TRIM manage module 2124 at different times respectively.

The host memory 2125 includes a sector collection area for collecting sector addressed provided. The TRIM manage module 2124 temporarily stores the first to third sector addresses Sector ADDR_1, Sector ADDR_2, Sector ADDR_3 in the sector collection area of the host memory 2125. During an idle time (e.g., during an idle time of the processing unit 2110 of FIG. 27), the TRIM manage module 2124 provides a sector address corresponding to a page unit among the collected first to third sector addresses Sector ADDR_1, Sector ADDR_2, Sector ADDR_3 to the flash storage device 2200 of FIG. 27.

For convenience of description, as shown in FIG. 32, in accordance with an exemplary embodiment the first to third sector addresses Sector ADDR_1, Sector ADDR_2, Sector ADDR_3 correspond to the first to third files File1 to File3, respectively. In this case, since the first to third files File1 to File3 correspond to the first to twelfth sectors Sector1, Sector2, Sector3, Sector4, Sector5, Sector6, Sector7, Sector8, Sector9, Sector 10, Sector 11, Sector 12 address information about the first to twelfth sectors Sector1, Sector2, Sector3, Sector4, Sector5, Sector6, Sector7, Sector8, Sector9, Sector 10, Sector 11, Sector 12 is stored in the sector collection area.

Moreover, the first to twelfth sectors Sector1, Sector2, Sector3, Sector4, Sector5, Sector6, Sector7, Sector8, Sector9, Sector 10, Sector 11, Sector 12 correspond to a page unit. That is, the first to fourth sectors Sector1, Sector2, Sector3, Sector4, the fifth to eighth sectors Sector5, Sector 6, Sector7, Sector8, and the ninth to twelfth sectors Sector9, Sector 10, Sector 11, Sector12 constitute respectively groups corresponding to each page.

Accordingly, during an idle time, the TRIM manage module 2124 may provide sector addresses (i.e., Start Sector No is 1 and #of Sectors is 12) for the first to twelfth sectors Sector1, Sector2, Sector3, Sector4, Sector5, Sector6, Sector7, Sector8, Sector9, Sector 10, Sector 11, Sector 12 and a TRIM command TRIM cmd to the flash storage device 2200. Since the first to third sector addresses Sector ADDR_1, Sector ADDR_2, Sector ADDR_3 are processed simultaneously, compared to a case that Sector ADDR_1, Sector ADDR_2, Sector ADDR_3 are processed separately, a transmission time of the TRIM command from the host 2100 to the flash storage device 2200 may be reduced.

Figure 40:
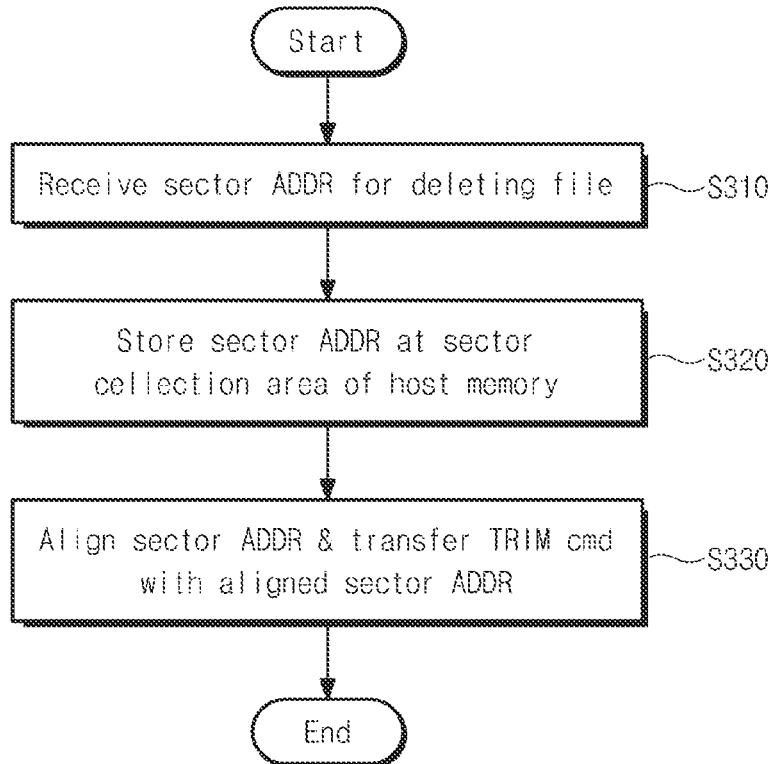
FIG. 40 is a flowchart illustrating operations when sector addresses about respectively different files are collected in the sector collection area of the FIG. 39.

FIG. 40 is a flowchart illustrating operations when sector addresses about respectively different files are collected in the sector collection area of FIG. 39.

In operation S310, a sector address Sector ADDR is provided to the TRIM manage module 2124 of FIG. 39. In operation S320, the TRIM manage module 2124 stores the received sector address Sector ADDR in a sector collection area of the host memory 2125 of FIG. 39. When another sector address is received later, the TRIM manage module 2124 may continuously store a sector address in the sector collection area.

Figure 41:
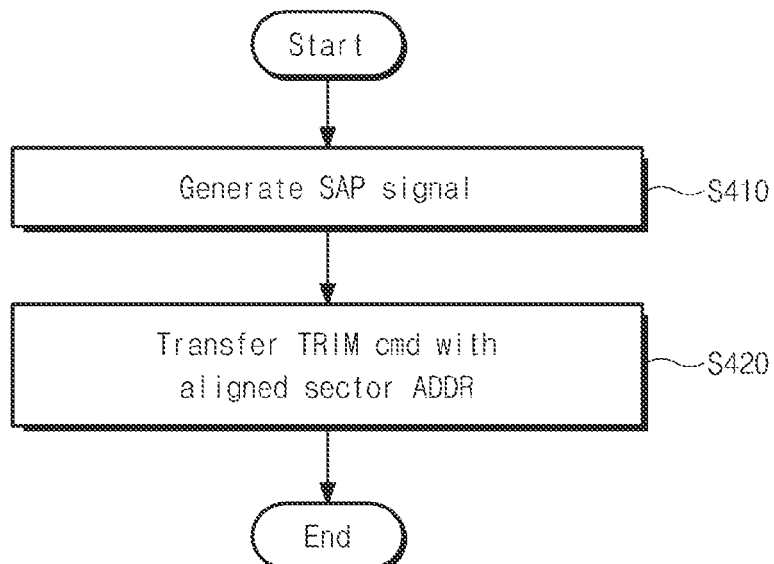
FIG. 41 is a flowchart illustrating operations when a sector address collected in the sector collection area of FIG. 39 is processed during an idle time.

FIG. 41 is a flowchart illustrating operations when a sector address collected in the sector collection area of FIG. 39 is processed during an idle time.

In operation S410, a Sector Address Process (SAP) signal occurs. For example, if there is no request from a user during a predetermined time (i.e., an idle time of the processing unit 1000 of FIG. 27), the processing unit 2110 generates a SAP signal.

In operation S420, the TRIM manage module 2124 provides a sector address (i.e., an aligned sector address Aligned Sector ADDR) corresponding to a page unit among the collected sector addresses and a TRIM command to the flash storage device 2200 of FIG. 27. Since the collected sector addresses are processed simultaneously, a transmission time of a TRIM command from the host 2100 to the flash storage device 2200 may be reduced. Since a method of processing a sector address of the TRIM manage module 2124 is similar to that of FIG. 38, its detailed description will be omitted.

As described above, when an erase operation is performed on a plurality of files in a high level, sector addresses about deleted files may be collected in the sector collection area of the host memory 1124. Since the TRIM manage module 2124 processes the collected sector addresses simultaneously, a transmission time of a TRIM command from the host 2100 to the flash storage device 2200 may be reduced.

VIII. Application Example of Flash Memory System Processing TRIM Command

The memory system 100, 200 and the flash memory system 1000, 2000 according to an embodiment of the inventive concept may be applied to various products. The host 2100 may include a computer, a digital camera, a mobile phone, an MP3 player, a point to multipoint (PMPO communications device, and a game console. The flash storage device 2200 may include a solid state drive (SSD) based on a flash memory, a flash memory card, or a flash memory module. The host 2100 and the flash storage device 2200 may be connected to each other through standardized interfaces such as advanced technology attachment (ATA), serial-ATA (SATA), parallel-ATA (PATA), universal serial bus (USB), small computer small interface (SCSI), enhanced small disk interface (ESDI), peripheral component interconnection (PCI) express, or an integrated drive electronics (IDE) interface.

Figure 42:
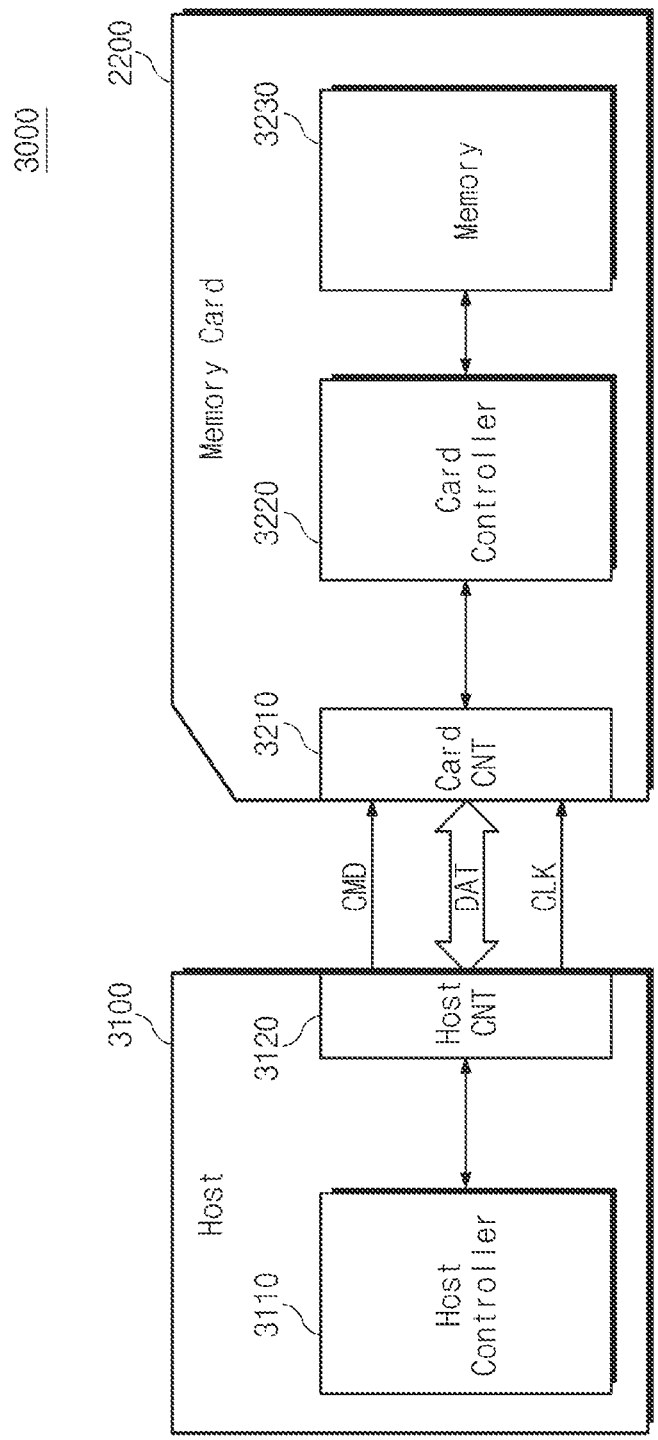
FIG. 42 is a view when a flash memory system according to an embodiment of the inventive concept is applied to a memory card.

FIG. 42 is a view when a host according to an embodiment of the inventive concept is applied to a memory card. A memory card system 3000 includes a host 3100 and a memory card 2200. The host 3100 includes a host controller 3110 and a host connection unit 3120. The memory card 2200 includes a card connection unit 3210, a card controller 3220, and a flash memory 3230.

The host connection unit 3120 and the card connection unit 3210 include a plurality of pins. The plurality of pins include a command pin, a data pin, a clock pin, and a power pin. The number of pins may vary according to kinds of the memory card 2200. As an example, a SD card includes nine pins.

The host 3100 writes data in the memory card 2200 or reads data stored in the memory card 2200. The host controller 3110 transmits a command (e.g., a write command), a clock signal CLK occurring in a clock generator (not shown) of the host 3100, and data DAT to the memory card 2200 through the host connection unit 3120.

The card controller 3220 stores data in the memory 3230 in synchronization with a clock signal occurring in the clock generator (not shown) of the card controller 3220, in response to the write command received through the card connection unit 3210. The memory 3230 stores data transmitted from the host 3100. For example, if the host 3100 is a digital camera, it stores image data.

In FIG. 42, the host controller 3110 may include an application program and a file system supporting a TRIM operation and a TRIM manage module. The card controller 3220 may process a TRIM command in the memory card 2200 through a FTL. The memory card system shown in FIG. 42 may support the TRIM operation and the management unit matching operation of the TRIM manage module.

Figure 43:
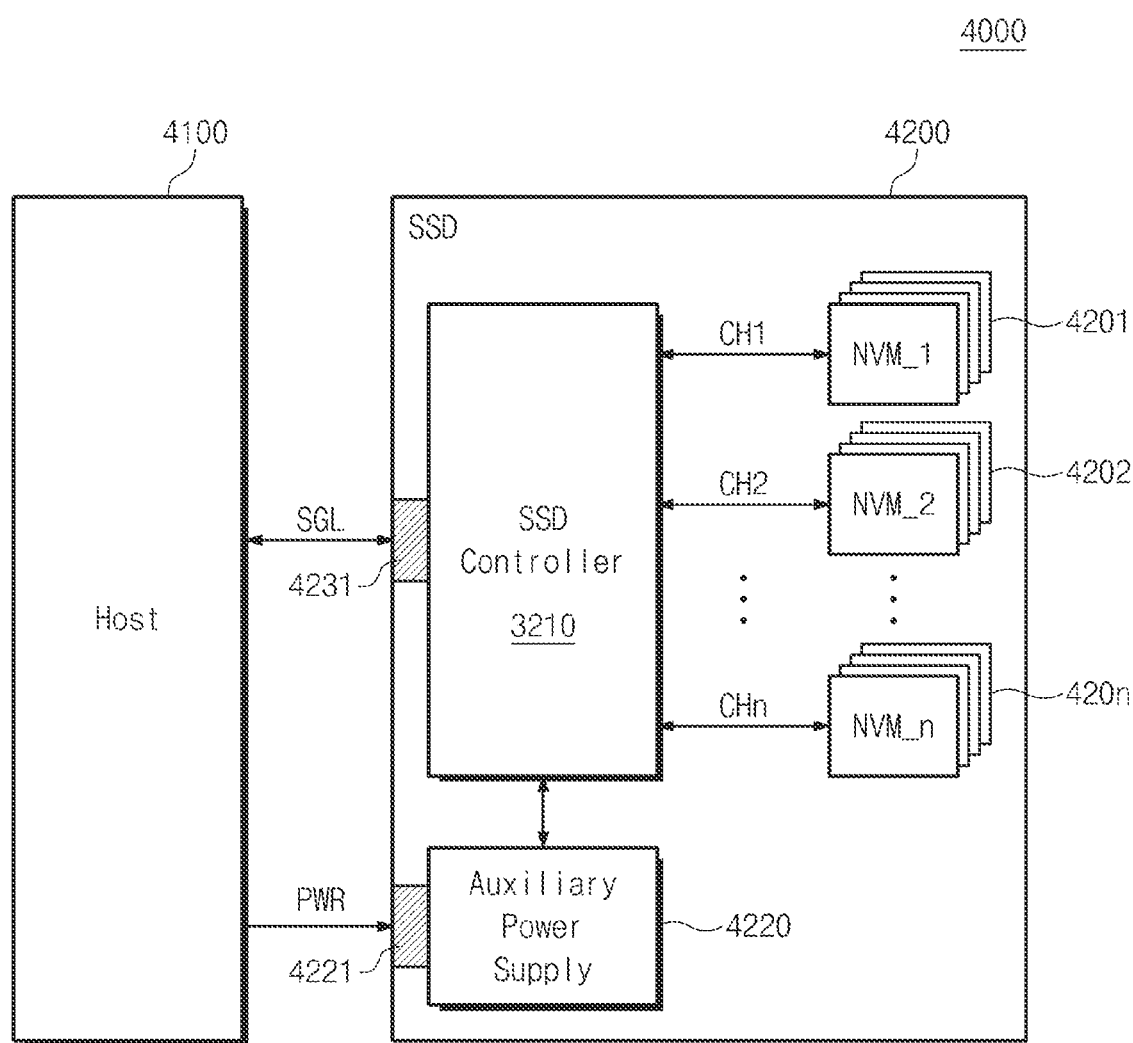
FIG. 43 is a view when a flash memory system according to an embodiment of the inventive concept is applied to a SSD.

FIG. 43 is a view when a flash memory system according to an embodiment of the inventive concept as applied to a SSD. Referring to FIG. 43, an SSD system 4000 includes a host 4100 and an SSD 4200. The SSD 4200 exchanges a signal with the host 4100 through a signal connector 3231 and receives power through a power connector 3221. The SSD 4200 includes a plurality of nonvolatile memory devices 4201, 4202, . . . 420n, an SSD controller 4210, and an auxiliary power supply 4220.

The plurality of nonvolatile memory devices 4201, 4202, . . . 420n are used as storage medium. The plurality of nonvolatile memory devices 4201, 4202, . . . 420n may be realized with a flash memory device having a large capacity of storage ability. In an exemplary embodiment SSD 4200 uses a flash memory.

The plurality of nonvolatile memory devices 4201, 4202, . . . 420n may be connected to the SSD controller 4210 through a plurality of channels CH1, CH2, . . . CHn. At least one memory device may be connected to one channel Memory devices connected to one channel may be connected to the same data bus. At this point, flash defragmentation (i.e., physically organizing the contents of the mass storage device used to store files into the smallest number of contiguous regions) may be performed in a super block form connecting a plurality of memory blocks as one or in a super page form connecting a plurality of pages as one.

The SSD controller 4210 exchanges a signal SGL with the host 4100 through the signal connector 3231. Here, the signal SGL may include a command, an address, and data. The SSD controller 4210 writes data in a corresponding memory device or reads data from a corresponding memory device according to a command of the host 4100. An internal configuration of the SSD controller 4210 will be described in more detail with reference to FIG. 44.

As seen in FIG. 43, the auxiliary power supply 4220 is connected to the host 4100 through the power connector 3221. The auxiliary power supply 4220 may be charged while receiving power PWR from the host 4100. Moreover, the auxiliary power supply 4220 may be placed in or outside the SSD 4200. For example, the auxiliary power supply 4220 may be placed in a main board and may provide auxiliary power to the SSD 4200.

Figure 44:
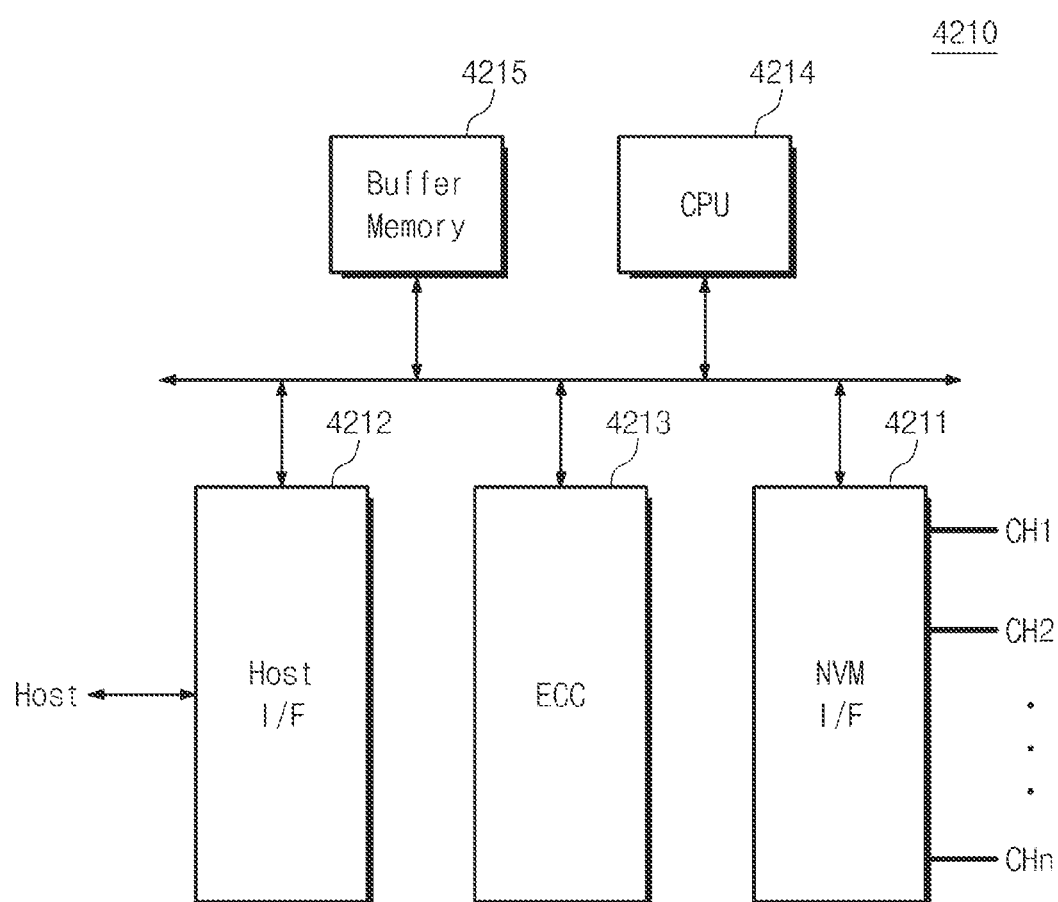
FIG. 44 is a block diagram illustrating a configuration of the SSD controller of FIG. 43.

FIG. 44 is a block diagram illustrating a configuration of the SSD controller 4210 of FIG. 43. Referring to FIG. 44, the SSD controller 4210 includes a nonvolatile memory (NVM) interface 4211, a host interface 4212, an error correction code (ECCO unit 4213, a central processing unit (CPU) 4214, and a buffer memory 4215.

The NVM interface 4211 scatters data delivered from the buffer memory 4215 into each of the channels CH1, CH2, CHn. Also, the NVM interface 4211 delivers the data read from the nonvolatile memory devices 4201, 4202, . . . 420n into the buffer memory 4215. Here, the NVM interface 4211 may use an interface method of a NAND flash memory. That is, the SSD controller 4210 may perform a program, read, or erase operation according to a NAND flash memory interface method.

The host interface 4212 provides an interface between the host 4100 and the SSD 4200 in correspondence to a protocol of the host 4100. The host interface 4212 may communicate with the host 4100 through a universal serial bus (USB), a small computer system interface (SCSI), a peripheral component interconnect (PCI) express, an advanced technology attachment (ATA) interface, a parallel AT attachment interface (PATA), a serial AT attachment interface (SATA), and a serial attached SCSI (SAS). Moreover, the host interface 4212 may perform a disk emulation function allowing the SSD 4200 to be recognized as a hard disk drive (HDD).

The CPU 4214 analyzes and processes a signal SGL inputted from the host 4100 of FIG. 44. The CPU 4214 controls the host 4100 or the nonvolatile memories devices 4201, 4202, . . . 420n through the host interface 4212 or the NVM interface 4211. The CPU 4214 controls operations of the nonvolatile memory devices 4201, 4202, . . . 420n according to a firmware for driving the SSD 4200.

The buffer memory 4215 temporarily stores data provided from the host 4100 or data read from the nonvolatile memory device. Additionally, the buffer memory 4215 may store metadata to be stored in the nonvolatile memory devices 4201 to 420n or cache data. During a sudden power off operation, the metadata or cache data stored in the buffer memory 4215 are stored in the nonvolatile memory devices 4201, 4202, . . . 420n. The buffer memory 4215 may include DRAM and SRAM. The SSD of FIGS. 43 and 44 may be applied to the above-mentioned host.

Figure 45:
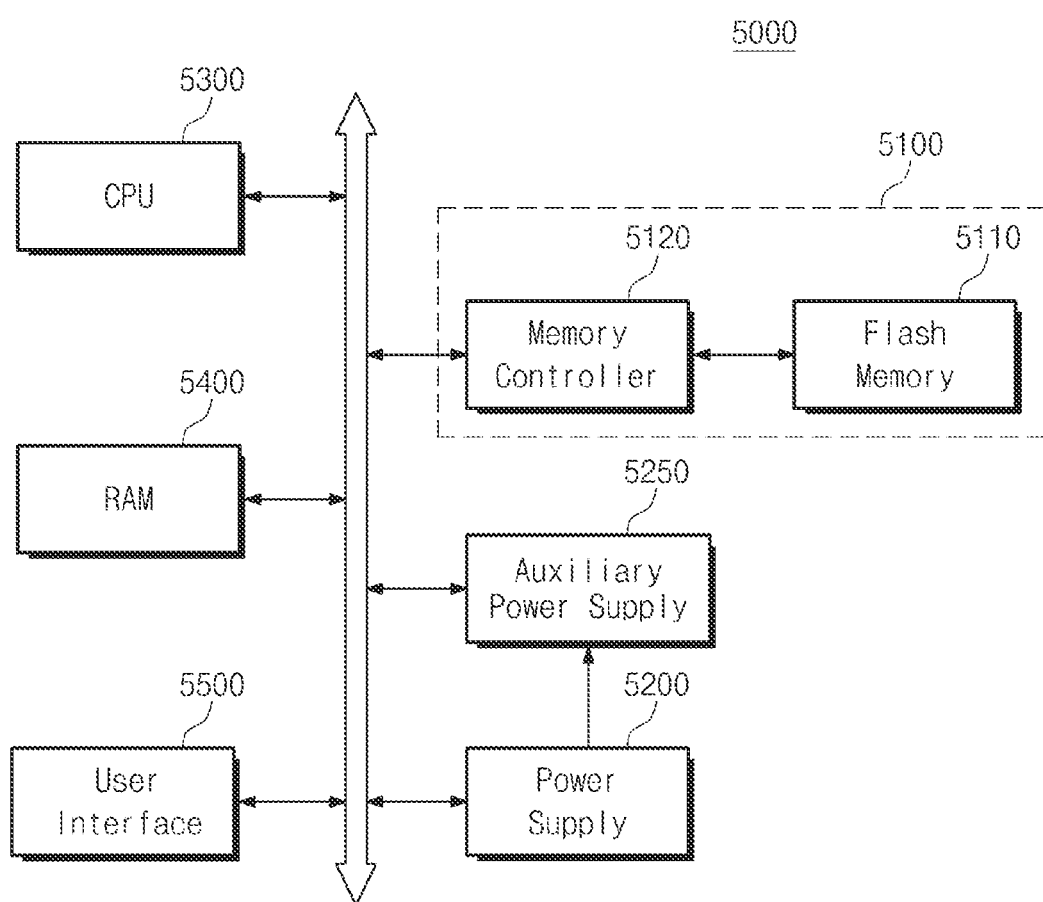
FIG. 45 is a block diagram when a flash memory system according to an embodiment of the inventive concept is realized in a flash memory module.

FIG. 45 is a block diagram when a flash memory system according to an embodiment of the inventive concept is realized in a flash memory module. Here, the host such as a personal computer (PC), a mobile phone, a personal digital assistant (PDA), and a camera may be connected to the flash memory module 5100 and then may be used.

Referring to FIG. 45, the flash memory module 5000 may include a memory system 5100, a power supply 5200, an auxiliary power supply 5250, a CPU 5300, a RAM 5400, and a user interface 5500. The flash memory module 5100 of FIG. 45 may be connected to the above-described host and then may be used.

Moreover, as mentioned above, in accordance with an exemplary embodiment the host 2100 of FIG. 27 manages a file by a sector unit and the flash storage device 2200 of FIG. 27 manages data stored in the flash memory 2210 by a page unit. However, this should be understood as only one exemplary embodiment.

For example, the host 2100 may manage a file by a cluster unit and the flash storage device 2200 may manage data stored in the flash memory 2210 by a block unit or a super page including a set of a plurality of pages. A management unit of the host 2100 and the flash storage device 2200 may be implemented in various ways as desired by a system designer or pursuant to a specific data management protocol.

Moreover, as mentioned above, in accordance with an exemplary embodiment a TRIM manage table may be stored in the host memory 2125 of FIG. 27. If the host memory 2125 is realized with a volatile memory (e.g., DRAM), information about the TRIM manage table may be lost during sudden power off. In this case, since information about a region that the TRIM manage table is deleted in a high level, a user may receive information 'corresponding data was deleted' regardless of the loss of information about the TRIM manage table. Moreover, it is apparent that the TRIM manage table may be stored in a nonvolatile memory (e.g., a flash memory).

A memory system according to an embodiment of the inventive concept gives attention to the mismatch between a management unit in terms of a hard disk and a management unit in terms of a flash memory such that it prevents massive copy and merge operations of valid data, which are caused by the mismatch of data management units. Accordingly, the memory system in accordance with exemplary embodiments of the present inventive concept gives attention to a life-shortening of a flash memory and the overall performance of the memory system. Moreover, the memory system supports a TRIM operation that gives attention to the response speed of a flash memory system pursuant to a command of a host.

The above-disclosed exemplary embodiments are to be considered illustrative and not restrictive, and the appended claims are intended to cover all such exemplary embodiments, modifications and enhancements thereto, and other exemplary embodiments.

What is claimed is:

1. A memory device comprising:
a flash memory including a plurality of memory regions that include a first memory region and a second memory region, each of the plurality of memory regions including a plurality of sub-regions that include a first sub-region and a second sub-region; and
a controller configured to receive from an external device a request to delete a first file stored in the flash memory, to update a management table that contains writing statement information on each sub-region of at least one memory region of the plurality of memory regions in response to the request to delete the first file, to update a mapping table that contains writing statement information on one or more memory regions of the plurality of memory regions when the writing statement information on all sub-regions of the first memory region in the management table is updated, and to perform an erase operation by a unit of memory region in response to the request to delete the first file,
wherein when a first portion of the first file is stored in the first sub-region of the first memory region and the second sub-region of the first memory region does not store invalid data, at least a portion of the first file that is stored in the first memory region is not erased after the controller performs the erase operation based on the mapping table.

2. The memory device of claim 1, further comprising a buffer configured to store the management table and/or the mapping table.

3. The memory device of claim 1, wherein the controller performs the erase operation, in response to the request to delete the first file, when at least a portion of the first file is stored either in all of the plurality of sub-regions of the first memory region, or in all of one or more remaining sub-regions of the second memory region, and
the one or more remaining sub-regions of the second memory region are all of sub-regions of the second memory region other than at least one sub-region that is designated by one or more previous request to delete.

4. The memory device of claim 1, wherein the controller performs the erase operation at an idle time when there is no request from the external device.

5. The memory device of claim 1, wherein in response to the request to delete the first file, only a portion of the first file is erased from the flash memory and a remaining portion of the first file is still stored in the flash memory.

6. The memory device of claim 1, wherein the first file contains first data less than a size of memory region, and
the first data remains stored in the flash memory until the first data is merged with other data to form a TRIM operation aligned to the size of memory region to delete merged data.

7. The memory device of claim 1, wherein the first memory region is invalid only when all of the plurality of sub-regions of the first memory region are invalid.

8. A memory device comprising:
a flash memory including a plurality of memory regions that include a first memory region and a second memory region, each of the plurality of memory regions including a plurality of sub-regions that include a first sub-region and a second sub-region; and
a controller configured to receive from an external device a request to delete first data of a first file stored in the flash memory, to update a management table that contains writing statement information on each sub-region of at least one memory region of the plurality of memory regions in response to the request to delete the first file, to update a mapping table that contains writing statement information on one or more memory regions of the plurality of memory regions when the writing statement information on all sub-regions of the first memory region in the management table is updated, and to perform an erase operation by a unit of memory region based on the mapping table,
wherein at least a portion of the first data stored in only a portion of sub-regions of the first memory region remains stored in the first memory region after the erase operation in response to the request to delete the first data, until all remaining sub-regions of the first memory region other than the only a portion of sub-regions storing the at least a portion of the first data store at least a portion of second data of one or more second files and then a request to delete the second data is received, and
each sub-region of the first memory region stores either the at least a portion of the first data or the at least a portion of the second data.

9. The memory device of claim 8, wherein when a first portion of the first data is stored in the first sub-region of the first memory region and the second sub-region of the first memory region does not store invalid data, at least a portion of the first data that is stored in the first memory region is not erased after the controller performs the erase operation in response to the request to delete the first file.

10. The memory device of claim 8, wherein the first data remains stored in the flash memory until the first data is merged with other data to form a TRIM operation aligned to the size of memory region to delete merged data.

11. The memory device of claim 8, further comprising a buffer configured to store the management table and/or the mapping table.

12. The memory device of claim 8, wherein the controller performs the erase operation at an idle time when there is no request from the external device.

13. The memory device of claim 8, wherein the first memory region is invalid only when all of the plurality of sub-regions of the first memory region are invalid.

14. A memory device comprising:
a flash memory including a plurality of memory regions that include a first memory region and a second memory region, each of the plurality of memory regions including a plurality of sub-regions that include a first sub-region and a second sub-region; and a controller configured to receive from an external device a request to delete first data of a first file stored in the flash memory, to update a management table that contains writing statement information on each sub-region of at least one memory region of the plurality of memory regions in response to the request to delete the first file, to update a mapping table that contains writing statement information on one or more memory regions of the plurality of memory regions when the writing statement information on all sub-regions of the first memory region in the management table is updated, and to perform an erase operation by a unit of memory region based on the mapping table, wherein the first data less than a size of memory region remains stored in the flash memory until the first data is merged with other data to form a TRIM operation aligned to the size of memory region to delete merged data.

15. The memory device of claim 14, wherein when a portion of the first file is stored in the first sub-region of the second memory region and the second sub-region of the second memory region does not contain invalid data, the erase operation is not performed on the second memory region and the management table keeps storing the writing statement information on the first sub-region of the second memory region until the erase operation is performed on the second memory region after all of the plurality of sub-regions of the second memory region contain invalid data.

16. The memory device of claim 14, further comprising a buffer configured to store the management table and/or the mapping table.

17. The memory device of claim 14, wherein when a first portion of the first file is stored in the first sub-region of the first memory region and the second sub-region of the first memory region does not store invalid data, at least a portion of the first file that is stored in the first memory region is not erased after the controller performs the erase operation in response to the request to delete the first file.

18. The memory device of claim 14, wherein at least a portion of the first data stored in only a portion of sub-regions of the first memory region remains stored in the first memory region after the erase operation is performed in response to the request to delete the first data, until all remaining sub-regions of the first memory region other than the only a portion of sub-regions storing the at least a portion of the first data store at least a portion of second data of one or more second files and then a request to delete the second data is received, and each sub-region of the first memory region stores either the at least a portion of the first data or the at least a portion of the second data.

19. The memory device of claim 14, wherein the first memory region is invalid only when all of the plurality of sub-regions of the first memory region are invalid.

* * * * *

UNITED STATES PATENT AND TRADEMARK OFFICE
CERTIFICATE OF CORRECTION

PATENT NO. : 11,636,032 B2
APPLICATION NO. : 17/570848
DATED : April 25, 2023
INVENTOR(S) : Hyojin Jeong et al.

It is certified that error appears in the above-identified patent and that said Letters Patent is hereby corrected as shown below:

In the Claims

In Column 39, Line 41 (Claim 1):
Change "by a unit of memory region" to "by a unit of memory block"

In Column 40, Lines 29-30 (Claim 8):
Change "by a unit of memory region" to "by a unit of memory block"

In Column 41, Lines 15-16 (Claim 14):
Change "by a unit of memory region" to "by a unit of memory block"

Signed and Sealed this
Third Day of October, 2023

Katherine Kelly Vidal
*Director of the United States Patent and Trademark Office*